United States Patent
Okada et al.

(10) Patent No.: US 7,311,324 B2
(45) Date of Patent: Dec. 25, 2007

(54) AIRBAG DEVICE FOR FRONT PASSENGER'S SEAT

(75) Inventors: Yasushi Okada, Aichi-ken (JP); Masaru Ido, Aichi-ken (JP); Takashi Uemura, Aichi-ken (JP); Noriya Nagata, Aichi-ken (JP); Yuji Kuriyama, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/594,897

(22) Filed: Nov. 9, 2006

(65) Prior Publication Data

US 2007/0052221 A1 Mar. 8, 2007

Related U.S. Application Data

(62) Division of application No. 10/446,168, filed on May 28, 2003, now Pat. No. 7,150,470.

(30) Foreign Application Priority Data

May 31, 2002 (JP) .............................. 2002-160200
May 31, 2002 (JP) .............................. 2002-160224

(51) Int. Cl.
*B60R 21/26* (2006.01)
(52) U.S. Cl. .................... 280/728.2; 280/740
(58) Field of Classification Search ............ 280/728.2, 280/732, 740, 743.1
See application file for complete search history.

(56) References Cited

U.S. PATENT DOCUMENTS

| | | |
|---|---|---|
| 3,937,488 A | 2/1976 | Wilson et al. |
| 4,977,016 A | 12/1990 | Thornton et al. |
| 5,073,418 A | 12/1991 | Thornton et al. |
| 5,451,074 A | 9/1995 | Guitarini |
| 5,573,270 A | 11/1996 | Sogi et al. |
| 5,581,856 A | 12/1996 | Krummheuer et al. |
| 5,593,179 A | 1/1997 | Maruyama |
| 5,642,900 A * | 7/1997 | Patel ....................... 280/728.2 |
| 5,836,608 A * | 11/1998 | Soderquist et al. ...... 280/728.2 |
| 5,860,672 A * | 1/1999 | Petersen .................. 280/728.2 |
| 5,865,464 A | 2/1999 | Kanuma et al. |
| 6,024,380 A | 2/2000 | Kim et al. |
| 6,170,857 B1 | 1/2001 | Okada et al. |
| 6,234,521 B1 | 5/2001 | Katsuda et al. |
| 6,364,342 B1 * | 4/2002 | Kim ........................ 280/728.2 |

(Continued)

FOREIGN PATENT DOCUMENTS

GB 2326385 12/1998

(Continued)

*Primary Examiner*—Eric Culbreth
*Assistant Examiner*—Drew J. Brown
(74) *Attorney, Agent, or Firm*—Posz Law Group, PLC

(57) ABSTRACT

The airbag device for front passenger's seat is mounted on the dashboard in front of the front passenger's seat. The airbag device for front passenger's seat includes an airbag to be inflated with the inflation gas, and an inflator for feeding the airbag with the inflation gas of pyro- and long mass flow type. The gas permeability rate of the airbag is 1.0 $l/cm^2/min$ or under at 20 kPa air pressure, and its weight is 230 $g/m^2$ or under. This airbag device for front passenger's seat prevents the gas leakage, expands and inflates the airbag properly, and constitutes to the weight reduction.

5 Claims, 36 Drawing Sheets

U.S. PATENT DOCUMENTS

| | | |
|---|---|---|
| 6,439,606 B2 | 8/2002 | Okada et al. |
| 6,557,891 B2 | 5/2003 | Okada et al. |
| 6,666,477 B1 | 12/2003 | Robertson et al. |
| 6,702,318 B2 * | 3/2004 | Rose et al. ............... 280/728.2 |
| 6,877,765 B2 * | 4/2005 | Rose et al. ............... 280/728.2 |
| 2003/0057687 A1 | 3/2003 | Nakashima et al. |

FOREIGN PATENT DOCUMENTS

JP  A-9-86319  3/1997

* cited by examiner

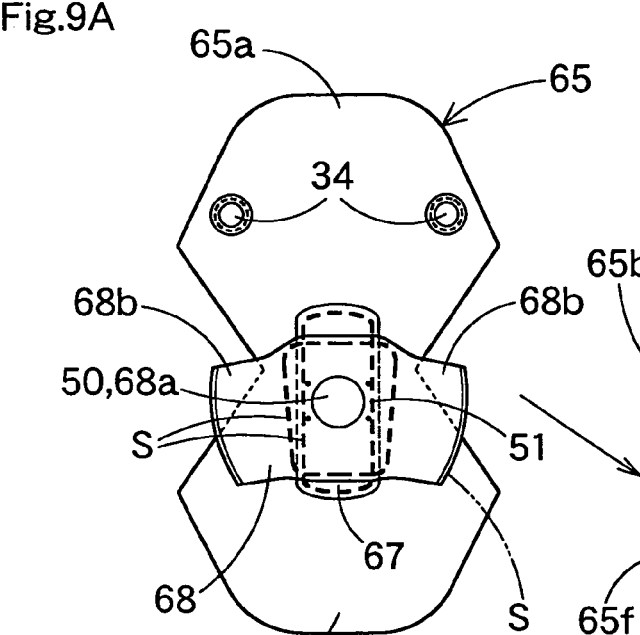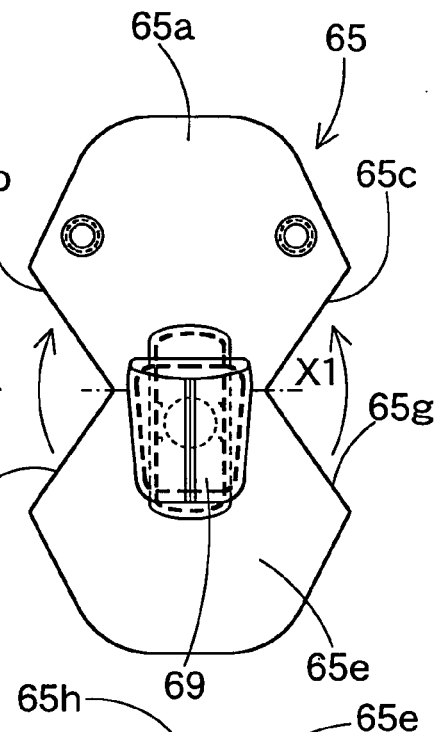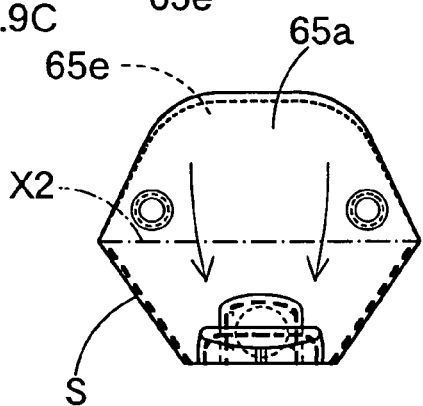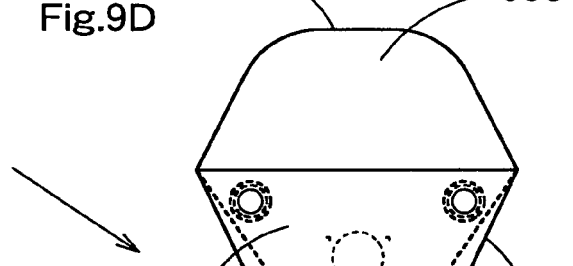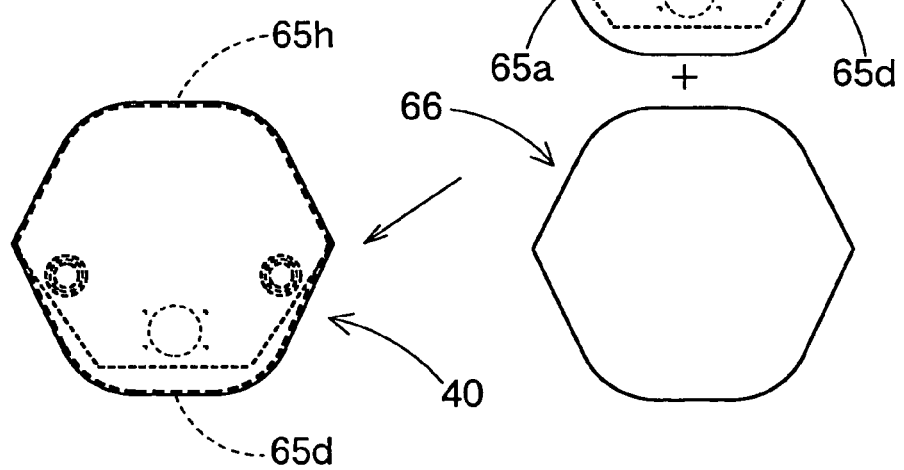

AIRBAG DEVICE FOR FRONT PASSENGER'S SEAT

This application is a division of application Ser. No. 10/446,168 filed on May 28, 2003, Now U.S. Pat. No. 7,150,470, which claims priority to Japanese Patent Application of Okada et at, filed May 31, 2002, under No. 2002-160200, and Japanese Patent Application of Tajima et at, filed May 31, 2002, tinder No. 2002-160224, the entirety of each is hereby incorporated into the present application by this reference.

BACKGROUND OF THE INVENTION

1. Field of the Invention

The present invention relates to an airbag device for front passenger's seat to be mounted on the instrument panel (as will be called "dashboard" hereinafter) in front of a front passenger's seat.

2. Description of Related Art

Conventionally, an airbag device for front passenger's seat includes an airbag, an inflator for supplying the airbag with inflation gas, a case for holding the airbag and the inflator, and an airbag cover for covering the folded airbag.

As an inflator, a disc-type is used, for example, as disclosed in Japanese Patent Laid-Open No. Hei 9-86319. This disc-type inflator includes a cylindrical body and a flange projected from the outer circumference of the body for the attachment to the case. The body is provided on the upper outer surface above the flange with a plurality of gas discharge ports for discharging the inflation gas.

The case has a bottom wall with an insert hole large enough to insert the upper portion of the inflator with the gas discharge ports therein toward the inner space of the case.

The airbag has an opening for admitting the inflation gas. The airbag is secured to the bottom wall of the case by means of an annular retainer, which is pressed on the periphery of the opening and attached to the bottom wall of the case.

Moreover, the inflator in the above disclosure is a pyro-type which generates inflation gas by chemical reaction such as burning reaction of gas generating material. The pyro-type inflator is favorably used for a vehicle because of its compactness, compared with a hybrid type inflator charged with inflation gas.

However, the conventional pyro-type inflator has a room for improvement in the timing of supplying the inflation gas to the airbag for front passenger's seat.

SUMMARY OF THE INVENTION

The object of the present invention is to provide an airbag device for front passenger's seat securing a proper expansion and inflation of the airbag.

The first airbag device for front passenger's seat of the present invention is mounted on the dashboard in front of the front passenger's seat.

The first airbag device for front passenger's seat of the present invention includes an airbag to be inflated with inflation gas, and an inflator of pyro-type and long mass flow type, for supplying the airbag with the inflation gas. The gas permeability rate per unit area of the airbag is 1.0 l/cm$^2$/min or under at 20 kPa air pressure, and the weight of the airbag is 230 g/m$^2$ or under.

In the first airbag device for front passenger's seat of the present invention, the inflator for supplying the airbag with inflation gas is a pyro-type, which generates the inflation gas by chemical reaction, and a long mass flow type.

In this inflator of long mass flow type, the amount of gas discharged into the airbag increases from when the reaction force against the passenger is most required upon the inflation of the airbag on, i.e., from 30 msec after ignition of the inflator on, in comparison with a conventional type.

The long mass type inflator, more specifically, is an inflator whose mass flow curve area from 30 msec after ignition on occupies more than about 25% of the entire area of a mass flow curve. In other words, it is an inflator whose area from 20 msec after ignition on occupies more than about 45% of the entire area of the mass flow curve. In yet another words, it is an inflator whose area before the peak time against the entire area of the mass flow curve is less than about 55%. In still another words, it is an inflator whose mass flow curve peaks out at about 15 to 35 msec after ignition.

The mass flow curve indicates the relationship between the amount of gas discharged from the inflator per unit time and the time, and it is calculated from a tank curve data obtained from the tank combustion test.

The tank combustion test is conducted as follows:

Fix the inflator in a stainless-steel tank whose internal volume is 6.0l. Close the tank tightly in room temperature, and connect the inflator to an outside electric ignition. Then measure the pressure change in the tank for the duration of 0 to 200 msecs, the ignition time being 0, by a pressure transducer equipped in the tank. The measured data is computer-processed to resultingly obtain a tank pressure versus time curve for evaluating the performance of the inflator, which is a tank curve. This tank curve, or the tank pressure versus time curve, is integrated and converted into a gas generation rate per time, so that the mass flow curve is calculated.

The area from 30 msec after ignition on occupying more than about 25% of the entire area of the mass flow curve means that the total of mass flow area from 30 msec after ignition to the timing of the mass flow's decreasing to zero in a curve indicating the change of the gas amount per unit time in the course of time is more than about 25% of the entire area of the mass flow curve. The inflator of this type generates more than about 25% of the total amount of gas generation in the timing when the airbag for front passenger's seat inflated requires the greatest reaction force against the passenger, i.e., from 30 msec after ignition on. Therefore, the airbag is able to protect the passenger properly. Here, in a dual type inflator having two combustion chambers, the timing of 30 msec has its importance in burning gas generating agent in the first combustion chamber where the combustion takes place firstly. Moreover, the area from 30 msec after ignition on desirably occupies about 35% or more, or further desirably, about 45% or more of the entire area of the mass flow curve.

The area from 20 msec after ignition on occupying more than about 45% of the entire area of the mass flow curve means that the total of mass flow area from 20 msec after ignition to the timing of the mass flow's decreasing to zero in a curve indicating the change of the gas amount per unit time in the course of time is more than about 45% of the entire area of the mass flow curve. The inflator of this type generates more than about 45% of the total amount of gas generation in the timing when the airbag for front passenger's seat inflated requires the reaction force against the passenger, i.e., from 20 msec after ignition on. Therefore, the airbag is able to protect the passenger properly. Here, the timing of 20 msec has its importance in an inflator with a single combustion chamber, or in a dual-type inflator having two combustion chambers when burning gas generating agent in both chambers at the same time. Moreover, the area from 20 msec after ignition on desirably occupies about 55% or more of the entire area of the mass flow curve.

The area before the peak time against the entire area of the mass flow curve being less than about 55% means that the total of mass flow area from the ignition to the peak time of the mass flow in a curve indicating the change of the gas amount per unit time in the course of time is less than about 55% of the entire area of the mass flow curve. The inflator of this type is able to suppress the amount of the gas generated before the peak time of the mass flow less than about 55% of the entire amount, thereby to supply the least gas necessary in the initial stage of the expansion of the airbag, and to supply more gas to the airbag after the peak time. Therefore, the airbag is able to protect the passenger properly. The area before the peak time is desirably about 40% or less of the entire area of the mass flow curve in an inflator with a single combustion chamber, or in a dual- type inflator when burning gas generating agent at the same time in both chambers. It is desirably about 50% or less in a dual type inflator when burning gas generating agent in a combustion chamber where the combustion takes place firstly.

Moreover, the mass flow curve's peaking out at about 15 to 35 msec after ignition means that the peak time period of the gas amount is within the range of about 15 to 35 msec after ignition in the curve indicating the change of the gas amount per unit time in the course of time. The inflator of this type is able to supply the airbag with more gas near the timing when the airbag needs to apply the greatest reaction force against the passenger, i.e., from 30 msec after ignition on. Therefore, the airbag is able to protect the passenger properly. The peak time of the mass flow curve is desirably within the range of about 16 to 24 msec after ignition, in an inflator with a single combustion chamber, or in a dual-type inflator when burning gas generating agent at the same time in both chambers. It is desirably within the range of about 25 to 30 msec after ignition in a dual type inflator when burning gas generating agent in a combustion chamber where the combustion takes place firstly.

When the inflation gas from the inflator of this long mass flow type is introduced into the airbag for front passenger's seat, the amount of the inflation gas discharged increases from 30 msec after ignition on, or more desirably, from 30 to 60 msec after ignition, in comparison with a conventional inflator. Therefore, the passenger in the front passenger's seat is properly protected.

In the first airbag device for front passenger's seat of the present invention, therefore, the inflator is made compact, and is able to properly expand the airbag since it employs an inflator of pyro-type and long mass flow type.

If the inflation gas leaks from the airbag, however, the meaning of employing the long mass flow type inflator is decreased.

To cope with this problem, it is conceivable to provide a coating layer of silicon or the like on the inner surface of the airbag to prevent gas leakage. However, it increases the manufacturing steps of the airbag and its cost, and the weight of the airbag as well, which goes against the weight-saving of the parts mounted on the vehicle.

In the airbag device for front passenger's seat of the present invention, however, the gas permeability rate is 1.0 l/cm$^2$/min or under at 20 kPa air pressure. In the present invention, therefore, the leakage of the inflation gas from the airbag is prevented, so that it is possible to make the most use of the characteristic property of the long mass flow type inflator. As a result, the present invention is able to provide the smooth inflation state of the airbag.

Since the weight of the airbag is less than 230 g/m$^2$, moreover, it contributes to the weight reduction of the airbag. The airbag within this weight range includes the following airbags, for example: an airbag formed by base cloths woven of heavy thick thread or light fine thread, without a coating layer, or an airbag formed by base cloths woven of light fine thread with a thin coating layer.

Moreover, the long mass flow inflator itself is able to contribute to the weight reduction of the airbag by reducing the discharge amount of the inflation gas, since the gas permeability rate of the airbag is low.

In the airbag device for front passenger's seat of the present invention, therefore, it is able to secure the smooth expansion and inflation of the airbag even if employing an inflator of long mass flow type, and to realize the weight reduction.

It is desired that the gas discharge rate of the inflator per unit volume of the airbag completely inflated be 0.026 mol/l or under. The inflator like this is lighter than a conventional pyro-type inflator whose discharge rate per unit volume is 0.029 to 0.032 mol/l, and thereby to contribute to the weight reduction of the airbag device. Of course, the smooth expansion and inflation of the airbag is not hindered even with a compact inflator like this, since the gas leakage from the airbag does not occur. Here, the discharge rate of the inflator per unit volume of the airbag is desirably 0.02 mol/l or more, in the light of securing the internal pressure of the airbag.

Moreover, if the airbag device is so constructed that the head deceleration of the unbelted passenger dummy in the frontal collision FRB test according to FMVSS No. 208-66FR65403, effective on May 28, 2003, maybe 100 m/s$^2$ or over, it is desirable with respect to the restraint performance of the airbag for the front passenger's seat.

In this case, the airbag is desirably constructed as follows: the airbag includes an inlet port for admitting the inflation gas, and is folded and housed in a case, and pushes and opens the doors arranged in the instrument panel upon the inflow of the inflation gas from the gas inlet port to expand and inflate toward the vehicle's rear side. As the shape completely expanded and inflated, the airbag includes a passenger's side wall to be arranged generally along the vertical direction and closer to the passenger, and a side wall portion extended toward the vehicle's front side from the outer peripheral edge of the passenger's side wall while narrowing in a generally conical shape. The airbag is further provided at the front lower side of the side wall portion as completely inflated with the gas inlet port arranged generally horizontally, and the peripheral edge of the gas inlet port is attached to the case. The airbag is housed in the case after being folded through the preliminary folding step firstly, and then through the transverse folding step and vertical folding step. The preliminarily folded shape of the airbag is flat with the part near the upper edge of the passenger's side wall disposed in a position confronting the gas inlet port, and with the passenger's side wall overlapped with the lower part of the side wall portion as inflated.

With this construction, when the airbag expands and inflates, the airbag lets the inflation gas in from the gas inlet port, and expands and inflates while unfolding transversely and vertically. At this time, the part near the upper edge of the passenger's side wall confronting the gas inlet port is pushed up intensely by the pressure of the initial inflation gas flowing in, prior to other part of the passenger's side wall such as the lower part, since the part is disposed to confront the gas inlet port in the preliminary folding. This helps the passenger's side wall to be deployed generally along the vertical direction.

Moreover, if the part near the upper edge of the passenger's side wall is pushed up intensely, the transverse and vertical folding is unfolded quickly. This helps the passenger's side wall to be expanded widely.

Consequently, the passenger's side wall disposed generally perpendicularly to the gas inlet port peripheral edge is quickly deployed generally along the vertical direction when the airbag expands and inflates, and the airbag is widely expanded so as not to apply a partial pressure to the passenger. With this construction, accordingly, the head deceleration of 100 m/s$^2$ or over is easily obtained in the aforementioned frontal collision FRB test.

When the preliminary folding of the airbag is completed, the generally entire area of the passenger's side wall is desirably flatly expanded while the side wall portion is folded. When the airbag expands and inflates, with this construction, the passenger's side wall is easily moved toward the passenger in a state widely expanded transversely and vertically, compared with the case in which the passenger's side wall is also folded. Therefore, it is able to suppress the speed of the passenger's side wall moving toward the passenger, and to obtain the head deceleration of 100 m/s$^2$ or over more easily in the frontal collision FRB test. Moreover, the preliminary folding of the above airbag can be done only by folding the side wall portion while leaving the generally entire area of the passenger's side wall flatly expanded, thereby facilitating the preliminary folding work.

When the preliminary folding of the airbag is over, it is desired that the upper part of the gas inlet port in the side wall portion is folded and disposed in the range from the vicinity of the rear edge of the gas inlet port toward the front side.

In the preliminary folding, the upper part of the gas inlet port in the side wall portion can be folded and disposed in the front side of the front edge or the rear edge of the gas inlet port, or folded and disposed over the gas inlet port. However, if the upper part of the gas inlet port in the side wall portion is folded between the gas inlet port and the upper part of the passenger's side wall and disposed in the range from the vicinity of the rear edge of the gas inlet port toward the front side, the following working-effects are obtained.

Specifically, the upper part of the gas inlet port in the side wall portion is folded and disposed in the range from the vicinity of the rear edge of the gas inlet port toward the front side, and not extended to the far rear side of the gas inlet port. Accordingly, when the inflation gas is introduced from the gas inlet port, the part near the upper edge of the passenger's side wall is pushed up with the upper part of the gas inlet port in the side wall portion interposed, and the upper part of the gas inlet port in the side wall portion itself also is pushed up. At this time, the upper part of the gas inlet port in the side wall portion is released from the gas inlet port while being unfolded. As a result, the part near the upper edge of the passenger's side wall comes to confront the gas inlet port directly, and helps the passenger's side wall to be disposed generally vertically. Therefore, with this construction, the action of deploying the passenger's side wall generally vertically quickly is not hindered even if the upper part of the gas inlet port in the side wall portion is interposed between the gas inlet port and the part near the upper edge of the passenger's side wall. Of course, if the upper part of the gas inlet port in the side wall portion is folded at the front side of the rear edge of the gas inlet port, the passenger's side wall is more quickly deployed generally along the vertical direction. Furthermore, if the upper part of the gas inlet port in the side wall portion is folded at the front side of the front edge of the gas inlet port, the passenger's side wall is even more quickly deployed generally along the vertical direction.

The airbag may be provided with a commutator cloth for receiving the inflation gas flowing out of the dashboard and changing the gas flow direction at the position within the airbag and out of the dashboard, when the airbag inflates admitting the inflation gas. With this construction, when the airbag device is put in action, the inflation gas flowing into the airbag is changed in its course by the commutator cloth at the position out of the dashboard, and therefore, the inflation basis prevented from abutting directly against the inner surface of the airbag. In other words, the inflation gas does not straightly abut the inner surface of the base cloths constituting the bag shape of the airbag, which is protruded from the dashboard, in a direction in which the inflation gas initially flows into the airbag. Therefore, the damage to the base cloths constituting the airbag is reduced, and the gas leakage from the airbag is prevented. As a result, the gas permeability of the airbag mounted on the vehicle is further lowered, thereby promoting the expansion and inflation of the airbag.

The second airbag device for front passenger's seat according to the present invention is mounted on the dashboard in front of the front passenger's seat. This airbag device includes: an airbag having an opening for admitting the inflation gas; an inflator of a long mass flow type generating the inflation gas by chemical reaction, and of a disc type, which is provided on the outer circumference of the end portion with a plurality of gas discharge ports for discharging the inflation gas; a case for holding and housing the airbag folded and holding the inflator; and an annular retainer for attaching the airbag to the case by holding the opening peripheral edge of the airbag. The case includes a bottom wall with an insert hole from which the end portion of the inflator having the gas discharge ports is inserted therein. The retainer includes: an annular base attached to the periphery of the insert hole of the case bottom wall while pressing the peripheral edge of the airbag opening onto the periphery of the insert hole of the bottom wall; and a cover wall extended from the base so as to block the part of the airbag neighboring the opening peripheral edge held by the base from the gas discharge ports of the inflator. The mist contained in the inflation gas discharged from the gas discharge ports adheres on the cover wall, and the cover wall includes a mist growth prevention means to prevent the mist from forming mist agglomerates.

The second airbag device for front passenger's seat according to the present invention employs an inflator of pyro-type, which generates inflation gas by chemical reaction, and of long mass flow type, as the inflator for supplying the airbag with the inflation gas, as in the first embodiment. Accordingly, the inflator is compact, and is able to expand and inflate the airbag for front passenger's seat properly.

Here, since a pyro- and long mass flow type inflator acts gently, the inflation gas contains a lot of mist. Although most of the mist diffuses and is cooled off immediately upon the inflation of the airbag, some of the mist adheres to the retainer located around the gas discharge ports. This mist is likely to stick together with the following mist and form mist agglomerates. In this case, the mist inside a mist agglomerate is difficult to be cooled off, and therefore, it takes a certain time for the whole mist agglomerate to be cooled off.

In the second airbag device for front passenger's seat according to the present invention, however, even if the mist contained in the inflation gas is discharged from the gas discharge ports, it adheres to the cover wall. The mist is prevented from forming great mist agglomerates by the mist growth prevention means.

In the second airbag device for front passenger's seat according to the present invention, therefore, even if the inflation gas discharged from the inflator of long mass flow type contains a lot of mist, the mist does not form great mist agglomerates.

Moreover, since the cover wall of the retainer is arranged so as to block the part of the airbag neighboring the opening peripheral edge held by the base from the gas discharge ports of the inflator, it prevents the high temperature gas containing the high temperature mist from hitting the part of the airbag neighboring the opening peripheral edge directly, and contributes to the protection of the part of the airbag neighboring the opening peripheral edge from heat.

The mist growth prevention means may be constructed, for example, by forming the cover wall of the retainer in a generally square cylindrical shape encircling the end portion of the inflator with the gas discharge ports, and providing the cover wall with through portions penetrating the cover wall at the four corners thereof.

If the cover wall has a generally square cylindrical shape encircling the inflator, the mist is likely to gather to form mist agglomerates at the four corners. With the above construction, however, even if the mist gathers in the corners, it is blown off the through portions before forming agglomerates, and does not form big mist agglomerates.

The width of the through portion is desirably 5 to 15 mm, and the length is desirably 10 to 15 mm. If the width is under 5 mm, it is difficult for the mist to go out of the cover wall, and if it is over 15 mm, it is difficult for the mist to adhere to the cover wall. If the length is under 10 mm, it is difficult for the mist to go out of the cover wall, and if it is over 15 mm, it is difficult for the mist to adhere to the cover wall.

The mist growth prevention means maybe provided by forming numbers of through holes in the cover wall of the retainer. With this construction, the mist from the gas discharge ports goes out of the through holes before growing, or adheres to the peripheral edge of the through holes in the cover wall. The mist adhered to the peripheral edge of the through holes is prevented from forming mist agglomerates since the mist continues to flow out of the through hole sand little mist follows to adhere thereto.

Even if it grows to form mist agglomerates, the agglomerates are likely to adhere to the inner circumference of the through holes which are great in number, and the agglomerates are hardly blown off into the airbag.

The internal diameter of the through holes is desirably 1 to 3 mm, and the pitch of forming the through holes is desirably 5 to 10 mm. If the internal diameter is under 1 mm, it is difficult for the mist to go out of the cover wall, and if it is over 3 mm, it is difficult for the mist to adhere to the cover wall. If the pitch is under 5 mm, it is difficult for the mist to adhere to the cover wall, and if it is over 10 mm, it is difficult for the mist to go out of the cover wall.

The mist growth prevention means may be alternatively formed by constructing the cover wall by a plurality of tongue pieces arranged separately from one another so as to confront the gas discharge ports of the inflator. With this construction, the mist from the individual gas discharge ports adheres to the tongue piece covering the respective gas discharge port. The mist from other gas discharge ports than the confronting port hardly adheres to the respective tongue piece. Accordingly, the forming of mist agglomerates is prevented. Moreover, the tongue pieces are provided with spaces in between the neighboring tongue pieces, and great deal of the inflation gas from the gas discharge ports flows toward the spaces. Therefore, the mist adhered to the individual tongue pieces is likely to be blown off toward the spaces between the tongue pieces before growing to form mist agglomerates.

In this case, the smallest clearance between the gas discharge port and the cover wall is desirably set within the range of 8 to 20 mm. If the clearance is under 8 mm, the cover wall is prone to be deformed, thereby making difficult for the mist to adhere thereon. Even if the cover wall is not deformed, the pressure loss of the gas is increased, so that it takes more time to inflate the airbag completely. If the clearance is over 20 mm, it is too far for the mist to adhere to the cover wall, so that the meaning of providing the cover wall is lost.

In the case the mist growth prevention means is constructed by the through portion, the through holes, or the tongue pieces, it is desired that the airbag is provided at the opening peripheral edge with a protection cloth arranged in the inner side of the base cloth constituting the bag shape of the airbag for the protection of the base cloth. The protection cloth is arranged up to the area over the vicinity of the leading end of the cover wall of the retainer in the completely inflated airbag. With this construction, even if the mist flows out of the cover wall through the aforementioned through portion, the through holes, or the spaces between the tongue pieces toward the part of the airbag neighboring the opening peripheral edge, it adheres to the protection cloth arranged in the inner side of the base cloth. Therefore, the mist is prevented from adhering to the base cloth constituting the bag shape, or the outer shape of the airbag.

The inflator includes a flange having a plurality of recesses and retaining pawls. The retainer includes a plurality of bolts. The airbag and the inflator are secured to the bottom wall of the case by inserting the bolts of the retainer through the opening peripheral edge of the airbag, the bottom wall of the case, and the recesses of the inflator and fastening them into nuts, and by inserting the retaining pawls of the inflator through the bottom wall of the case to retain the opening peripheral edge of the airbag. With this construction, the number of the bolts used is reduced compared with the case of attaching the airbag and the inflator to the bottom wall of the case only by the bolts of the retainer, which makes the detachment of the inflator easier in scrapping.

BRIEF DESCRIPTION OF DRAWINGS

FIG. 9 illustrates the manufacturing process of the airbag employed in the first embodiment.

DESCRIPTION OF THE PREFERRED EMBODIMENTS

Figure 1:
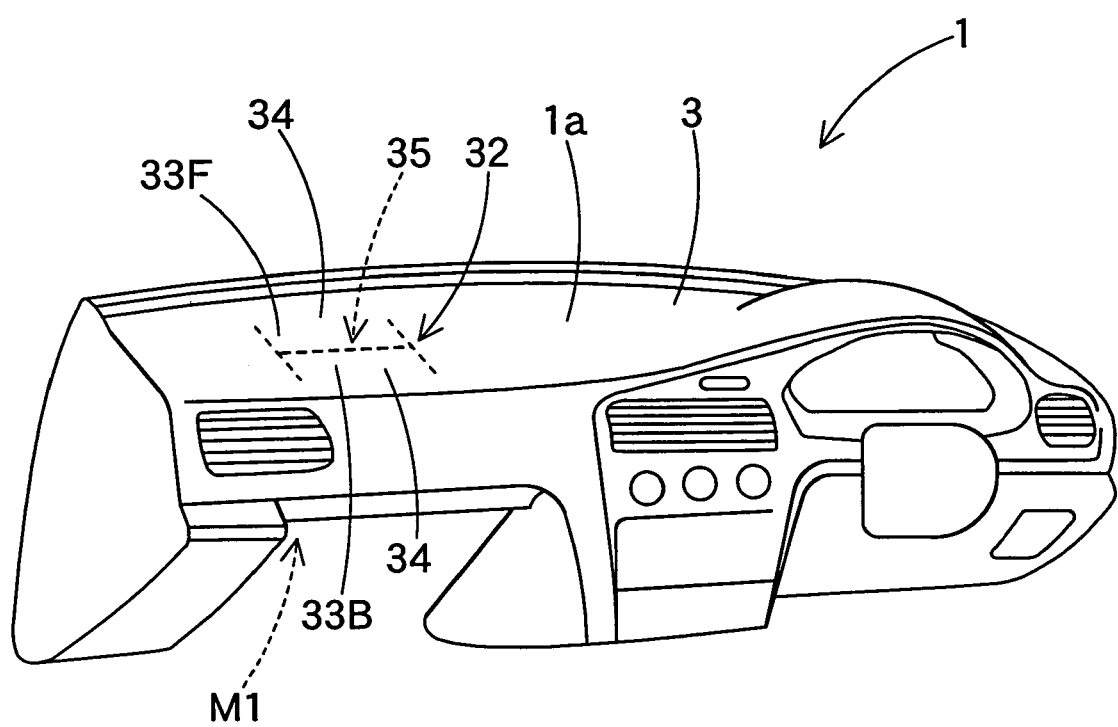
FIG. 1 is a perspective view of the dashboard on which an airbag device for front passenger's seat of the first embodiment according to the present invention is mounted.

The invention will be described below by way of embodiments shown in the drawings. In addition, the invention is not limited to the embodiments. All modifications within the requirements of the claims and equivalents with respect to the requirements should be included in the scope of the claims.

Figure 2:
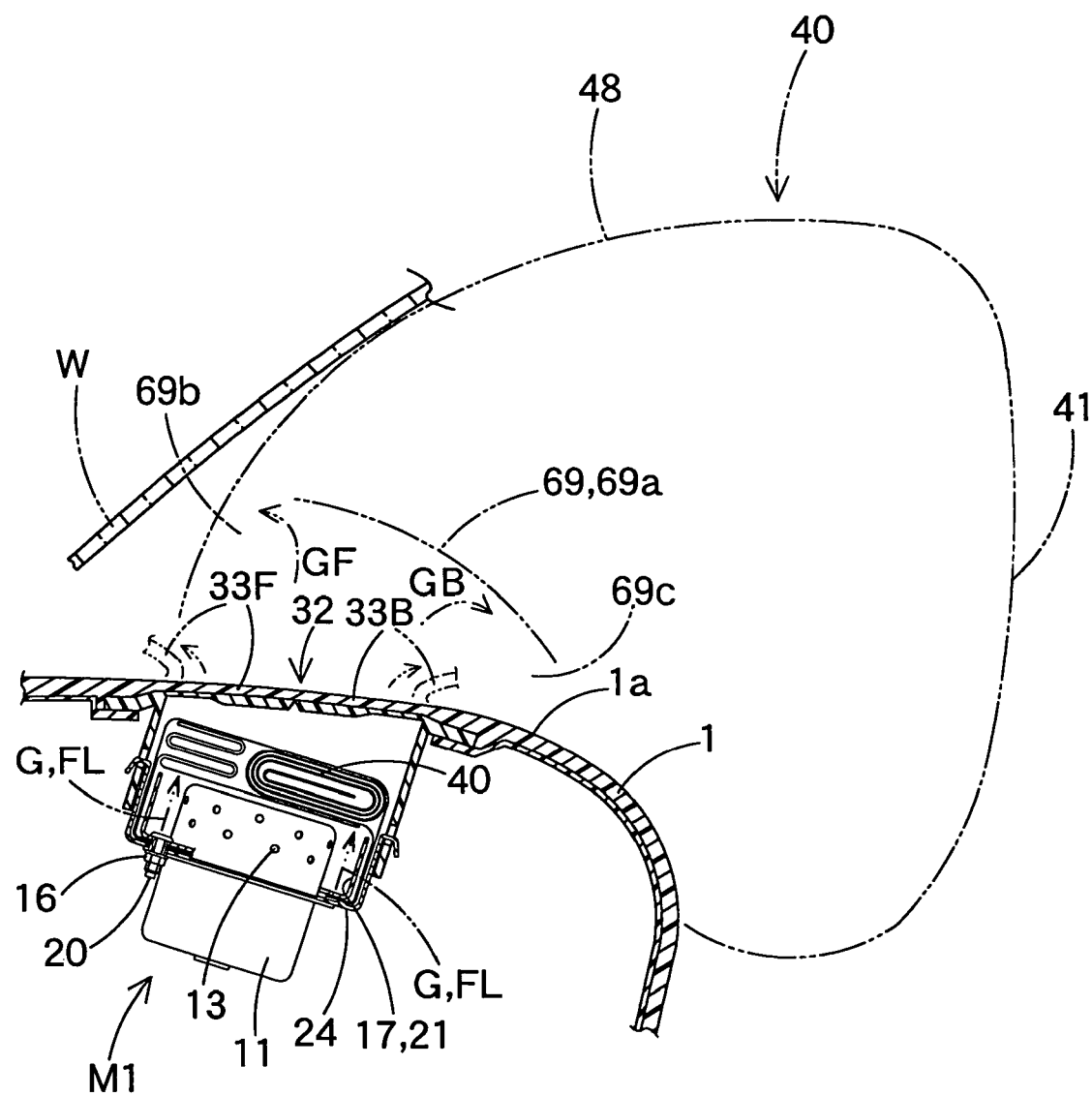
FIG. 2 is a schematic section of the first embodiment in deployment along the vehicle's longitudinal direction.

FIGS. 1 and 2 illustrate a first embodiment of the airbag device M1 for front passenger's seat of a top-mount type, which is arranged inside of the top surface 1a of a dashboard (or an instrument panel) 1. This airbag device M1 includes an airbag 40 folded, an inflator 11 for supplying the airbag 40 with inflation gas, a case 24 for housing and holding the airbag 40 and the inflator 11, a retainer 17 for attaching the airbag 40 to the case 24, and an airbag cover 32 for covering the folded airbag 40.

As shown in FIGS. 1 to 4, the airbag cover 32 is integral with the dashboard 1, in the first embodiment. The dashboard 1 includes a base 2 on the back surface side and a coating layer 3 covering the outer surface of the base 2. The base 2 is made of hard synthetic resin such as polypropylene, and the coating layer 3 has a foamed layer of foamable polyurethane or the like, and a skin layer. At the portion of the airbag cover 32, there is arranged a soft portion 4 made of soft synthetic resin such as thermo-plastic elastomer of polyolefine or the like, instead of the base 2. The airbag cover 32 includes two doors 33F and 33B respectively provided with a weakened breakable portion 35 therearound. As shown in FIG. 1, the breakable portion 35 is arranged in an H-shape as viewed from above the dashboard 1. The two doors 33F and 33B open toward the front and rear sides, respectively, around their upper or lower ends as the hinges 34.

The airbag cover 32 further includes a joint wall portion 36 projected downward from the back surface to encircle the arrangement position of the doors 33F and 33B, and having a generally square cylindrical shape. The joint wall portion 36 includes the walls 36a and 36b confronting each other in the front and rear direction, and the walls 36a and 36b are provided with a plurality of retaining holes 37 at predetermined positions thereof. Retaining pawls 30 of the case 24 are inserted into these retaining holes 37 so as to retain the joint wall portion 36. This retention of the joint wall portion 36 by the retaining pawls 30 secures the connection of the joint wall portion 36 and the case 24, and help the airbag 40 inflated to push up the doors 33F and 33B and break the breakable portion 35.

Here in the first embodiment, the soft portion 4 is arranged on the back side of the doors 33F and 33B of the airbag cover 32, and on the back side of the dashboard 1 in the vicinity of the hinges 34 of the doors 33F and 33B, at both front and rear sides of the joint wall portion 36. Moreover, the joint wall portion 36 itself is formed of the soft portion 4.

As shown in FIGS. 2 to 5, the case 24 is made of a sheet metal into a generally rectangular parallelpiped shape, and has a rectangular opening 24a at the upper side. The case 24 includes a bottom wall 25 of a rectangular plate shape, and a side wall 29 extended upward toward the airbag cover 32 from the outer circumferential edge of the bottom wall 25 to have a generally square cylindrical shape. The bottom wall 25 has a rectangular plate shape elongated in the left and right direction, and has in its center a generally round insert hole 26 for inserting the upper portion 12a of the inflator 11 from the lower side toward the airbag cover 32. In the periphery of the insert hole 26 of the bottom wall 25, there are formed mounting holes 27 for inserting through the bolts 20 of the retainer 17. The bottom wall 25 is further provided on the lower surface thereof and at the left and right sides with brackets 28 for securing the case 24 to the vehicular body 6. Each of the brackets 28 is provided with a nut 28a for fastening a bolt 9. On the side of the body 6, brackets 8 are extended from the reinforcement 7, and the bolt 9 is inserted through the mounting seat 8a of the bracket 8 and fastened into the nut 28a. By fastening the bolts 9 into the nuts 28a, the case 24, or the airbag device M1 is secured to the body 6.

In the periphery of the insert hole 26 of the bottom wall 25, there is formed a rib 25a protruded upward and encircling the insert hole 26. When the later-described base 18 of the retainer 17 is pressed on the bottom wall 25, the rib 25a abuts against the lower surface of the base 18, and helps improve the sealing property of the bottom wall 25 and the airbag 40 in the periphery 51 of the gas inlet port 50 (refer to FIG. 4).

The side wall 29 of the case 24 is provided at the vehicle's front and rear upper ends thereof with a plurality of retaining pawls 30 turned outward and downward. As described above, the retaining pawls 30 are inserted into the retaining holes 37 of the joint wall portion 36 of the airbag cover 32 so as to retain the joint wall portion 36.

Figure 20:
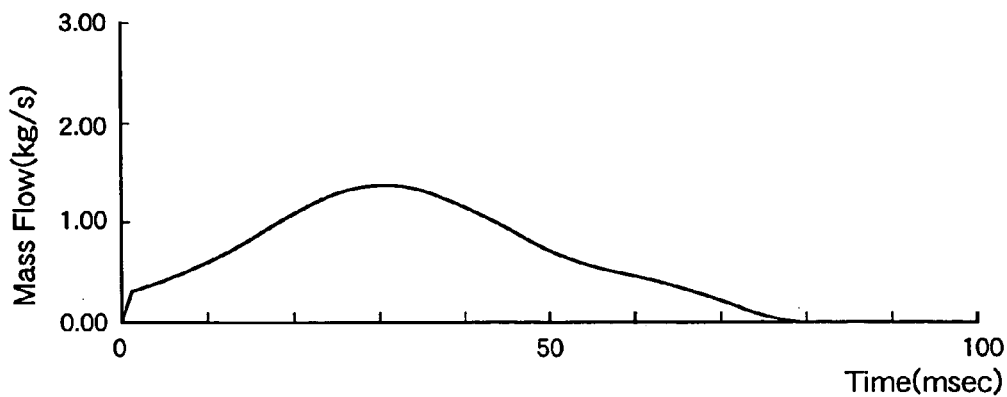
FIG. 20 is a graph showing the mass flow curve of the inflator employed in the first embodiment.

The inflator 11 is a pyro-type inflator, which generates inflation gas by burning reaction of a predetermined gas generating material, for example, a gas generating material composition containing by weight of the material 34% nitroguanidine, 50% nitrate strontium, 9% sodium salt of carboxymethylcellulose, and 7% acid clay. As shown in FIGS. 2 to 6, the inflator 11 is a disc-type including a body 12 of a generally cylindrical shape. Moreover, the inflator 11 is a long mass flow type drawing a mass flow curve as shown in FIG. 20. In the inflator 11 in the first embodiment, although the mass flow rate of the inflation gas is small right after the ignition, it increases from 30 msec after ignition on, compared with a conventional inflator, as shown in FIG. 20. Therefore, the airbag 40 inflated by the inflation gas from the inflator 11 is able to protect a passenger in the front passenger's seat properly.

The inflator 11 includes a body 12 and a flange 14 for attaching the inflator 11 to the case 24. The body 12 is charged with such a predetermined amount of gas generating material as to generate 2.4 mol of combustion gas. The flange 14 is projected from the outer circumference of the body 12 in a generally square annular shape (or in a generally square plate shape), and is provided at its four corners with mounting holes 15 punched out. The individual mounting holes 15 are placed in the positions corresponding to the individual mounting holes 27 of the bottom wall 25 of the case 24. Each of the mounting holes 15 has the same internal diameter as that of the mounting hole 27.

The body 12 has a cylindrical shape whose outer diameter is slightly smaller than the internal diameter of the insert hole 26 of the bottom wall 25. The body 12 is provided on the outer circumferential side 12b of the upper body 12a above the flange 14 with a plurality of gas discharge ports 13 for discharging the inflation gas G. In the first embodiment, the gas discharge ports 13 are arranged in a zigzag manner in the outer circumferential side 12b of the upper body 12a closer to the top surface 12c.

As shown in FIGS. 2 to 5, the retainer 17 is formed of a sheet metal, and includes a base 18 and a cover wall 21. The base 18 has an insert hole 19 opened generally in the same shape as the insert hole 26 of the case 24. The cover wall 21 extends up toward the airbag cover 32 from the outer peripheral edge of the base 18 in a generally square cylindrical shape.

The base 18 has a generally square outline, and is provided at its four corners 18b with bolts 20 extended downward. When the retainer 17 is arranged within the airbag 40, the individual bolts 20 are inserted into the mounting holes 52 of the airbag 40, the mounting holes 27 of the bottom wall 25 of the case 24, and the mounting holes 15 of the flange 14 of the inflator 11, and are fastened into the nuts 16. Thus the airbag 40 and the inflator 11 are attached to the bottom wall 25 of the case 24. In other words, when the bolts 20 are fastened into the nuts 16, the peripheral edge 51 of the gas inlet port 50 of the airbag 40 is pressed onto the bottom wall 25 by the base 18, thereby attaching the airbag 40 to the bottom wall 25, while the flange 14 of the inflator 11 is pressed onto the periphery of the insert hole 26, thereby attaching the inflator 11 to the bottom wall 25.

The cover wall 21 of the retainer 17 is constructed to cover the gas discharge ports 13 of the inflator 11. The leading end 21a of the cover wall 21 is extended upward up to the same level as the top surface 12c of the inflator 11. The leading end 21a is arranged only at the straight portion 18a of the outer edge of the base 18. More specifically, at the corners 18b of the outer peripheral edge of the base 18 where the bolts 20 are arranged, there are arranged recesses 22 to separate the upper end 21a of the cover wall 21.

These recesses 22 are arranged to regulate the amount of the inflation gas G flowing toward the airbag cover 32. In other words, the recesses 22 are arranged to send a small amount of the inflation gas G out of the cover wall 21 therethrough to regulate the amount of the inflation gas G flowing toward the airbag cover 32, and to constitute the later-described mist growth prevention means B1 as well.

Here, the retainer 17 is formed by punching the insert hole 19, mounting holes for the bolts 20, and the recesses 22 in a sheet metal, by drawing it to form the base 18 and the cover wall 21, and by assembling the bolts 20.

Figure 6:
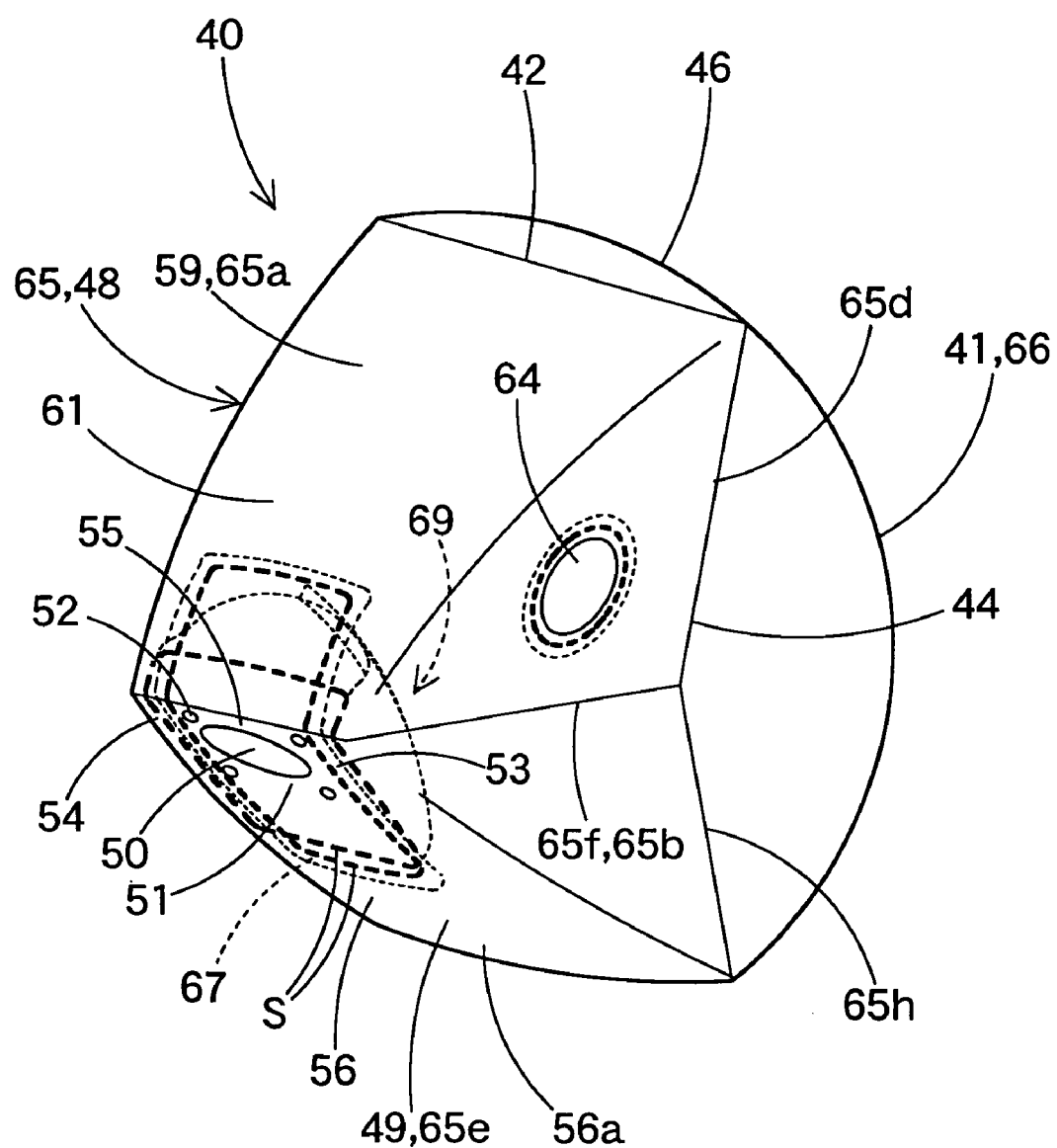
FIG. 6 is a perspective view of the airbag employed in the first embodiment in solitarily inflated state.
Figure 7:
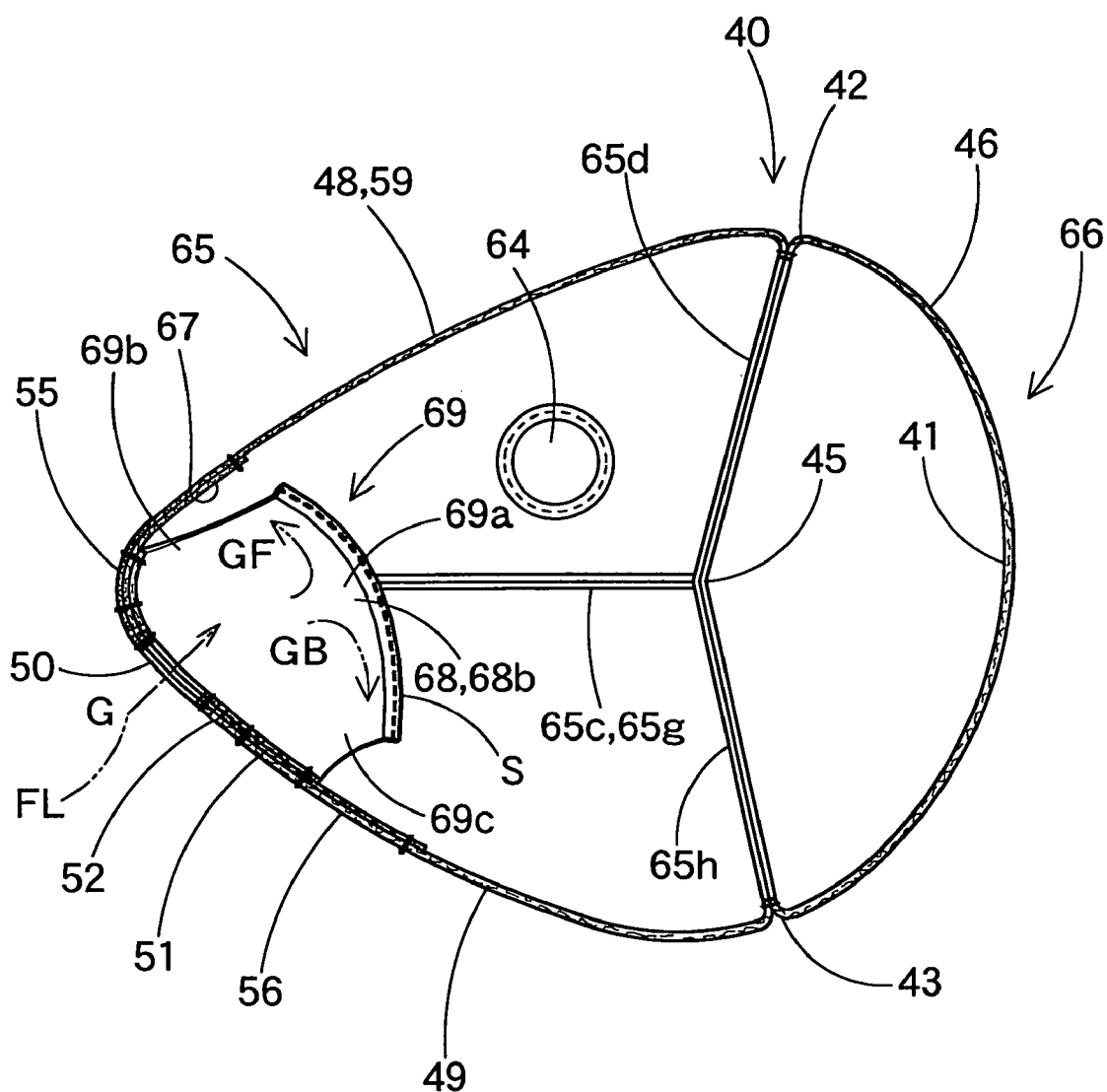
FIG. 7 is a sectional view of the airbag employed in the first embodiment in solitarily inflated state along the vehicle's longitudinal direction.

As shown in FIGS. 6 and 7, the airbag 40 has, as its shape completely expanded and inflated, a passenger's side wall 41 to be arranged generally in the vertical direction and closer to the passenger, and a side wall portion 48 extended toward the vehicle's front side from the outer peripheral edge of the passenger's side wall 41 while narrowing like a generally conical shape. A gas inlet port 50 opened in a round shape is arranged to introduce the inflation gas G into the airbag 40 (refer to FIG. 7) in the front side of the lower side wall 49 of the side wall portion 48 to be positioned at the lower side when completely expanded and inflated.

In the first embodiment, the capacity of the airbag 40 is 110l when completely inflated.

Internally, the airbag 40 is provided with a commutator cloth 69 covering the gas inlet port 50 for redirecting the flow of the flowing-in inflation gas G. As shown in FIG. 2, the vicinity of the transverse center 69*a* of the commutator cloth 69 and a part of front and rear openings 69*b* and 69*c* of the commutator cloth 69 are disposed above the top surface 1*a* of the dashboard 1 when the airbag 40 is inflated.

In the periphery 51 of the gas inlet port 50, there are formed four mounting holes 52. The bolts 20 of the retainer are inserted into the mounting holes 52, so that the airbag 40 is fixed to the bottom wall 25 of the case 24. In the left and right sides of the side wall portion 48, a vent hole 64 is provided to emit extra inflation gas, respectively. The airbag 40 is further provided internally near the mounting holes 52 in the periphery of the gas inlet port 50 with a reinforcing cloth 67 having a generally square annular shape.

Figure 19:
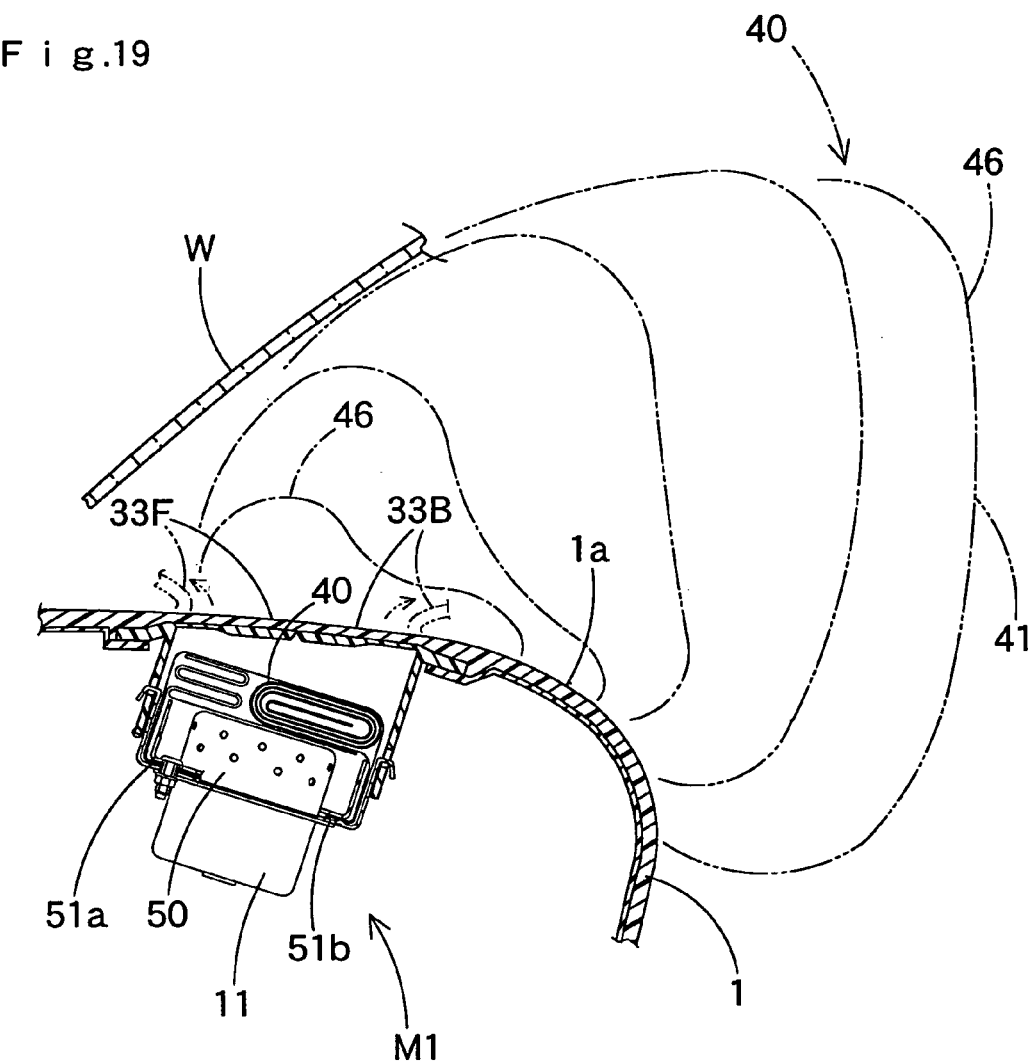
FIG. 19 illustrates the deployment of the first embodiment as viewed from the vehicle's side.

When the airbag device M1 is mounted on the vehicle by fixing the airbag 40 to the case bottom wall 25 by the retainer 17, and by securing the case 24 to the body 6, the front edge 51*a* of the opening peripheral edge 51 is positioned slightly higher than the rear edge 51*b*, so that the opening face of the gas inlet port 50 is arranged generally horizontally together with the opening peripheral edge 51 (refer to FIG. 19).

Figure 8:
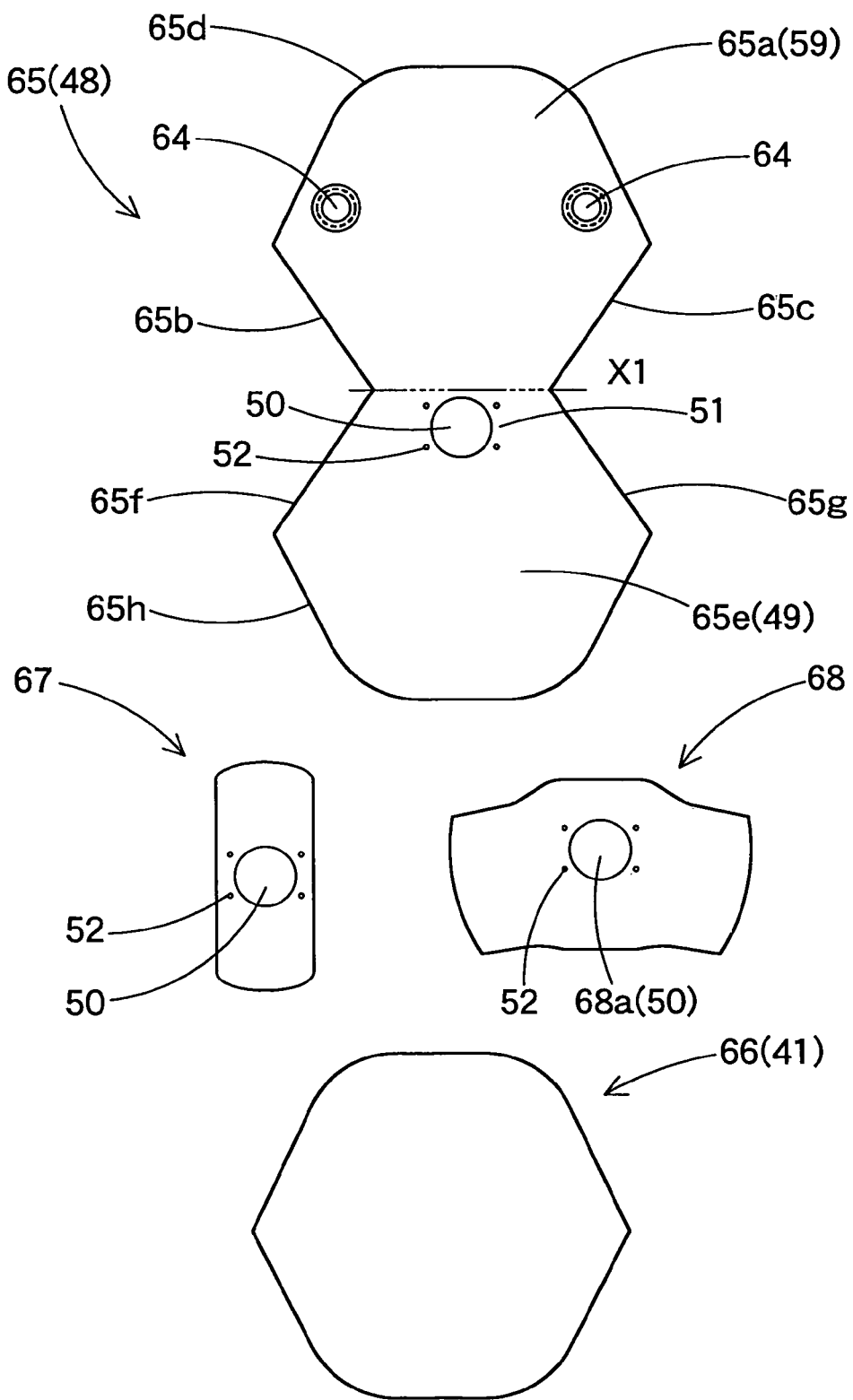
FIG. 8 shows the plane views of the components of the airbag employed in the first embodiment.
Figure 10:
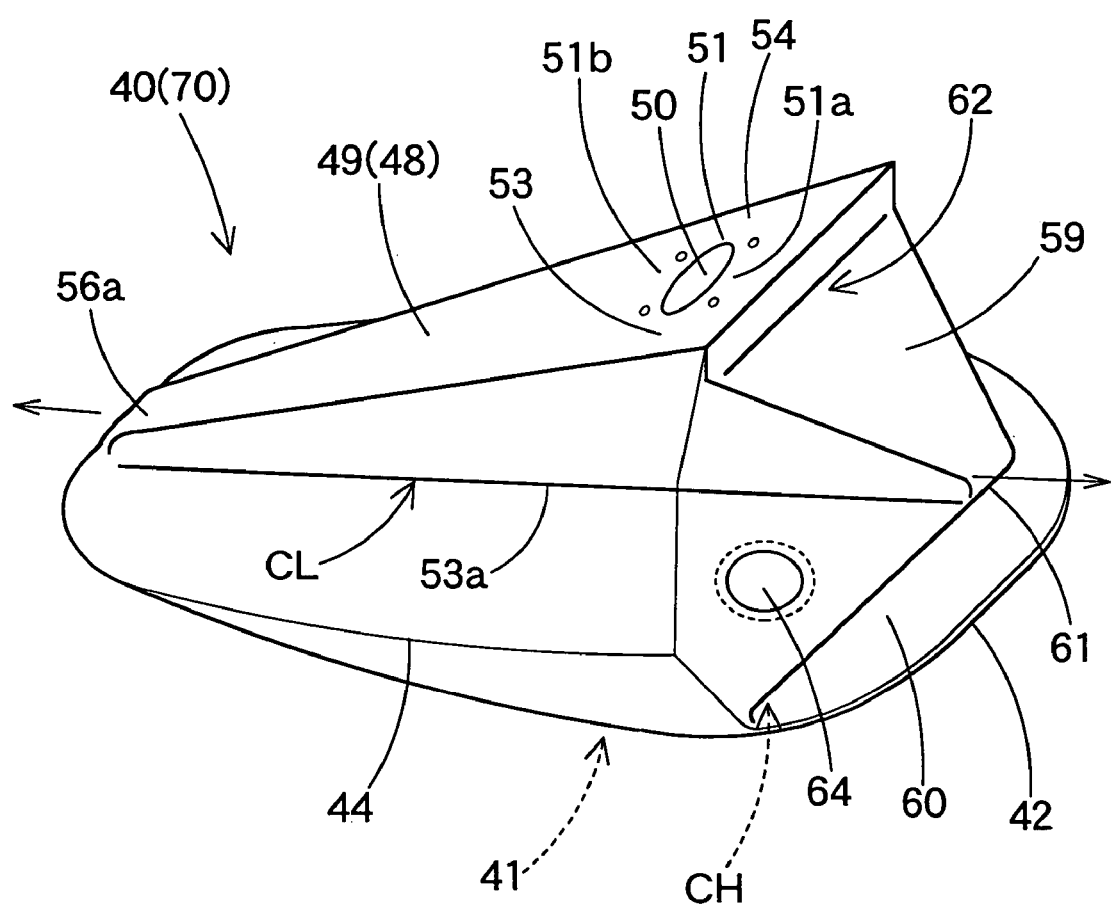
FIG. 10 is a perspective view showing the folds of the airbag employed in the first embodiment in the preliminary folding.

As shown in FIGS. 8 and 9, the airbag 40 is formed by sewing up two base cloths, i.e., the first base cloth 65 and the second base cloth 66. The first base cloth 65 is shaped to be a combination of two generally hexagonal portions, i.e., the upper portion 65*a* and the lower portion 65*e*, and resultingly has a gourd-shape having the left and right edge at the longitudinal center recessed. The second base cloth 66 has a generally round shape approximate to a generally hexagonal shape. These planar base cloths 65 and 66 are constructed to provide the solid airbag 40 by sewing work.

The second base cloth 66 constitutes the generally entire area of the passenger's side wall 41 of the airbag 40, whereas the first base cloth 65 constitutes the generally entire area of the side wall portion 48 of the airbag 40. Moreover, the upper portion 65*a* of the first base cloth 65 constitutes the generally entire area of the upper side wall 59 of the side wall portion 48, whereas the lower portion 65*e* of the first base cloth 65 constitutes the generally entire area of the lower side wall 49 of the side wall portion 48.

The first and second base cloths 65 and 66, the reinforcing cloth 67 and the commutator cloth 69 are formed of a woven fabric of polyester, polyamide yarn or the like without silicon coating or the like.

In the first embodiment, the first and second base cloths 65 and 66 are plain weaved with 420 denier long and multifilament yarn of polyamide, at the weave density of 56 warp yarn ×55 weft yarn per square inch. The gas permeability rate of the first and second base cloths 65 and 66 is 0.69 l/cm$^2$/min which is under 1.0 l/cm$^2$/min at 20 kPa air pressure, and its weight is 220 g/m$^2$ which is under 230 g/m$^2$.

As shown in FIGS. 6 and 7, the commutator cloth 69 is larger than the longitudinal and transverse dimensions of the gas inlet port 50 so as to cover the gas inlet port 50 within the airbag 40. Its longitudinal section upon the expansion of the airbag 40 is arcuate bulging upward away from the gas inlet port 50.

In the first embodiment, as shown in FIGS. 8 and 9, the commutator cloth 69 is prepared as a commutator cloth material 68 before the attachment to the airbag 40. The commutator cloth material 68 has an opening 68*a* corresponding to the gas inlet port 50 and band portions 68*b* and 68*b* extending from the vehicle's left and right sides of the opening 68*a*. The commutator cloth 69 is formed by sewing up the leading ends of the band portions 68*b* and 68*b*. The commutator cloth material 68 further includes mounting holes corresponding to the mounting holes 52.

To manufacture the airbag 40, as shown in FIGS. 8 and 9A, the reinforcing cloth 67 and the commutator cloth material 68 are firstly stitched to the to-be inner side of the first base cloth 65 at the opening peripheral edge 51 of the gas inlet port 50 by the stitching yarn S. As shown in FIG. 9B, subsequently, the leading ends of the band portions 68*b* of the commutator cloth material 68 are stitched up together in an arcuate manner by the stitching yarn S, thereby to form the commutator cloth 69.

In the first embodiment, the first base cloth 65 has been provided with the vent holes 64, the gas inlet port 50 and the mounting holes 52 in advance, while the commutator cloth material 68 and the reinforcing cloth 67 have been provided with the gas inlet port 50 (or 68*a*) and the mounting holes 52 in advance. However, the vent holes 64, the gas inlet port 50 and the mounting holes 52 may be made after the reinforcing cloth 67 and the commutator cloth material 68 are stitched to the first base cloth 65.

As shown in FIGS. 9B and 9C, thereafter, the first base cloth 65 is folded back on the first base line X1 extending in the transverse direction between the upper portion 65*a* and the lower portion 65*e*. Then the straight edges 65*b* and 65*f* of the upper and lower portions 65*a* and 65*b*, respectively, near the first base line X1 are stitched up together, and the other straight edges 65*c* and 65*g* are stitched up together, too.

Subsequently as shown in FIGS. 9C and 9D, the upper portion 65*a* is folded back on the second base line X2 extending between the portions projected in the transverse directions, so that the unstitched peripheral edges 65*d* and 65*h* of the upper and lower portions 65*a* and 65*e* are separated and developed flatly. The outer shape in this expanded state is the same as the outer shape of the second base cloth 66.

Then as shown in FIGS. 9D and 9E, the second base cloth 66 is applied hereon, and the individual outer peripheral edges are stitched up by the stitching yarn S. Thus the airbag 40 is formed into a bag shape so that the stitch margin may not appear on the outer surface.

Thereafter, the airbag 40 is reversed inside out utilizing the gas inlet port 50.

If it is difficult to reverse the airbag 40 from the gas inlet port 50 because of the presence of the commutator cloth 69, the ends of the band portions 68*b* of the commutator cloth material 68 may be stitched after the reverse of the airbag 40 by pulling out the band portions 68*b* from the gas inlet port 50.

The mounting of the airbag 40 thus manufactured on the vehicle is started by placing the retainer 17 inside of the airbag 40 so that the bolts 20 may be protruded from the mounting holes 52, and then folding the airbag 40. Then the folded airbag 40 is wrapped by a breakable wrapping sheet 39 (refer to FIG. 3) to keep the folded-up state.

The airbag 40 is folded through the preliminary folding step, and then through the transverse folding step and the vertical folding step.

Figure 11:
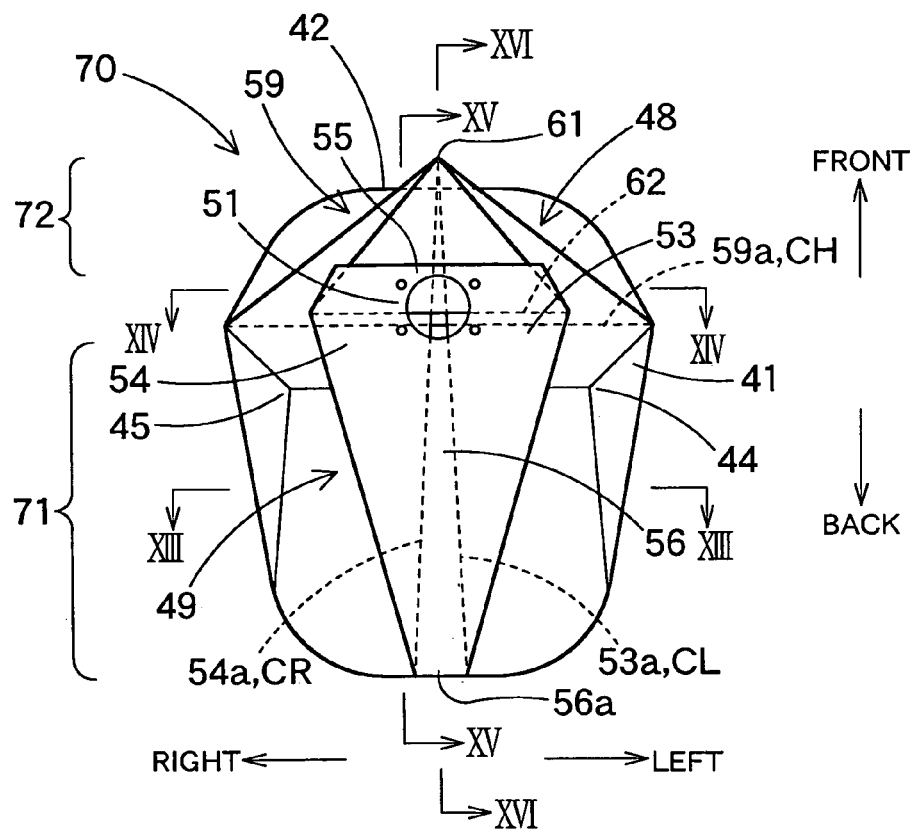
FIG. 11 shows a preliminarily folded airbag of the first embodiment, as viewed from the gas inlet port side.
Figure 12:
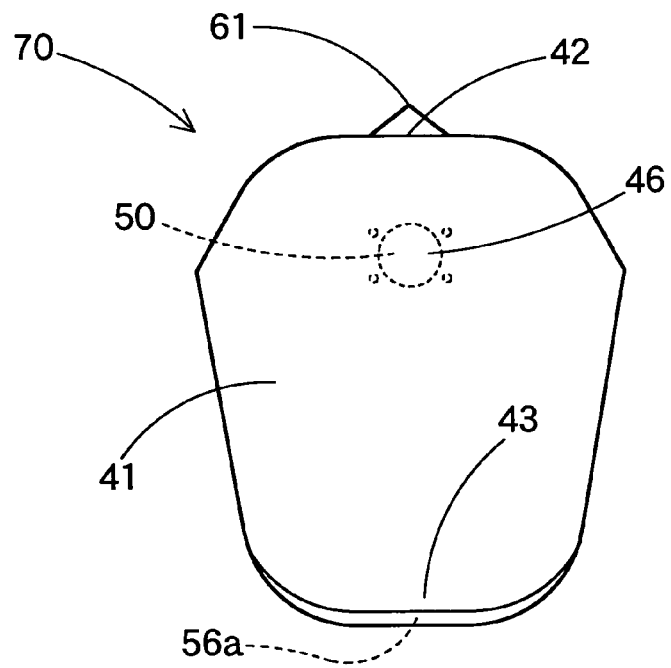
FIG. 12 shows a preliminarily folded airbag of the first embodiment, as viewed from the passenger's side wall side.
Figure 13:
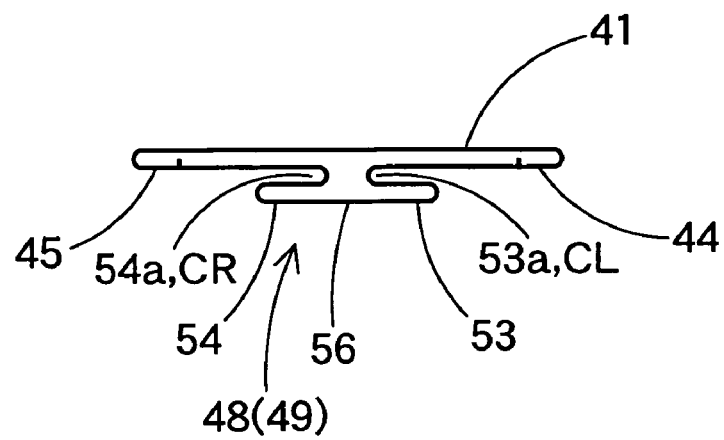
FIG. 13 is an end view taken along the line XIII-XIII of FIG. 11.
Figure 14:
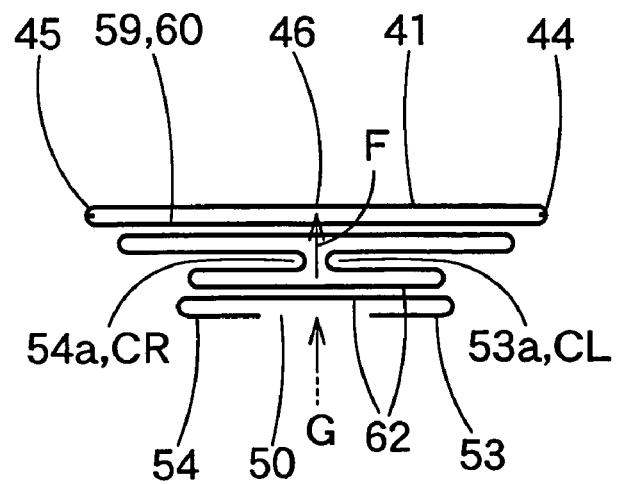
FIG. 14 is an end view taken along the line XIV-XIV of FIG. 11.
Figure 16:
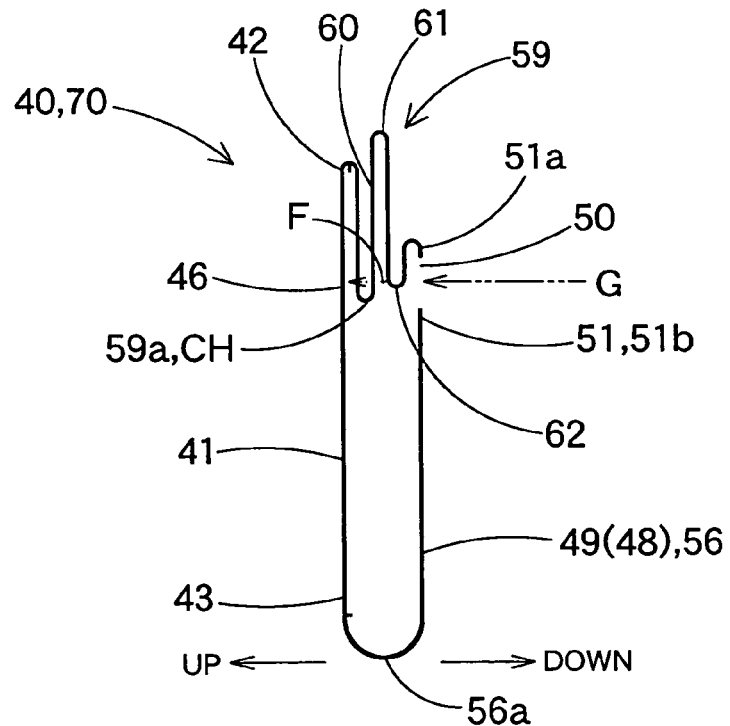
FIG. 16 is an end view taken along the line XVI-XVI of FIG. 11.
Figure 17A:
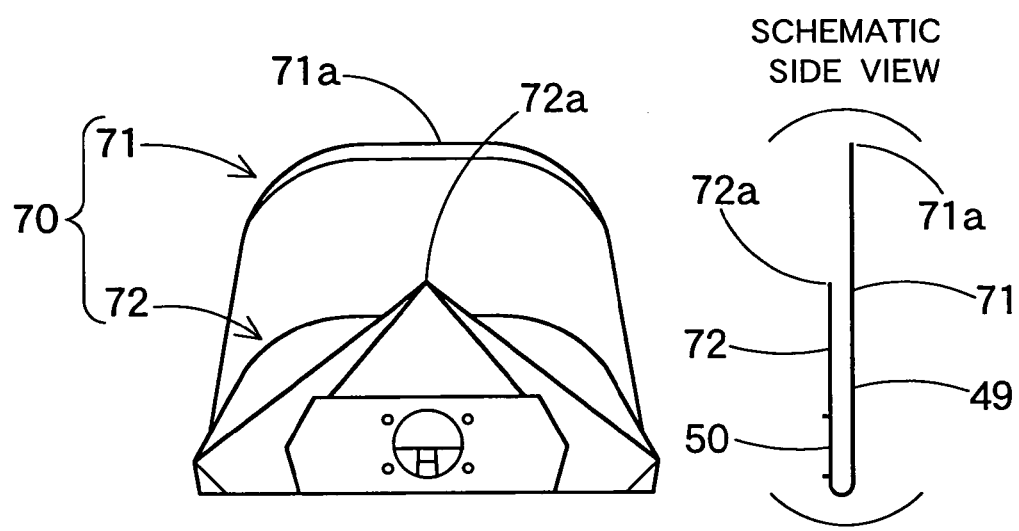
FIG. 17 shows the folding process after the preliminary folding of the airbag employed in the first embodiment.
Figure 17B:
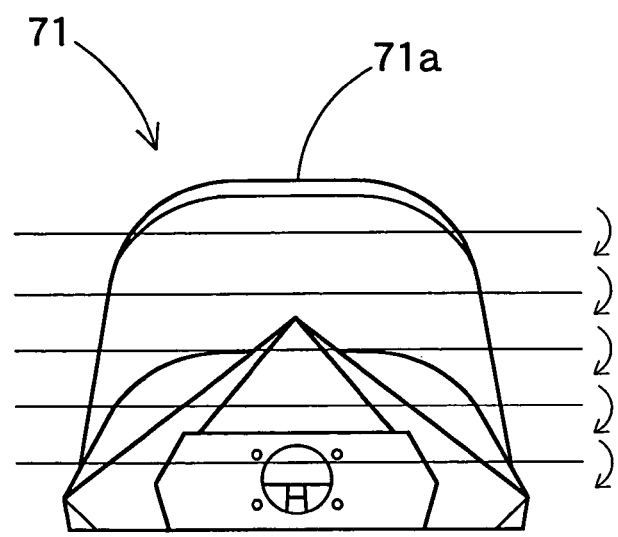

In the preliminary folding step, a preliminarily folded airbag 70 is formed, as shown in FIGS. 11 and 12. In the preliminary folding, the portion 46 near the upper edge 42 of the passenger's side wall 41 is placed over the gas inlet port 50 to confront the gas inlet port 50 in the vertical direction (refer to. FIG. 16), and the remainder of the passenger's side wall 41 is overlaid on the lower side wall 49 of the side wall portion 48 flatly. Further in the first embodiment, the side wall portion 48 is so preliminarily folded that the generally entire area of the passenger's side wall 41 may remain flat except the vicinities of the left edge 44 and the right edge 45.

Figure 15:
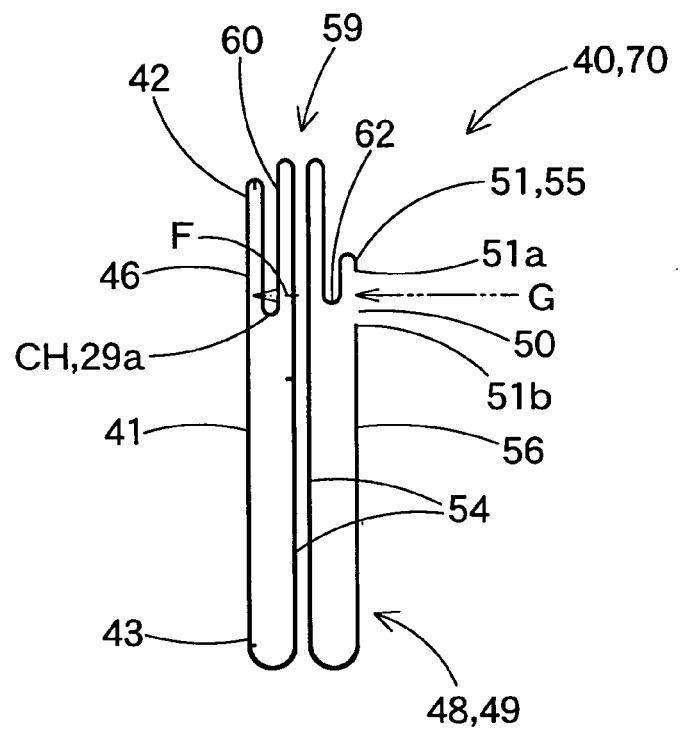
FIG. 15 is an end view taken along the line XV-XV of FIG. 11.

FIGS. 10 to 16 illustrate the preliminary folding of the side wall portion 48 of the first embodiment. The portions 53 and 54 on the left and right sides of the gas inlet port 50 on the side wall portion 48, and the portion 60 near the joint portion with the passenger's side wall upper edge 42 are folded on valley folds CL, CR and CH, respectively. More specifically, the left portion 53 and the right portion 54 of the gas inlet port 50 are folded so that the generally intermediate portions 53a and 54a to the left and right edges 44 and 45 of the passenger's side wall 41 flatly developed may be brought closer to the gas inlet port 50, i.e., the folds CL and CR may be brought closer to each other, and may be arranged closer to the passenger's side wall 41 with respect to the gas inlet port 50. Then the left and right portions 53 and 54 are folded in on the valley folds CL and CR extending along the longitudinal direction. On the other hand, the portion 60 in the side wall portion 48 near the upper edge 42 is folded so that the generally intermediate portion 59a between the projected top 61 or the front end of the valley folds CL and CR in the upper side wall 59 and the passenger's side wall upper edge 42 may be brought closer to the gas inlet port 50 and placed closer to the passenger's side wall 41 with respect to the gas inlet port 50. Then the portion 60 near the upper edge is folded in on the valley fold CH extending along the transverse direction. As shown in FIGS. 15 and 16, this fold CH is arranged in the front side of the rear edge 51b of the gas inlet port 50.

The preliminary folding can be made by gripping the generally intermediate portion between the transverse center of the front edge side 51a of the gas inlet port 50 in the side wall portion 48 and the transverse center of the passenger's side wall upper edge 42, i.e., the portion to be the projected top 61, and the transverse center 56a of the rear side portion 56 of the gas inlet port 50 in the side wall portion 48, and by pulling the grip portions 61 and 56a in the front and rear directions to separate them from each other. With respect to the grip portion 56a in the rear side portion 56, it is desired to grip the portion as near the passenger's side wall lower edge 43 as possible, so that the generally entire area of the passenger's side wall 41 may remain flat in the preliminary folding.

Here in the first embodiment, the portion 62 in the middle of the front side portion 55 of the gas inlet port 50 and the projected top 61 in the side wall portion 48 is valley-folded toward the gas inlet port 50 so that the opening peripheral edge 51 of the gas inlet port 50 may be flat and parallel to the passenger's side wall 41.

In the preliminarily folded airbag 70 of the first embodiment, the valley folds CH and 62 in the upper side wall 59 positioned at the upper side of the gas inlet port 50 in the side wall portion 48 are arranged at the front side of the rear edge 51b of the gas inlet port 50, as shown in FIGS. 15 and 16. More specifically, in the preliminarily folded airbag 70, the upper side wall 59 is folded and disposed in the front range of the rear edge 51b of the gas inlet port 50.

After the preliminary folding, the transverse folding is applied to the rear side portion 71 and the front side portion 72 of the gas inlet port 50 in the preliminarily folded airbag 70. As shown in FIGS. 11, 17A, 17B, 18A and 18B, the rear side portion 71 and the front side portion 72 are folded on the folds extending in the transverse direction so that the ends 71a and 72a are brought closer to the gas inlet port 50. In the first embodiment, the rear side portion 71 is roll-folded from the rear end 71a on the lower side wall 49, and then folded back on the passenger's side wall 41. The front side portion 72 is folded in a bellows fashion.

Figure 18A:
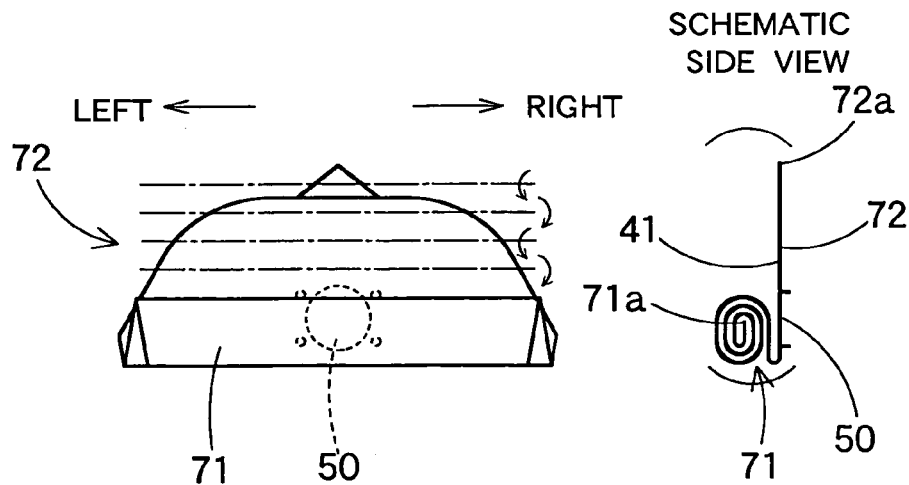
FIG. 18 shows the folding process of the airbag employed in the first embodiment, and shows the step after FIG. 17.
Figure 18B:
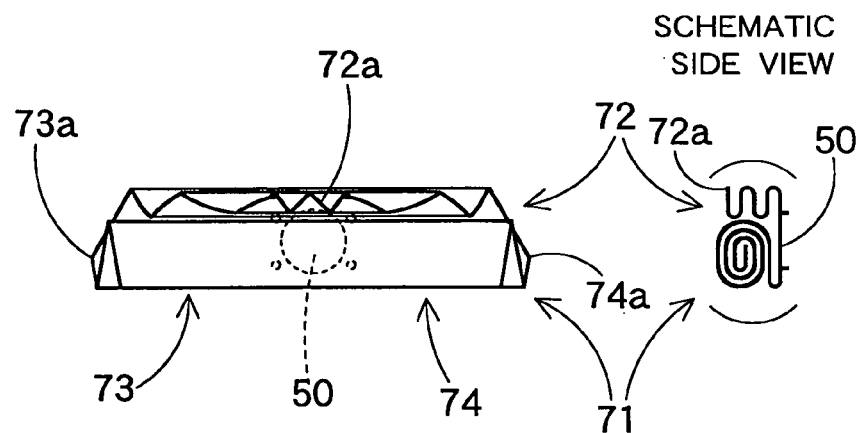
Figure 18C:
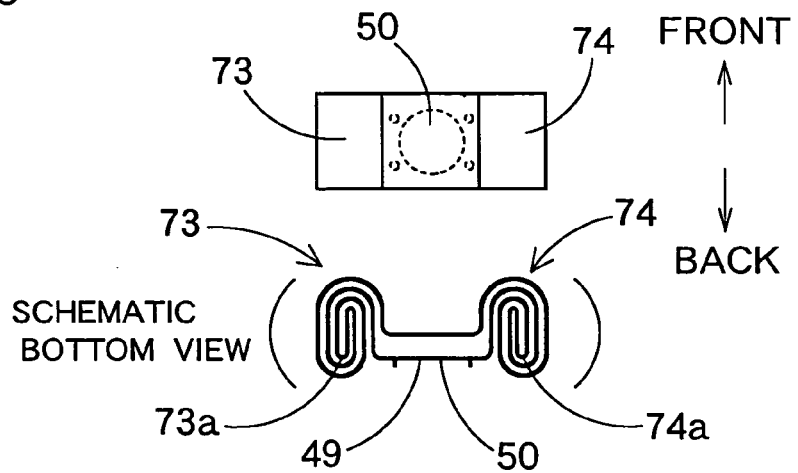

After the transverse folding, the vertical folding is applied to the left side portion 73 and the right side portion 74 of the gas inlet port 50 of the airbag 40 transversely folded. As shown in FIGS. 18B and 18C, the left side portion 73 and the right side portion 74 are folded on the folds extending in the longitudinal direction so that the ends 73a and 74a are brought closer to the gas inlet port 50. In the first embodiment, the left and right side portions 73 and 74 are roll-folded to bring the ends 73a and 74a toward the lower side wall 49.

When the airbag 40 is completely folded through the vertical folding, the folded airbag 40 is wrapped by a breakable wrapping sheet 39 to keep the folded-up state, as described hereinbefore.

Then, the folded airbag 40 is located on the bottom wall 25 of the case 24 from the opening 24a by inserting the individual bolts 20 into the mounting holes 27 from above. Subsequently, the upper portion 12a of the body 12 of the inflator 11 is inserted into the insert hole 26, the gas inlet port 50, and the insert hole 19 from the lower side, and the individual bolts 20 protruded downward from the bottom wall 25 are inserted through the mounting holes 15 of the flange 14 of the inflator 11. Thereafter, the nuts 16 are fastened into the bolts 20 protruded from the flange 14 of the inflator 11. Thus the folded airbag 40 and the inflator 11 are attached to the bottom wall 25 of the case 24.

Thereafter, the side wall 20 of the case 24 is inserted within the joint wall portion 36 of the airbag cover 32 in the dashboard 1 mounted on the vehicle, and the individual retaining pawls 30 of the case 24 are inserted into the retaining holes 37 on the joint wall portion 36. Thus the retaining pawls 30 are retained by the joint wall portion 36. If the bolts 9 are fastened into the nuts 28a of the individual brackets 28 through the mounting seats 8a, the airbag device M1 for front passenger's seat is mounted on the vehicle.

Alternatively, the mounting of the airbag device M1 on the vehicle may be made by assembling the case 24 with the airbag 40 and the inflator 11 to the airbag cover 32 of the dashboard 1, and securing this airbag device M1 to the body 6 with the bolts 9 when attaching the dashboard 1 to the vehicle.

After mounting the airbag device M1 on the vehicle, when the inflation gas G is discharged from the individual gas discharge ports 13 of the inflator 11, the airbag 40 inflates and breaks the wrapping sheet 39. The airbag 40 further breaks the breakable portion 35 and opens the doors 33F and 33B of the airbag cover 32 as indicated by the double-dotted lines in FIGS. 2 and 3, and then protrudes from the opening 38 made by the opening of the doors 33F and 33B.

The airbag 40 thus completes the inflation, and emits the extra gas from the vent holes 64. Here, the reference numeral W in FIG. 2 designates the windshield.

Since the airbag device M1 of the first embodiment employs the inflator 11 of pyro- and long mass flow type, the inflator 11 is compact, and is able to expand and inflate the airbag 40 for front passenger's seat properly.

In the airbag device M1 for front passenger's seat of the first embodiment, the gas permeability rate of the base cloths 65 and 66 constituting the airbag 40 is 0.69 l/cm$^2$/min which is less than 1.0 l/cm$^2$/min at 20 kPa air pressure. Therefore, the gas leakage is prevented when the inflation gas G is introduced into the airbag 40 from the inflator 11, so that the characteristic property of the long mass flow type inflator 11 is most made use of. As a result, the airbag device M1 is able to provide the smooth inflation state of the airbag 40.

If the gas permeability rate of the base cloths 65 and 66 is over 1.0 l/cm$^2$/min at 20 kPa air pressure, the inflation gas G becomes more likely to leak, thereby to lower the reaction force of the airbag 40 occurring from 30 msec after ignition of the inflator 11 on. Then the meaning of employing the long mass flow type inflator 11 is lost.

In the first embodiment, moreover, since the weight of the airbag 40 is 220 g/m$^2$, which is less than 230 g/m$^2$, it contributes to the weight reduction of the airbag 40.

Moreover, the long mass flow type inflator 11 itself is able to contribute to the weight reduction by reducing the discharge amount of the inflation gas G, since the gas permeability rate of the airbag 40 is low. Here, if the weight of the airbag 40 is over 230 g/m$^2$, it cancels the merit of weight reduction.

In the airbag device M1 for front passenger's seat of the first embodiment, therefore, it is able to secure the smooth expansion and inflation of the airbag 40, and to contribute to the weight reduction even if employing an inflator 11 of long mass flow type.

In the first embodiment, especially, the amount of the inflation gas G discharged from the inflator 11 is 2.4 mol, less than 2.8 mol, against the 110l capacity of the airbag 40 completely inflated. Here, when the amount of the gas discharged is 2.4 mol, the gas discharge rate per unit volume of the airbag is 0.022 mol/l, and when the amount discharged is 2.8 mol, the gas discharge rate per unit volume is 0.026 mol/l. Accordingly, the inflator 11 is able to make lighter than a conventional pyro-type inflator discharging 3.2 to 3.5 mol gas against the 110l capacity of the airbag, whose discharge rate per unit volume of the airbag is 0.029 to 0.032 mol/l. Thus the inflator 11 contributes to the weight reduction of the airbag device M1. Of course, the smooth expansion and inflation of the airbag 40 is not hindered even with a compact inflator 11, since the gas leakage from the airbag 40 does not occur.

The inflator 11 of the first embodiment enables 25% weight reduction compared with a conventional pyro-type inflator for an airbag of 110l capacity.

Further in the first embodiment, the airbag 40 is internally provided with the commutator cloth 69 which receives the inflation gas G flowing outward from the inside of the dashboard 1 and changes its flow toward the vehicle's front and rear directions at a position out of the dashboard 1 and within the airbag 40 when the airbag 40 inflates with the inflation gas G.

As indicated by the double-dotted lines in FIG. 2, and as shown in FIG. 7, in this construction, the inflation gas G flowing into the airbag 40 is guided by the commutator cloth 69 toward the directions GF and GB perpendicular to the direction FL at the position out of the dashboard 1, and the inflation gas G is prevented from abutting directly against the inner surface of the airbag 40. In other words, the inflation gas G does not straightly abut the inner surface of the airbag 40 composed of the base cloths 65 and 66 in the direction FL in which the inflation gas G initially flows into the airbag 40. Therefore, the damage to the base cloths 65 and 66 constituting the airbag 40 is reduced, and the gas leakage from the airbag 40 is prevented. As a result, the gas permeability of the airbag 40 mounted on the vehicle is further lowered, thereby promoting the expansion and inflation of the airbag 40.

In the airbag 40 of the first embodiment, moreover, the reinforcing cloth 67 is arranged along the vehicle's front and rear directions so as to confront the openings 69b and 69c of the commutator cloth 69 helping the gas G to flow toward the front and rear sides when the airbag 40 is inflated, as shown in FIG. 7. Thus the inflation gas GF and GB guided by the commutator cloth 69 toward the front and rear directions hardly contact the first base cloth 65 directly, so that the damage to the first base cloth 65 by the inflation gas GF and GB is reduced.

Figure 21:
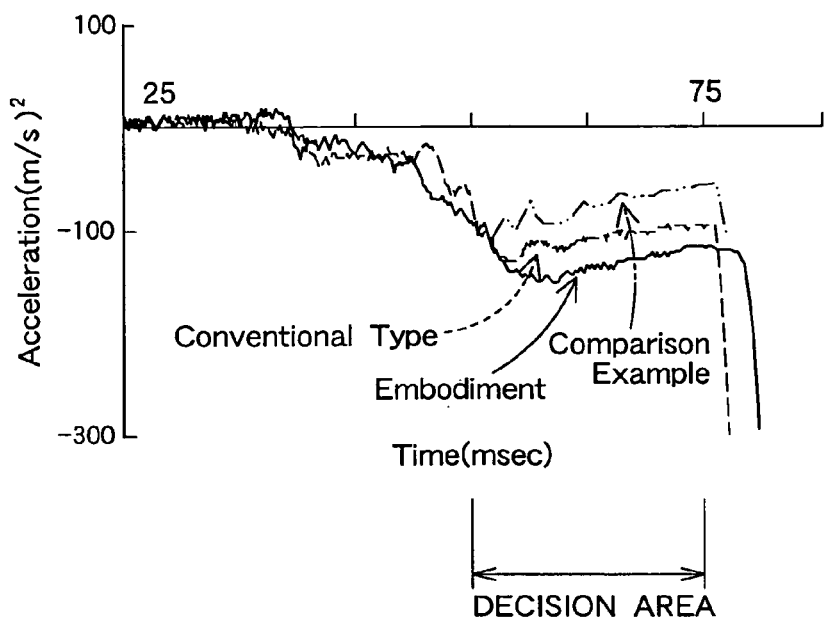
FIG. 21 is a graph showing the result of the frontal collision FRB test according to FMVSS No. 208-66FR65403 effective on May 28, 2003, conducted at 20 to 25 MPH speed to obtain the head deceleration data of the unbelted passenger dummy, for the airbag device of the first embodiment, a conventional type, and a comparison example.
Figure 22:
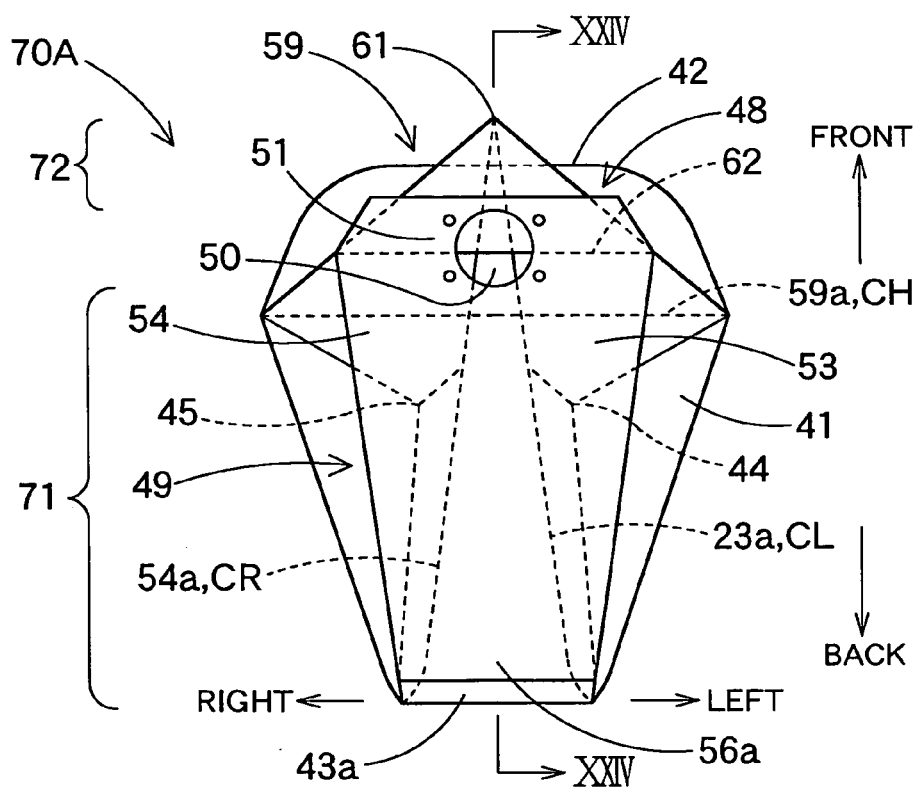
FIG. 22 shows a preliminarily folded airbag of a modification of the first embodiment, as viewed from the gas inlet port side.
Figure 23:
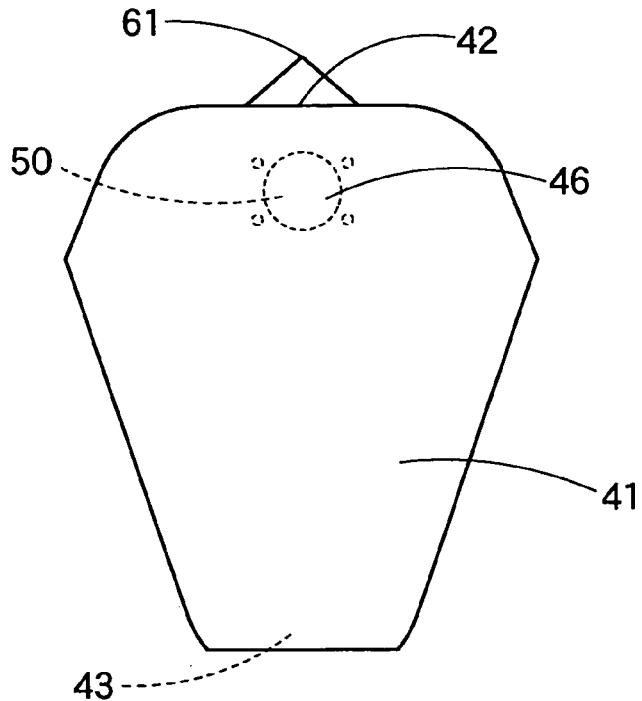
FIG. 23 shows the preliminarily folded airbag in FIG. 22, as viewed from the passenger's side wall side.
Figure 24:
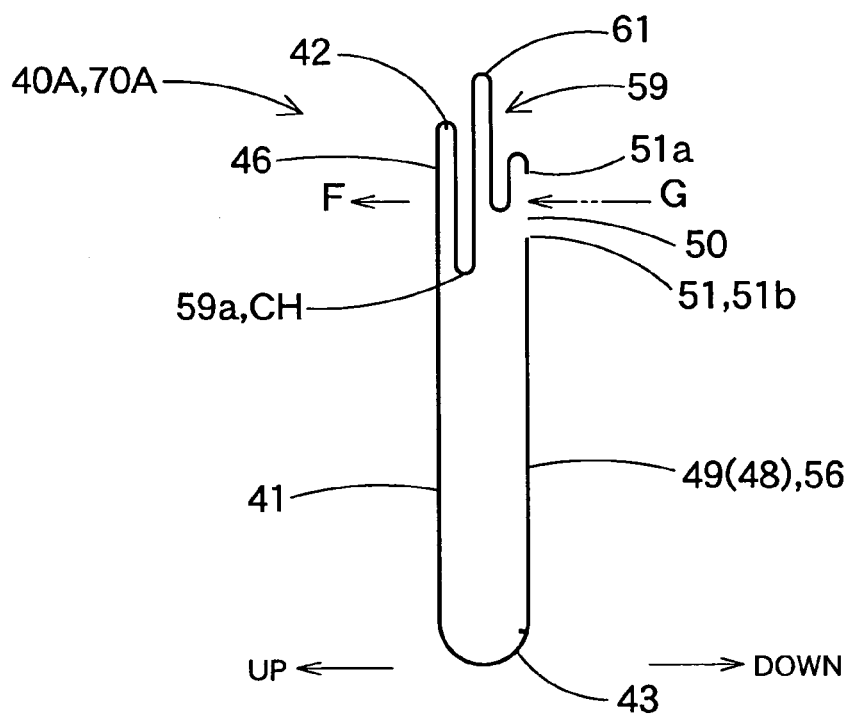
FIG. 24 is an end view taken along the line XXIV-XXIV in FIG. 22.
Figure 25:
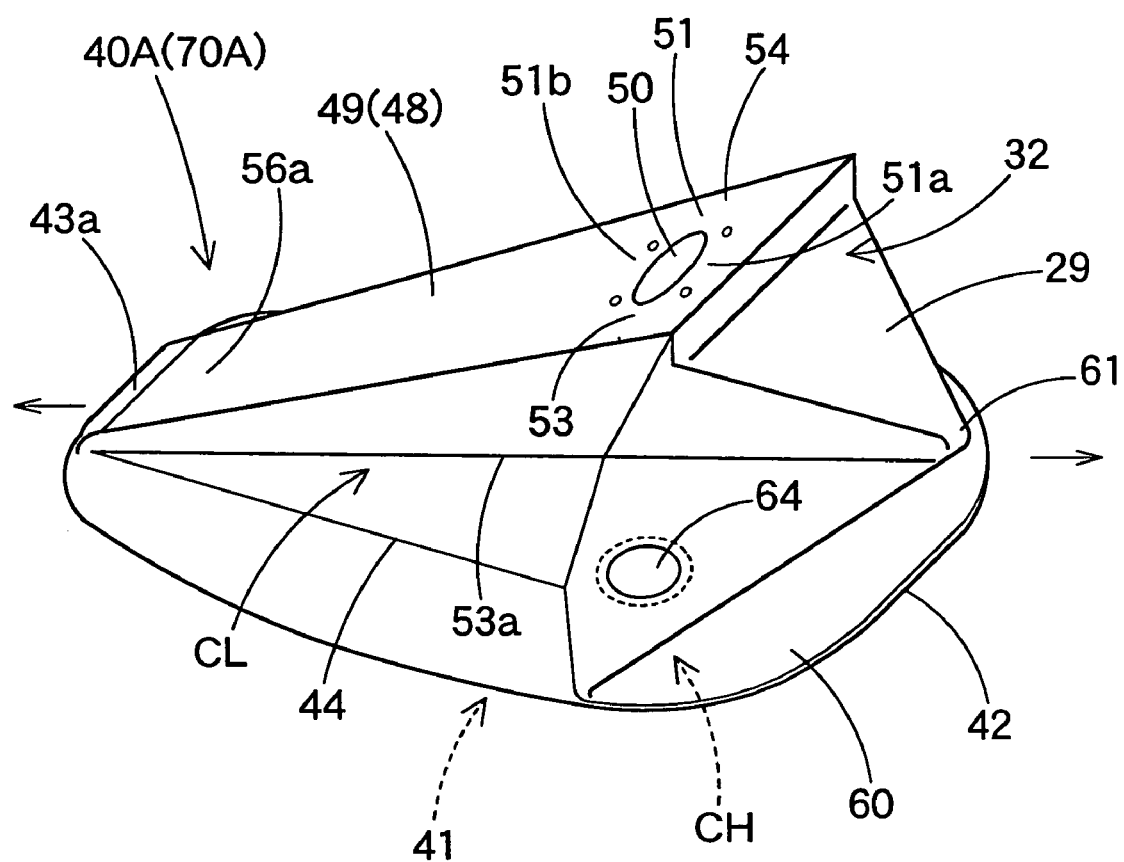
FIG. 25 is a perspective view showing the folds of the airbag in FIG. 22 in the preliminary folding.
Figure 26A:
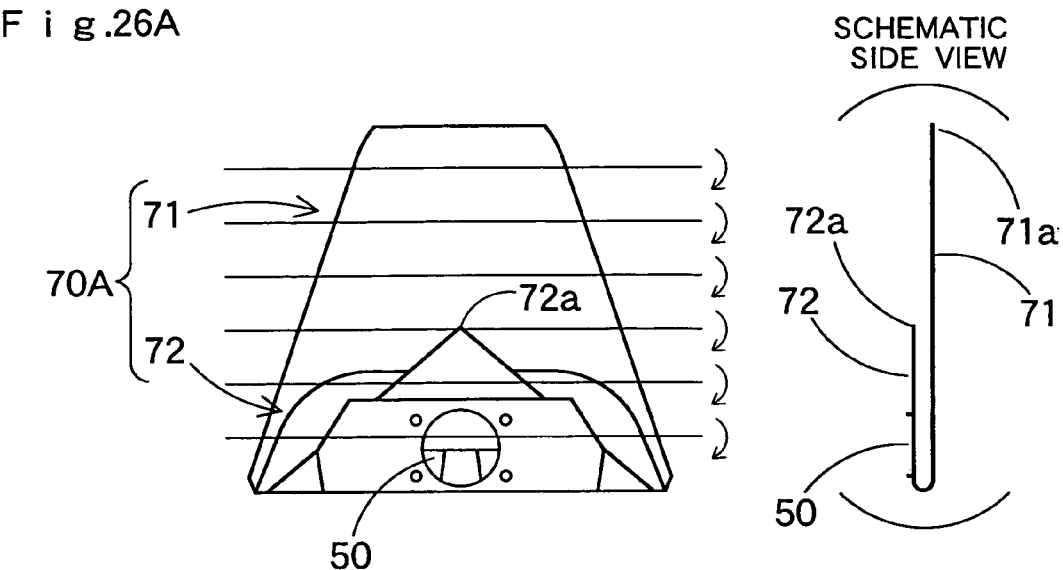
FIG. 26 shows the folding process after the preliminary folding of the airbag in FIG. 22.
Figure 26B:
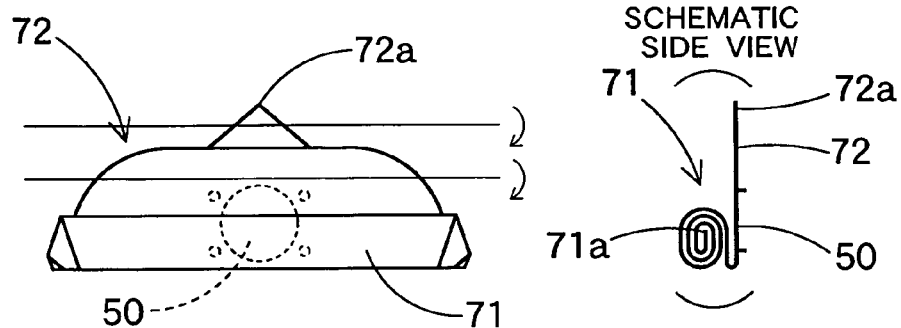
Figure 26C:
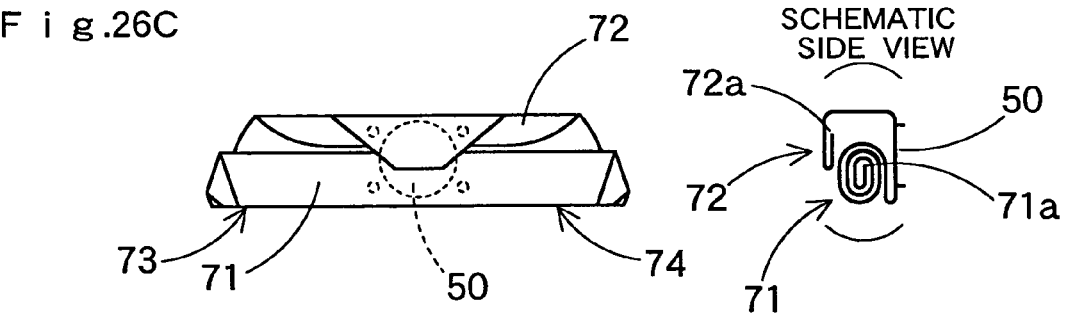
Figure 26D:
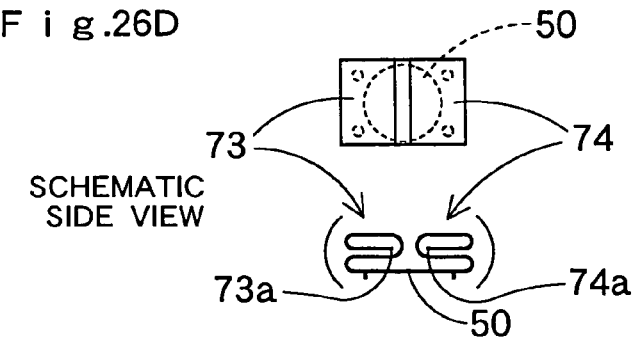

FIG. 21 shows the result of the frontal collision FRB (Full Rap Barrier) test according to FMVSS No. 208-66FR65403 effective on May 28, 2003 for evaluating the restraint performance of the airbag 40 of the airbag device M1 of the first embodiment. The test was conducted at 20 to 25 MPH speed to obtain the head deceleration data of the unbelted passenger dummy. The solid line in FIG. 21 shows a plot of the first embodiment. The double-dotted line shows a plot of a comparison example whose gas permeability rate is 1.39 l/cm$^2$/min at 20 kpa air pressure. Other conditions such as the folding manner and the inflator of the comparison example are the same as that of the first embodiment. The broken line shows a plot of an airbag device employing a conventional inflator whose discharge amount is 3.5 mol, with other conditions the same as the first embodiment.

FIG. 21 shows that the head deceleration in the airbag 40 of the first embodiment is over 120 m/s$^2$, which surpasses 100 m/s$^2$, in the decision area (55 to 75 msec). Therefore, the airbag 40 has an enough reaction force to protect a passenger, and is suitable with respect to the restraint performance of a passenger in the front passenger's seat. On the other hand, when employing a conventional inflator, the deceleration sometimes falls below 100 m/s$^2$, which is lower than the first embodiment in respect of the reaction force to restrain a passenger. Further in the case of the comparison example employing an airbag with high gas permeability, the deceleration is even lower compared with the case employing a conventional inflator.

In the airbag device M1 of the first embodiment, moreover, the airbag 40 expands and inflates upon admitting the inflation gas G from the gas inlet port 50 while unfolding the transverse folds and vertical folds.

At this time, in the airbag 40 of the first embodiment, the portion 46 near the upper edge 42 in the passenger's side wall 41 is disposed over the gas inlet port 50 to confront the gas inlet port 50 in the preliminary folding. This portion 46 near the upper edge of the passenger's side wall 41 is pushed intensely upward by the pressure F (refer to FIGS. 14 to 16) of the inflation gas G initially discharged prior to other portions of the passenger's side wall 41 such as the lower edge 43 side. As shown in FIG. 19, therefore, the passenger's side wall 41 thereafter is easily disposed generally along the vertical direction. Here in the first embodiment, the pressure F of the inflation gas G is applied to the portion 46 near the upper edge of the passenger's side wall 41 while the commutator cloth 69, the valley-folded portion 62 of the side wall portion 48, the portion 60 near the upper edge of the side wall portion 48 (the intermediate portion 59a), and the transverse centers 53a and 54a of the side wall portion 48 being interposed.

Since the portion 46 near the upper edge of the passenger's side wall 41 is pushed up intensely, the transverse and vertical folds are quickly unfolded, thereby helping expand the passenger's side wall 41 widely.

In the airbag device M1 for front passenger's seat of the first embodiment, therefore, the passenger's side wall 41 disposed generally perpendicularly to the gas inlet port peripheral edge 51 is quickly deployed generally along the vertical direction when the airbag 40 expands and inflates, and the airbag 40 is widely expanded so as not to apply a partial pressure to the passenger.

Moreover in the first embodiment, the generally entire area of the passenger's side wall 41 is left flatly expanded when folding the side wall portion 48 in the preliminary folding. The passenger's side wall 41 is not folded up. Therefore, the preliminary folding is easily conducted. Moreover, since the passenger's side wall 41 is flatly expanded, it is able to move toward the passenger in a state widely expanded transversely and vertically when the airbag 40 expands and inflates, compared with the case of folding also the passenger's side wall 41. Therefore, it is able to suppress the speed of the passenger's side wall 41 moving toward the passenger.

In the first embodiment, furthermore, the upper side wall 59 positioned at the upper side of the gas inlet port 50 is folded in the range in front of the rear edge 51b of the gas inlet port 50. It is not extended to the rear side of the gas inlet port 50. Accordingly, when the inflation gas G is introduced from the gas inlet port 50, the portion 46 near the upper edge of the passenger's side wall 41 is pushed up with the upper side wall 59 interposed, and the upper side wall 59 itself also is pushed up. At this time, the upper side wall 59 is released from the gas inlet port 50 while being unfolded. As a result, the portion 46 near the upper edge of the passenger's side wall 41 comes to confront the gas inlet port 50 directly, and helps the passenger's side wall to be disposed generally vertically.

In the first embodiment, moreover, in the preliminary folding of the side wall portion 48 of the airbag 40, the left and right portions 53 and 54 of the gas inlet port 50 are respectively folded on the valley folds CL and CR extended in the vehicle's longitudinal direction so that the generally intermediate portions 53a and 54a to the left and right edges 44 and 45 of the passenger's side wall 41 flatly expanded may be brought closer to the gas inlet port 50 behind the gas inlet port peripheral edge 51. The portion 60 near the upper edge 42 in the side wall portion 48 is folded in on the valley fold CH extending in the vehicle's transverse direction. In other words, the side wall portion 48 of the airbag 40 is folded symmetrically with respect to the gas inlet port 50, and therefore, the preliminary folding is easily conducted.

Especially, the preliminary folding of the side wall portion 48 can be made smoothly by gripping the generally intermediate portion 61 between the transverse center of the front edge side 51a of the gas inlet port 50 in the side wall portion 48 and the transverse center of the passenger's side wall upper edge 42, and the transverse center 56a of the rear side of the gas inlet port 50 in the side wall portion 48, and by pulling the grip portions 61 and 56a in the front and rear directions to separate them from each other. Therefore, the preliminary folding work is further facilitated.

Further in the first embodiment, the valley fold CH in the upper side wall 59 is disposed in front of the rear edge 51b of the gas inlet port 50 so as to leave a blank space between the rear edge 51b. Accordingly, the pressure F of the inflation gas G applies directly to the portion 46 near the upper edge of the passenger's side wall 41 through the space. As a result, the passenger's side wall 41 is even more easily disposed generally in the vertical direction.

In the first embodiment, the valley-folded portion 62, i.e. the portion in the side wall portion 48 from the front portion 55 of the gas inlet port 50 to the projected top 61, is disposed in the rear side of the front edge 51a of the gas inlet port 50 and confronts the gas inlet port 50. However, the valley-folded portion 62 is disposed closely to the gas inlet port 50, and therefore, does not affect the pressure F of the inflation gas G in pushing up the portion 46 near the upper edge of the passenger's side wall 41.

FIGS. 22 to 25 illustrate a modification of the first embodiment with respect to the preliminary folding of the side wall portion 48. The airbag 40A includes the first and second base cloths 65 and 66, the reinforcing cloth 67, and the commutator cloth material 68, and has the same shape as the airbag 40. The preliminary folding is applied to this airbag 40A to form the preliminarily folded airbag 70A.

In the preliminarily folded airbag 70A, the valley fold CH in the side wall portion 48 is positioned at the rear side of the rear edge 51b of the gas inlet port 50. The preliminary folding is applied with the passenger's side wall 41 flatly expanded, by gripping and pulling the generally intermediate portion 61 between the transverse center of the front edge side 51a of the gas inlet port 50 in the side wall portion 48 and the transverse center of the passenger's side wall upper edge 42, and the transverse center 43a in the lower edge of the passenger's side wall 41. The grip portion 43a is the rear side portion of the grip portion 56a in the aforementioned airbag 40. In other words, the preliminary folding of the airbag 40A can be conducted by shifting the passenger's side wall 41 rearward, gripping the portions 61 and 43a, and pulling the grip portions 61 and 43a in the front and rear directions to separate them from each other. At this time, the side of the grip portion 43a is pulled more largely in the airbag 40A.

Although the valley fold CH in the side wall portion 48 is positioned at the rear side of the rear edge 51b of the gas inlet port 50 in the preliminarily folded airbag 70A, the fold CH is disposed close to the rear edge 51b. In other words, in the preliminarily folded airbag 70A, the upper side wall 59 of the side wall portion 48 is arranged in the range from the vicinity of the rear edge 51b of the gas inlet port 50 toward the front side, as a result of the folding.

As shown in FIGS. 26A, 26B, 26C and 26D, the preliminarily folded airbag 70A under goes the transverse and vertical folding, as the preliminarily folded airbag 70. More specifically, the rear side portion 71 of the gas inlet port 50 in the preliminarily folded airbag 70A is roll-folded on the folds extending in the transverse direction to bring the end 71a closer to the gas inlet port 50, while the front side portion 72 of the gas inlet port 50 is folded back to bring the end 72a closer to the gas inlet port 50. Thereafter, the left side portion 73 and the right side portion 74 of the gas inlet port 50 are vertically folded on the folds extending in the longitudinal direction to bring the individual ends 73a and 74a closer to the gas inlet port 50. In the illustrated embodiment, the left and right side portions 73 and 74 are folded on the passenger's side wall 41 in a bellows fashion after folding back the ends 73a and 74a toward the lower side wall 49.

Figure 27:
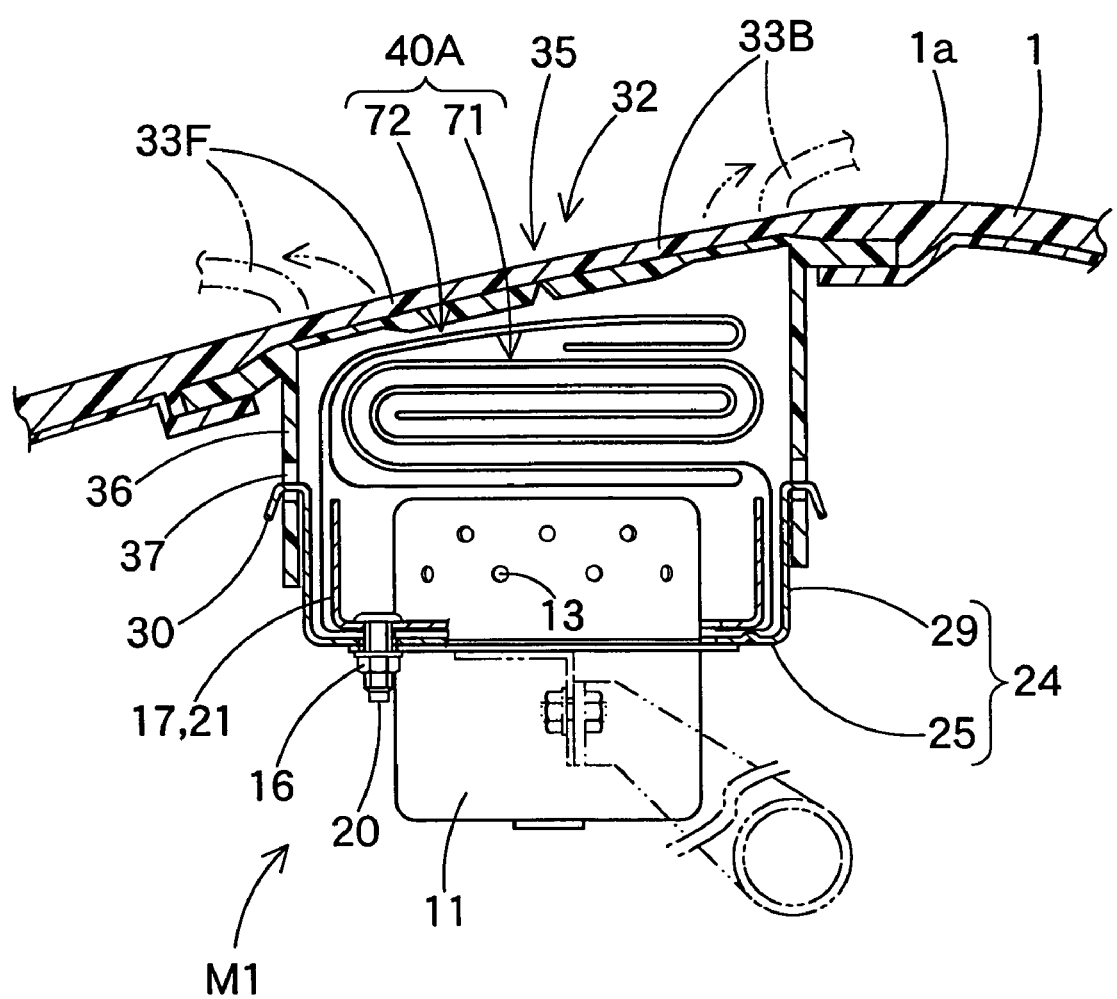
FIG. 27 is a sectional view of the airbag folded in FIG. 26 in the mounted state on the vehicle.

After the folding work, the airbag 40A is assembled into the airbag device M1 to be mounted on the vehicle, as the airbag 40 (refer to FIG. 27).

Since the valley fold CH in the side wall portion 48 is positioned at the rear side of the rear edge 51b of the gas inlet port 50 in the airbag 40A, or in the preliminarily folded airbag 70A, the pressure F of the inflation gas G does not apply directly to the portion 46 near the upper edge, as in the aforementioned airbag 40. In the preliminarily folded airbag 70A, however, the upper side wall 59 in the side wall portion 48 is arranged in the range from the vicinity of the rear edge 51b of the gas inlet port 50 toward the front side. Accordingly, when the inflation gas G is introduced from the gas inlet port 50, the portion 46 near the upper edge of the passenger's side wall 41 is pushed up with the upper side wall 59 interposed, and then the upper side wall 59 itself is also pushed up. Along with the rising, the upper side wall 59 is unfolded, and is released from the gas inlet port 50. Even if the valley fold CH in the side wall portion 48 is positioned at the rear side of the rear edge 51b of the gas inlet port 50, therefore, the upper side wall 59 is unfolded to make the portion 46 near the upper edge of the passenger's side wall 41 confront the gas inlet port 50 directly. As a result, the passenger's side wall 41 is easily arranged generally in the vertical direction.

In the airbag 40A, moreover, since the side wall portion 48 is folded while leaving the generally entire area of the passenger's side wall 41 flatly expanded as in the airbag 40, the same working-effects as the airbag 40 are obtained.

Here in the airbag 40 of the first embodiment expanding and inflating, the portion 46 near the upper edge of the passenger's side wall 41 is pushed up by the inflation gas G from the gas inlet port 50, and the commutator cloth 69 bulges upward in an arcuate shape. Then the inflation gas G abuts against the commutator cloth 69, and is divided into the gas GF flowing toward the vehicle's front side and the gas GB flowing rearward, as shown in FIG. 7. At this time, the sectional shape of the commutator cloth 69 along the vehicle's longitudinal direction upon the inflow of the inflation gas G is a curve bulging away from the gas inlet port 50. Accordingly, the inflation gas GB flowing toward the vehicle's rear side derived from the inflation gas G flows toward the top surface 1a of the dashboard 1 along the curve of the commutator cloth 69, not in parallel to the dashboard top surface 1a. As a result, the folded portion 71 of the airbag 40 is expanded rearward along the top surface 1a of the dashboard 1, thereby to expand the passenger's side wall 41 as wide as possible.

After the preliminary folding, in the first embodiment, the airbags 40 and 40A go through the transverse folding first, and then the vertical folding. However, the transverse folding may be conducted after the vertical folding, or alternatively, the vertical folding may be interposed in the course of the transverse folding, and then the transverse folding may be restarted to complete the folding work. Further alternatively, the transverse folding may be interposed in the course of the vertical folding, and then the vertical folding may be restarted to complete the folding work.

Further alternatively, with respect to the transverse folding after the preliminary folding, the front side portion 72 may be roll-folded to bring the end 72a toward the passenger's side wall 41, instead of bellows-folding. The front side portion 72 may be placed on the rear side portion 71 after being folded, as shown in FIG. 26. Alternatively, the front side portion 72 may be placed in front of the rear side portion 71 folded, disposing the end 72a below the rear side portion 71 folded.

With respect to the vertical folding after the preliminary folding, moreover, the left and right side portions 73 and 74 may be bellows-folded without rolling in the ends 73a and 74a, or may be normally roll-folded.

Figure 3:
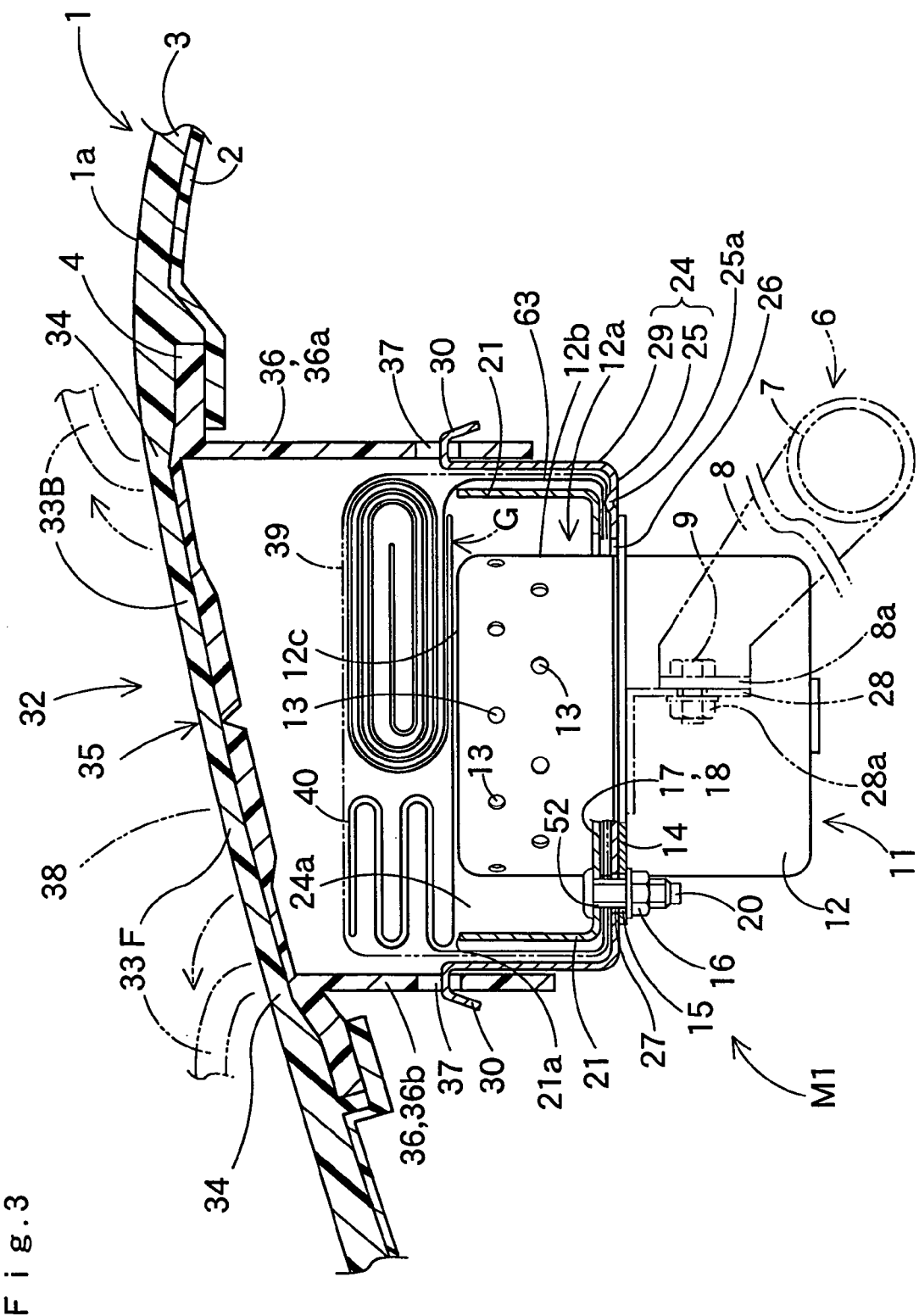
FIG. 3 is a schematic enlarged section of the airbag device of the first embodiment along the vehicle's longitudinal direction.
Figure 4:
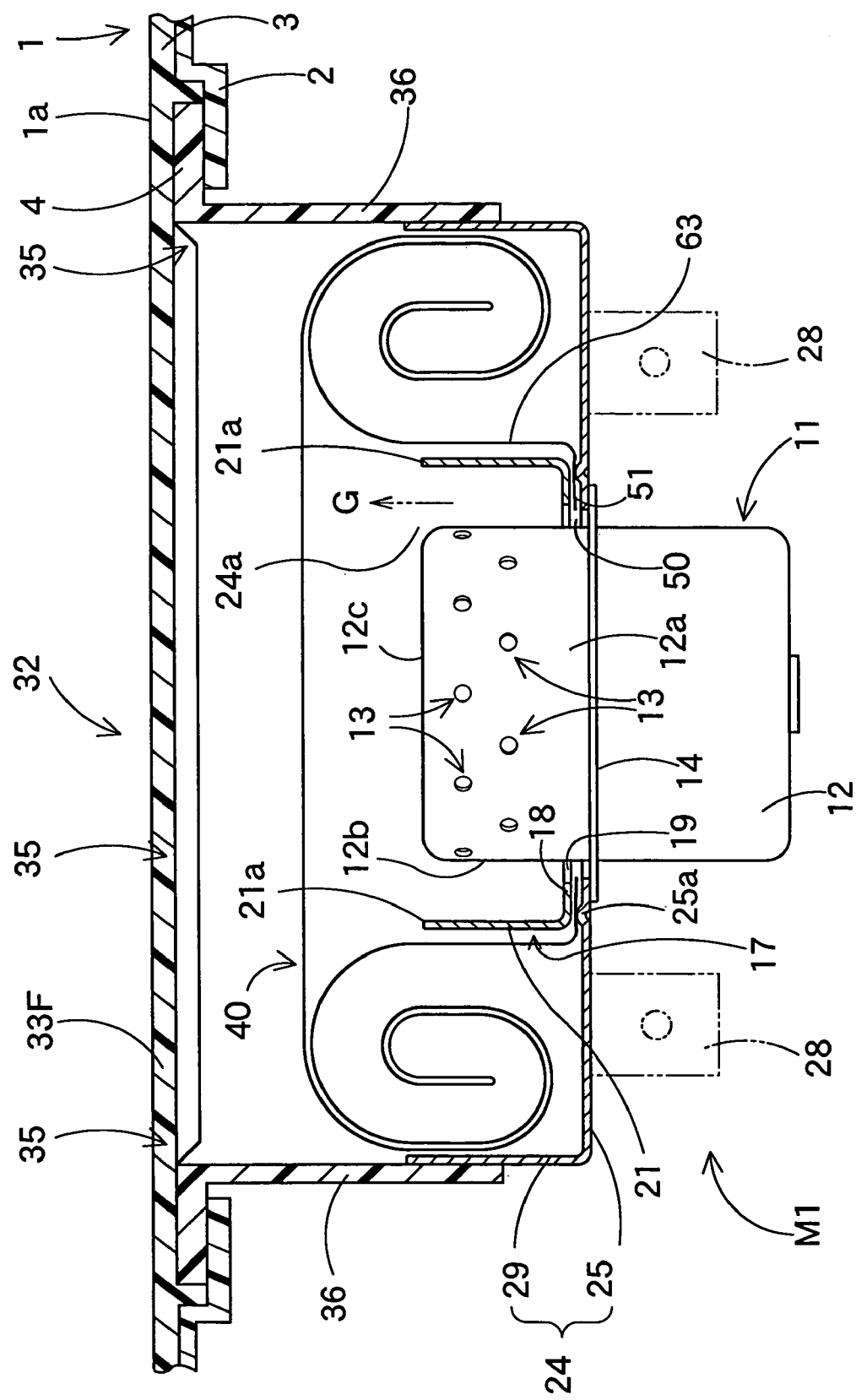
FIG. 4 is a schematic enlarged section of the airbag device of the first embodiment along the vehicle's transverse direction.
Figure 5:
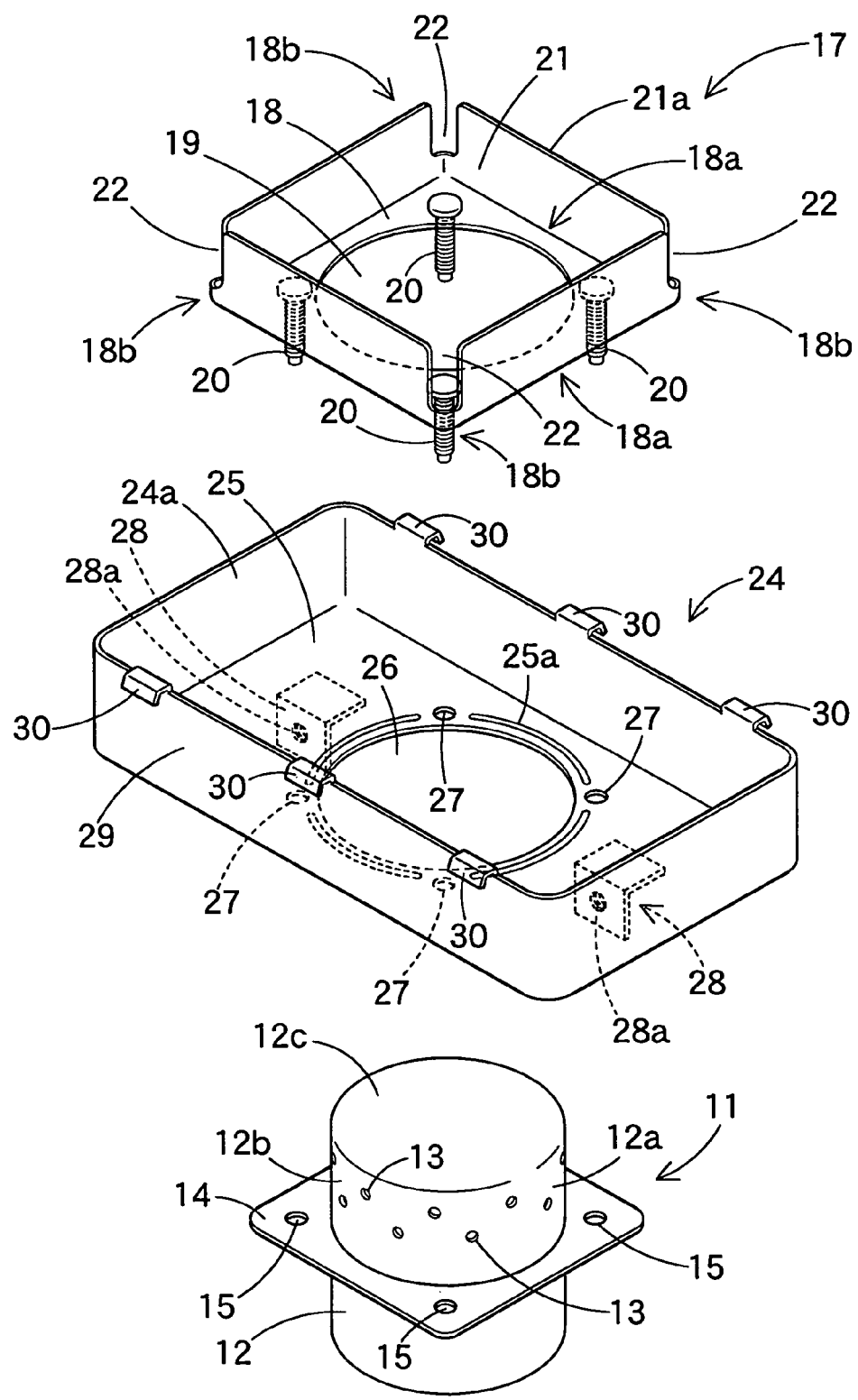
FIG. 5 shows the perspective views of a retainer, a case and an inflator employed in the airbag device of the first embodiment.

As shown in FIGS. 3 and 4, in the airbag device M1 for front passenger's seat of the first embodiment, the retainer 17 is provided with the cover wall 21 extended toward the airbag cover 32 from the base 18 for guiding the inflation gas G up and toward the airbag cover 32 in the space between itself and the end portion of the inflator 11 having the gas discharge ports 13, or the outer circumferential side 12b of the upper portion 12a.

In the airbag device M1 of the first embodiment, therefore, when the inflation gas G is discharged from the gas discharge ports 13 of the inflator 11, it fills the space between the cover wall 21 of the retainer 17 and the outer circumferential side 12b of the upper portion 12a of the inflator 11 with the gas discharge ports 13, as shown in FIGS. 3 and 4. Then the gas G flows up toward the airbag cover 32, since the cover wall 21 is extended toward the airbag cover 32. As a result, the airbag cover 32 subjected to the pressure of the inflation gas G quickly breaks the breakable portion 35, and opens the doors 33F and 33B smoothly.

At this time, the part 63 of the airbag 40 (refer to FIGS. 3 and 4) neighboring the opening peripheral edge 51 held by the base 18 of the retainer 17 is blocked by the cover wall 21 of the retainer 17. Therefore, it is protected from the heated inflation gas G.

The cover wall 21 has recesses 22 at the corners 18b of the base 18, and the part 63 of the airbag 40 is directly subjected to the inflation gas G from the recesses 22. However, only a small quantity of the gas G flows to the part 63, and the part 63 is provided with the reinforcing cloth 67 and the commutator cloth 69. Therefore, the first base cloth 65 does not sustain such damage as to lead to the gas leakage.

In the first embodiment, the cover wall 21 of the retainer 17 is arranged in a generally square cylindrical shape. However, the cover wall 21 may have a generally round cylindrical shape encircling the body 12 of the inflator 11.

Figure 28:
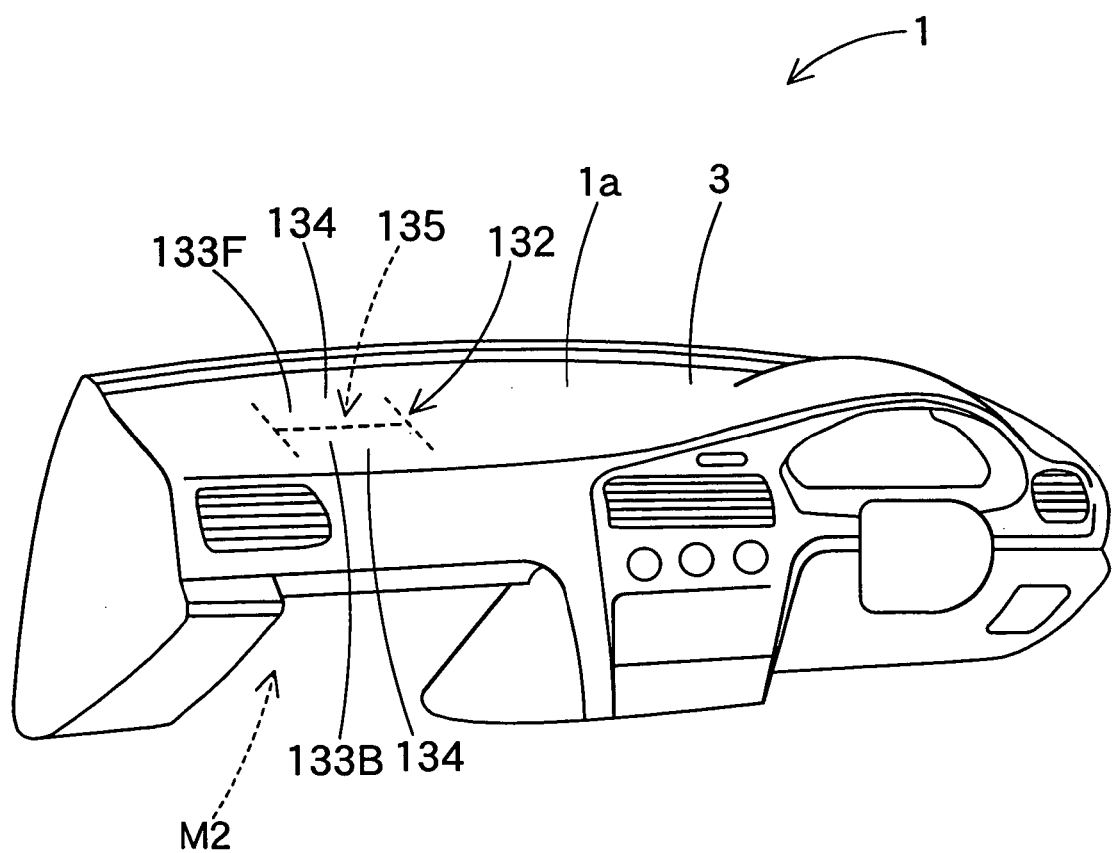
FIG. 28 is a perspective view of the dashboard on which an airbag device for front passenger's seat of the second embodiment is mounted.
Figure 29:
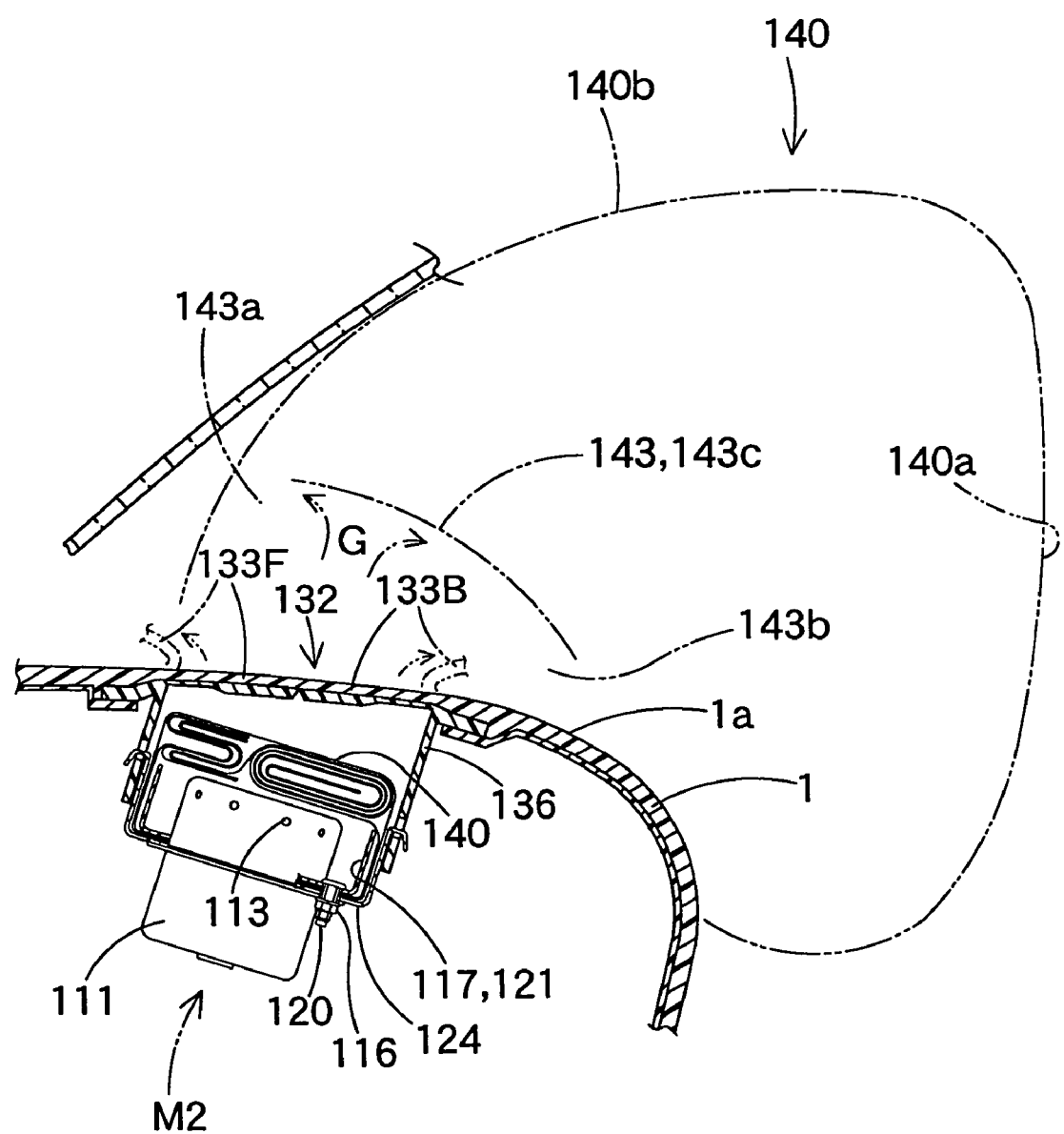
FIG. 29 is a schematic section along the vehicle's longitudinal direction of the second embodiment in deployment.
Figure 30:
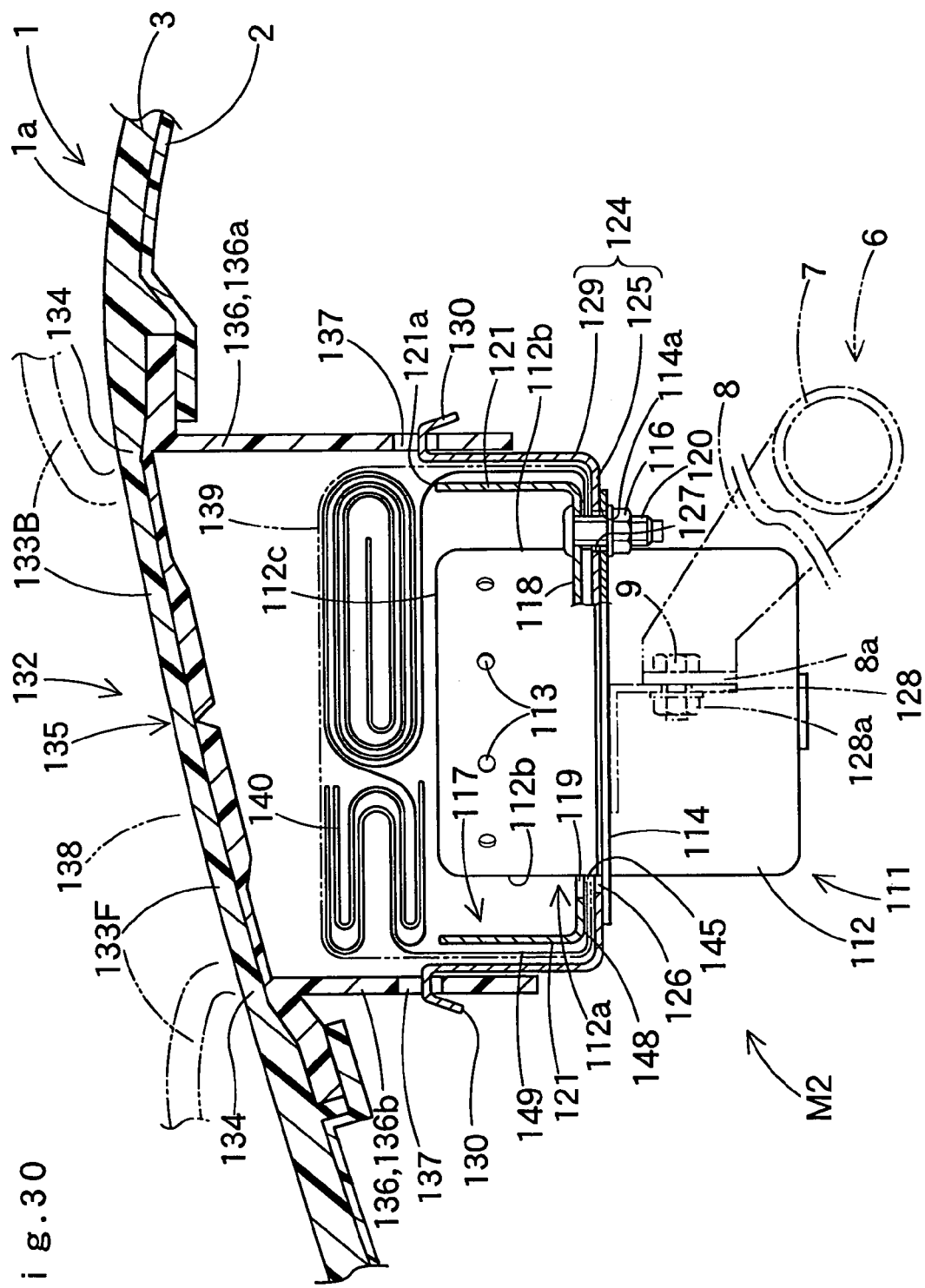
FIG. 30 is a schematic enlarged section along the vehicle's longitudinal direction of the airbag device of the second embodiment.
Figure 31:
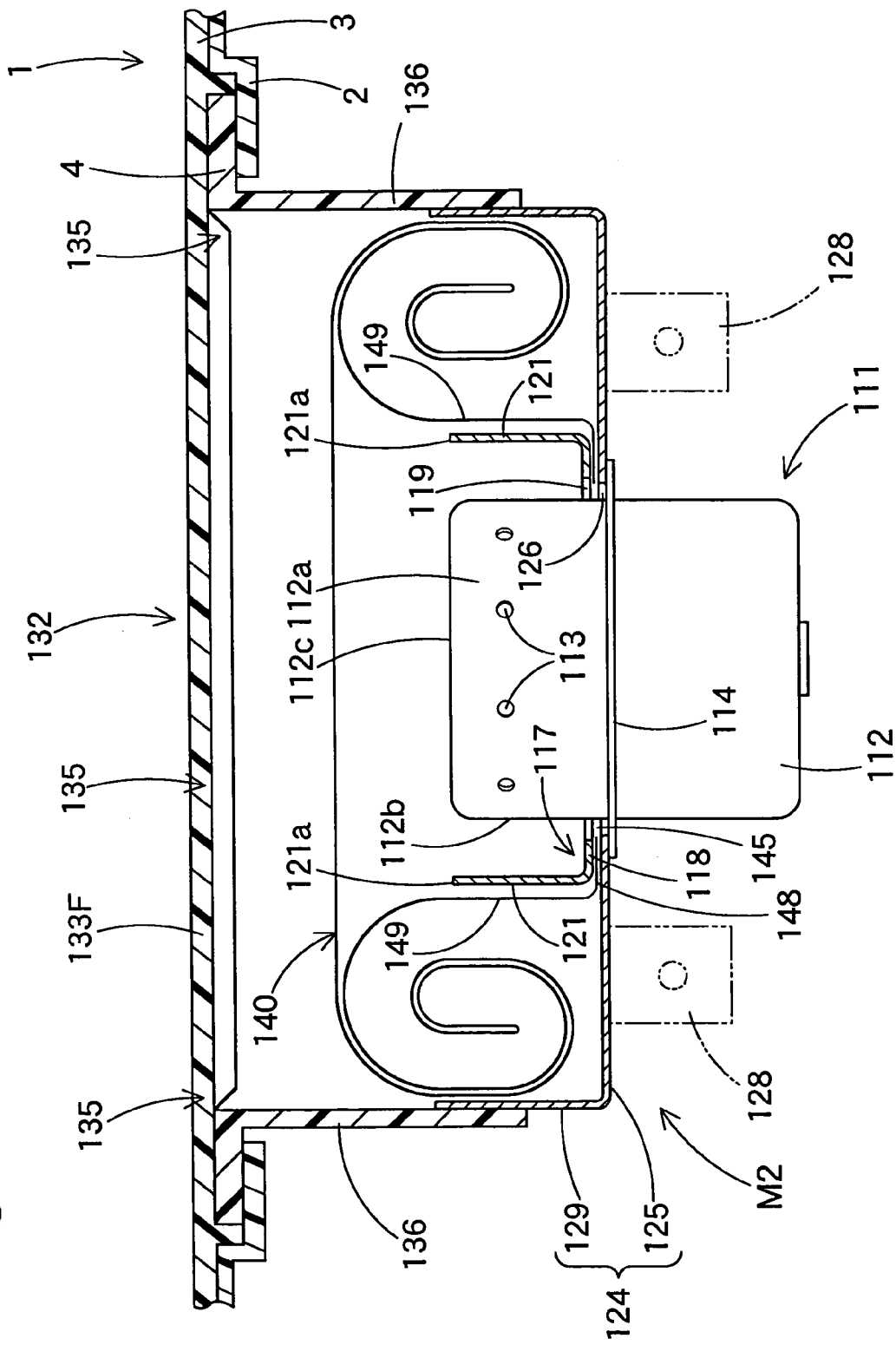
FIG. 31 is a schematic enlarged section along the vehicle's transverse direction of the airbag device of the second embodiment.
Figure 32:
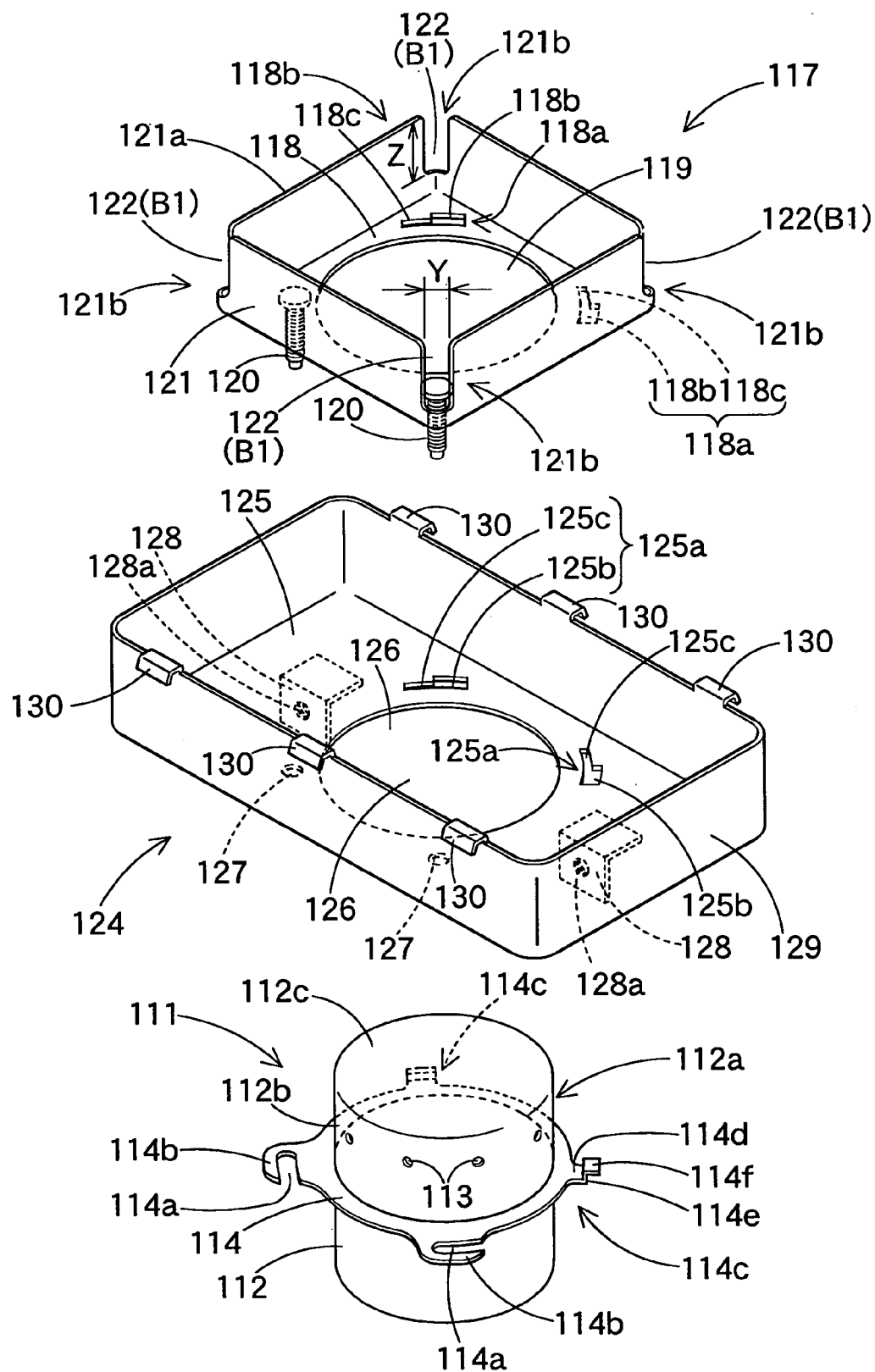
FIG. 32 shows the perspective views of an inflator, a retainer and a case employed in the airbag device of the second embodiment.

FIGS. 28 and 29 illustrate a second embodiment of the airbag device M2 for front passenger's seat of a top-mount type, which is arranged inside of the top surface 1a of a dashboard 1. This airbag device M2 includes an airbag 140 folded, an inflator 111 for supplying the airbag 140 with inflation gas, a case 124 for housing and holding the airbag 140 and the inflator 111, a retainer 117 for attaching the airbag 140 to the case 124 and an airbag cover 132 for covering the folded airbag 140, as the first embodiment.

As shown in FIGS. 28 to 31, the airbag cover 132 is integral with the dashboard 1, as the first embodiment. The airbag cover 132 includes two doors 133F and 133B respectively provided with a weakened breakable portion 135 therearound. As shown in FIG. 28, the breakable portion 135 is arranged in an H-shape as viewed from above the dashboard 1. The two doors 133F and 133B open toward the front and rear sides, respectively, around their upper or lower ends as the hinges 134.

The airbag cover further includes a joint wall portion 136 projected downward from the back surface to encircle the arrangement position of the doors 133F and 133B, and having a generally square cylindrical shape, as the first embodiment. The joint wall portion 136 includes the walls 136a and 136b confronting each other in the front and rear direction, and the walls 136a and 136b are provided with a plurality of retaining holes 137 at its predetermined positions. Retaining pawls 130 of the case 124 are inserted into these retaining holes 137 so as to retain the joint wall portion 136.

As shown in FIGS. 29 to 32, the case 124 is made of a sheet metal into a generally rectangular parallelpiped shape, and has a rectangular opening at the upper side, as the case 24 in the first embodiment. The case 124 includes a bottom wall 125 of a rectangular plate shape, and a side wall 129 extended upward toward the airbag cover 132 from the outer circumferential edge of the bottom wall 125 in a generally square cylindrical shape. The bottom wall 125 has a rectangular plate shape elongated in the left and right directions, and has in its center a generally round insert hole 126 for inserting the upper portion 112a of the inflator 111 from the lower side toward the airbag cover 132.

In the periphery of the insert hole 126 of the bottom wall 125, there are formed mounting holes 127 for inserting through the two bolts 120 of the retainer 117, and insert holes 125a for inserting through the two retaining pawls 114c of the inflator 111. The insert holes 125a are disposed in the positions corresponding to the later-described retaining holes 118a of the retainer 117 and the mounting holes 150 of the airbag 140, and are opened in the same shape as those. Each of the insert holes 125a is a combination of a large hole 125b which the neck 114e and the head 114f of the retaining pawl 114c of the inflator 111 can go through, and a small hole 125c communicating with the large hole 125b. The neck 114e of the retaining pawl 114c can go through the small hole 125c, but the head 114f of the retaining pawl 114c cannot go through the small hole 125c in the vertical direction.

The bottom wall 125 is further provided on its lower surface and at the left and right sides with brackets 128 for securing the case 124 to the vehicular body 6, as the case 24 in the first embodiment. Each of the brackets 128 is provided with a nut 128a for fastening a bolt 9. The bolt 9 is inserted through the mounting seat 8a of the bracket 8 and fastened into the nut 128a. By fastening the bolts 9 into the nuts 128a, the case 124, or the airbag device M2 is secured to the body 6.

Here, the two mounting holes 127 are disposed at the rear side in the case 124 closer to a not-shown glove box as the case 124 is mounted on the vehicle.

The side wall 129 of the case 124 is provided at the vehicle's front and rear upper ends with a plurality of retaining pawls 130 turned outward and downward, as the case 24 in the first embodiment. As described above, the retaining pawls 130 are inserted into the retaining holes 137 of the joint wall portion 136 of the airbag cover 132 so as to retain the joint wall portion 136.

As shown in FIGS. 29 to 32, the retainer 117 is formed of a sheet metal, and includes a base 118 and a cover wall 121, as the retainer 17 in the first embodiment. The base 118 has an insert hole 119 opened generally in the same shape as the insert hole 126 of the case 124. The cover wall 121 extends up toward the airbag cover 132 from the outer peripheral edge of the base 118 in a generally square cylindrical shape.

The base 118 has a generally square outline, and is provided at two positions out of its four corners with bolts 120 extended downward. There maining two corners are provided with retaining holes 118a.

When the retainer 117 is arranged within the airbag 140, the individual bolts 120 are inserted into the mounting holes 146 of the airbag 140, the mounting holes 127 of the bottom wall 125 of the case 124, and the recesses 114a of the flange 114 of the inflator 111, and are fastened into the nuts 116.

Thus the airbag 140 and the inflator 111 are attached to the bottom wall 125 of the case 124. In other words, when the bolts 120 are fastened into the nuts 116, the peripheral edge 148 of the opening 145 of the airbag 140 is pressed onto the bottom wall 125 by the base 118, thereby attaching the airbag 140 to the bottom wall 125, while the flange 114 of the inflator 111 is pressed onto the periphery of the insert hole 126, thereby attaching the inflator 111 to the bottom wall 125.

The individual retaining holes 118a are disposed at the positions corresponding to the insert holes 125a of the bottom wall 125 of the case 124 and the mounting holes 150 of the airbag 140, and are opened in the same shape as those. That is, each of the retaining holes 118a is a combination of a large hole 118b which the neck 114e and the head 114f of the retaining pawl 114c of the inflator 111 can go through, and a small hole 125c communicating with the large hole 118b. The neck 114e of the retaining pawl 114c can go through the small hole 118c, but the head 114f of the retaining pawl 114c cannot go through the small hole 118c in the vertical direction.

The cover wall 121 of the retainer 117 is extended upward toward the airbag cover 132 from the generally square outer circumferential edge of the base 118. The leading end 121a of the cover wall 121 is extended up to the same level as the top surface 112c of the inflator 111. The leading end 121a is not arranged at the four corners 121b of the cover wall 121. At the corners 121b, there are arranged recesses 122 recessed from the upper end 121a to separate the upper end 121a of the cover wall 121.

As the guide wall 21 in the first embodiment, the cover wall 121 covers the gas discharge ports 113, with the upper end 121a extended up to the same level as the top surface 112c of the inflator 11, so that the mist D contained in the inflation gas G discharged from the gas discharge ports 113 of the inflator 111 may adhere thereon. The recesses 122 in the individual corners 121b of the cover wall 121 constitute a through portion penetrating the cover wall 121, and further constitute a mist growth prevention means B1 for preventing the mist D from forming mist agglomerates.

Here, the retainer 117 is formed by punching the insert hole 119, mounting holes for the bolts 120, the retaining holes 118a, and the recesses 122 in a sheet metal, by drawing it to form the base 118 and the cover wall 121, and by assembling the bolts 120.

The inflator 11 is a pyro-type inflator, which generates inflation gas by burning reaction of a predetermined gas generating material, for example, a gas generating material composition containing by weight of the material 34% nitroguanidine, 50% nitrate strontium, 9% sodium salt of carboxymethylcellulose, and 7% acid clay. As shown in FIGS. 29 to 32, the inflator 111 is a disc-type including a body 112 of a generally cylindrical shape, and is a single type having one combustion chamber, and its gas discharge amount is 2.4 mol. Moreover, the inflator 111 is a long mass flow type drawing a mass flow curve as shown in FIG. 20. As the inflator 11 in the first embodiment, in the inflator 111 in the second embodiment, although the mass flow rate of the inflation gas is small right after the ignition, it increases from 30 msec after ignition on, compared with a conventional inflator. Therefore, the airbag 140 inflated by the inflation gas from the inflator 111 is able to protect a passenger in the front passenger's seat properly.

The inflator 111 includes a body 112 charged with a predetermined amount of gas generating material and a flange 114 for attaching the inflator 111 to the case 124.

The flange 114 has a generally square annular shape (generally square plate shape) projected from the outer circumference of the body 112. It is provided at its four corners with each two of recesses 114a and retaining pawls 114c.

Figure 33A:
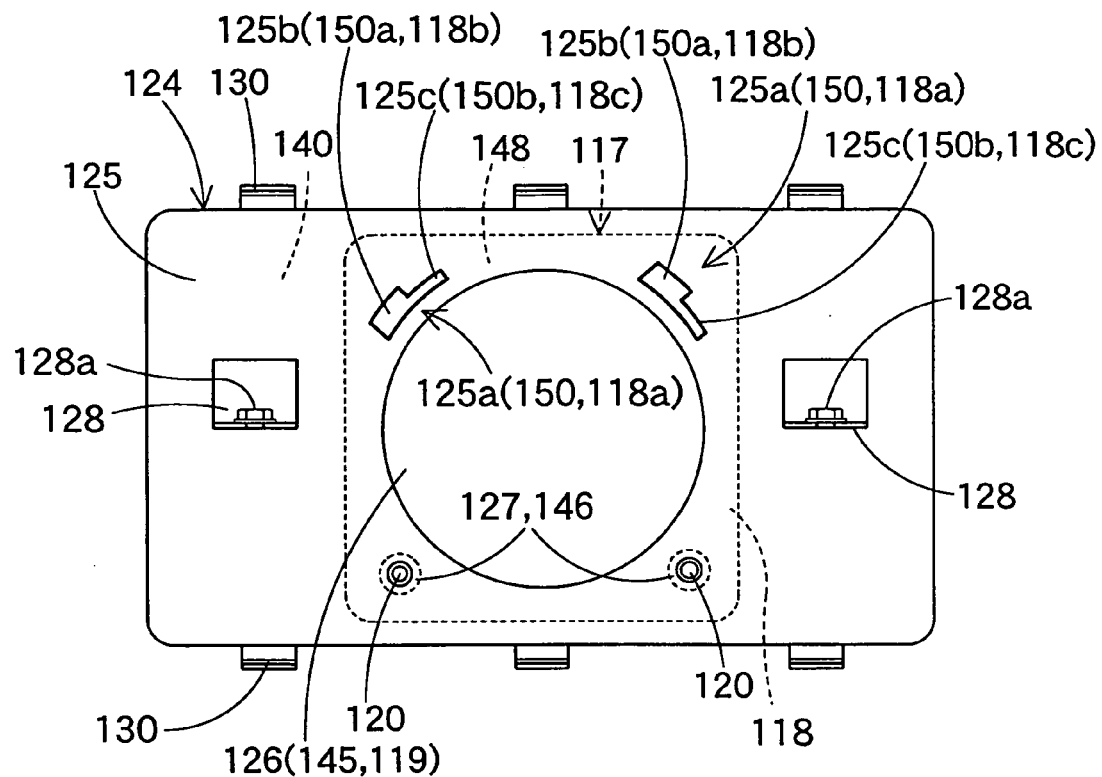
FIG. 33 shows the bottom views of the case and the inflator of the airbag device of the second embodiment being assembled.
Figure 33B:
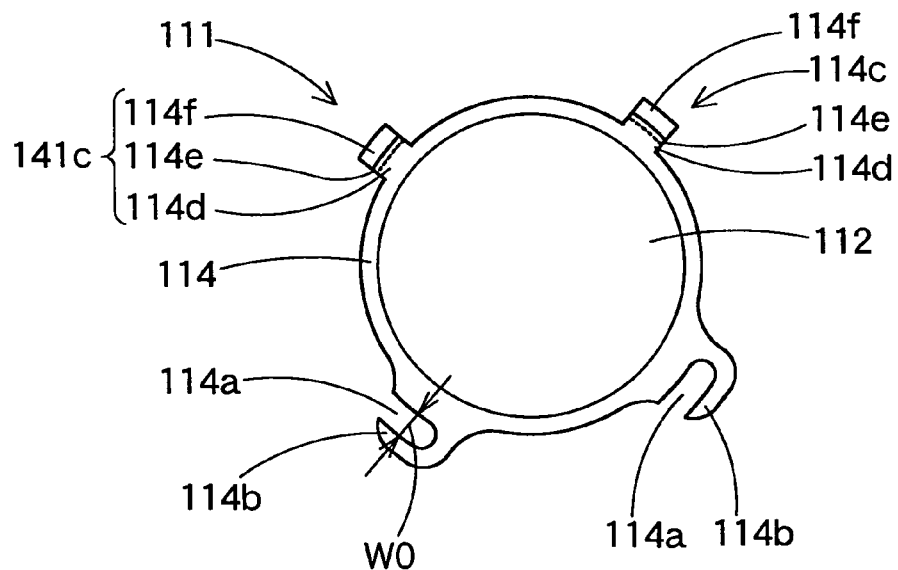
Figure 34A:
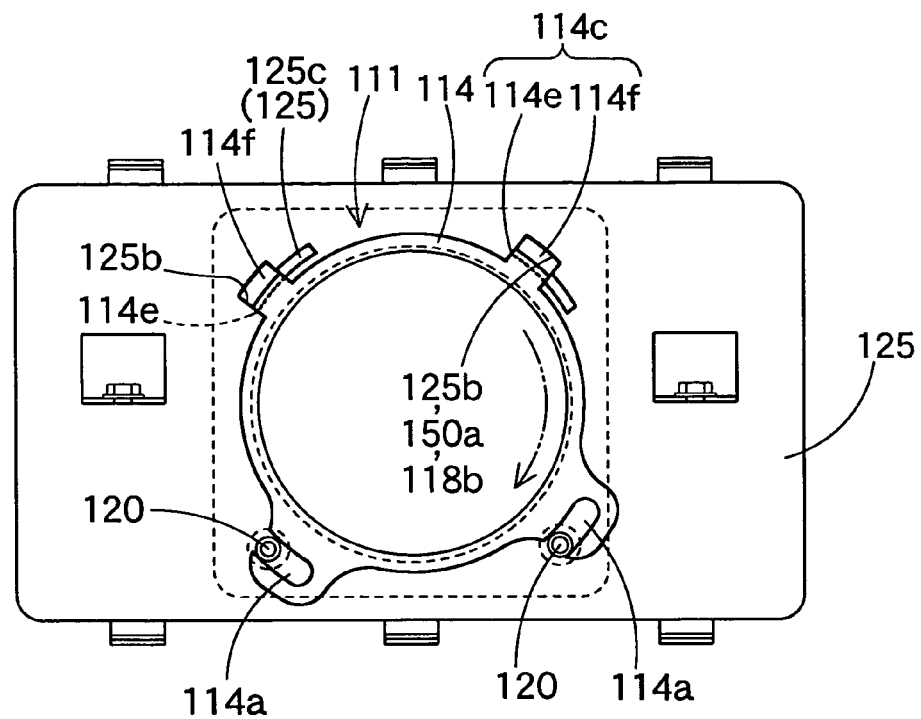
FIG. 34 shows the bottom views illustrating the assembling of the airbag device of the second embodiment.
Figure 34B:
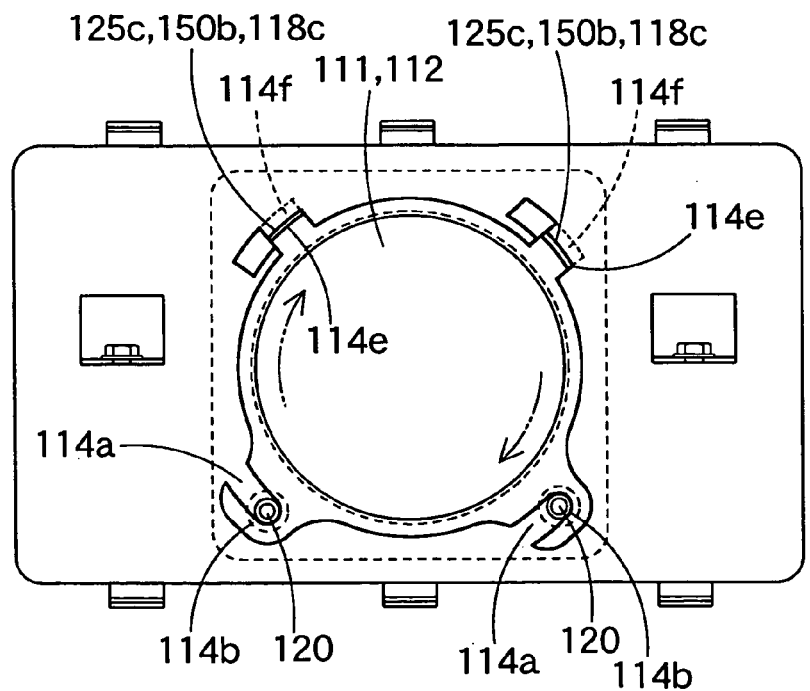
Figure 35:
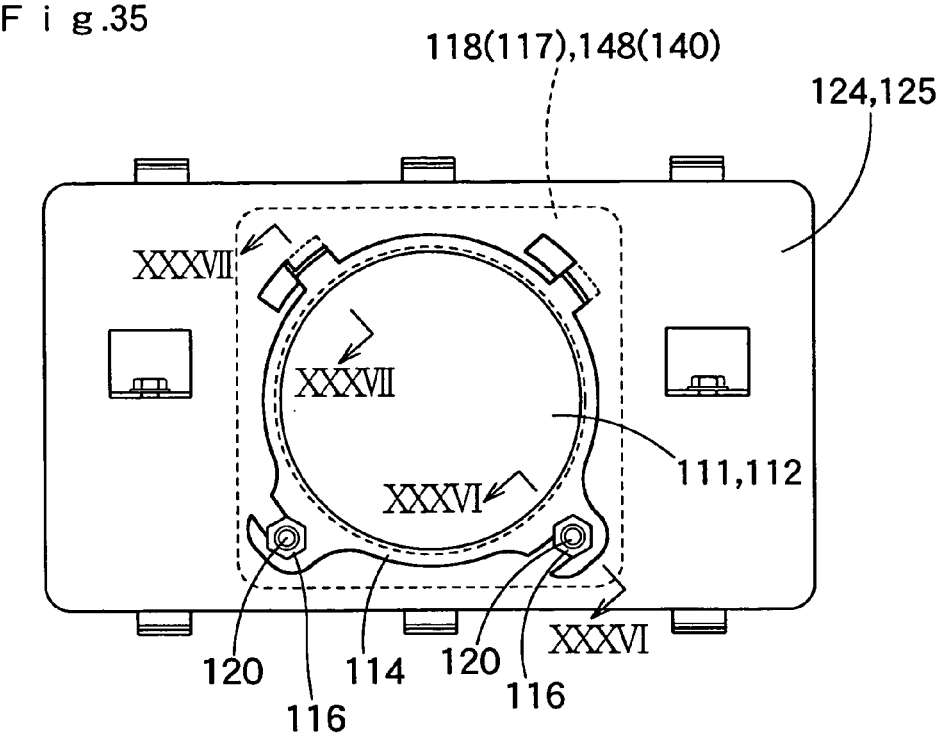
FIG. 35 is a bottom view of the airbag device of the second embodiment just assembled.
Figure 36:
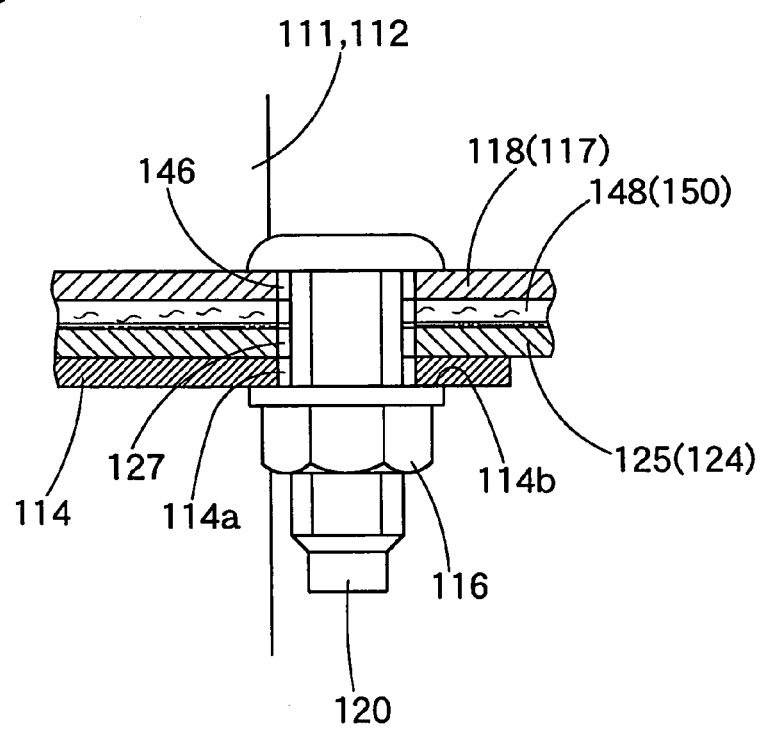
FIG. 36 is a partial section taken along the line XXXVI-XXXVI of FIG. 35, showing the airbag device of the second embodiment just assembled.

The individual recesses 114a have a curved hook-like shape so that the bolts 120 of the retainer 117 may be inserted therein from the outer peripheral edge of the flange 114 when fitting the center of the body 112 to the center of the insert hole 119 of the retainer 117 and turning clockwise as in FIGS. 34A and 34B. The width WO of the individual recesses 114a is slightly greater than the outer diameter of the bolts 120 (refer to FIG. 33).

Each of the retaining pawl 114c includes a base 114d extending outwardly from the flange 114, a neck 114e extending up toward the gas discharge ports 113 from the leading end of the base 114d, and a head 114f extending outwardly from the upper end of the neck 114e. When the inflator 111 is assembled with the bottom wall 125 of the case 124, the inflator body 112 is inserted into the insert hole 126 of the case bottom wall 125, the opening 145 of the airbag 140, and the insert hole 119 of the retainer 117 from the lower side. At this time, each of the heads 114f and the necks 114e of the retaining pawls 114c is inserted into the large holes 125b, 150a and 118b, respectively of the insert hole 125a of the bottom wall 125, the mounting hole 150 of the airbag 140, and the retaining hole 118a of the retainer 117, so that the head 114f is protruded above the upper surface of the base 118 of the retainer 117. Subsequently when the inflator body 112 is turned clockwise as shown in FIGS. 34A and 34B with its center fitted to the center of the insert hole 119 of the retainer 117, the neck 114e shifts to the small holes 125c, 150b, and 118c, respectively of the insert hole 125a of the bottom wall 125, the mounting hole 150 of the airbag 140, and the retaining hole 118a of the retainer 117, so that the head 114f abuts against the peripheral edge of the small hole 125c on the upper surface of the base 118 of the retainer 117. While the necks 114e of the retaining pawls 114c shift from the large hole 118b to the small hole 118c, the individual bolts 120 are inserted into the aforementioned recesses 114a. By fastening the nuts 116 with the individual bolts 120 as shown in FIGS. 34B, 35, 36 and 37, the individual nuts 116 hold the peripheral edge 114b of the recesses 114a, so that the inflator 111 is attached to the bottom wall 125 of the case 124. The base 118 of the retainer 117, in cooperation with the nuts 116 and the retaining pawls 114c of the inflator 111, presses the opening peripheral edge 148 of the airbag 140 onto the bottom wall 125, thereby to be attached to the bottom wall 25 of the case 124.

The body 112 has a cylindrical shape whose outer diameter is slightly smaller than the internal diameter of the insert hole 126 of the bottom wall 125. The body 112 is provided on the outer circumferential side 112b of the upper body 112a above the flange 114 with a plurality of gas discharge ports 113 for discharging the inflation gas G.

FIGS. 38 to 41 illustrate the airbag 140 of the second embodiment. As the airbag 40 of the first embodiment, the airbag 140 has, as completely expanded and inflated, a generally square conical shape and includes a passenger's side wall 140a to be arranged generally in the vertical direction and closer to the passenger, and a side wall portion 140b extended toward the vehicle's front side from the outer peripheral edge of the passenger's side wall 140a in a narrowing manner. In the front lower side of the side wall portion 140b, there is arranged a round opening for admitting the inflation gas, or the gas inlet port 145. In the periphery of the gas inlet port 145, there are formed each two of the mounting holes 146 and 150. The upper portion 112a of the inflator body 112 is inserted into the gas inlet port 145. The individual mounting holes 146 receive the individual bolts 120 of the retainer 117.

Figure 37:
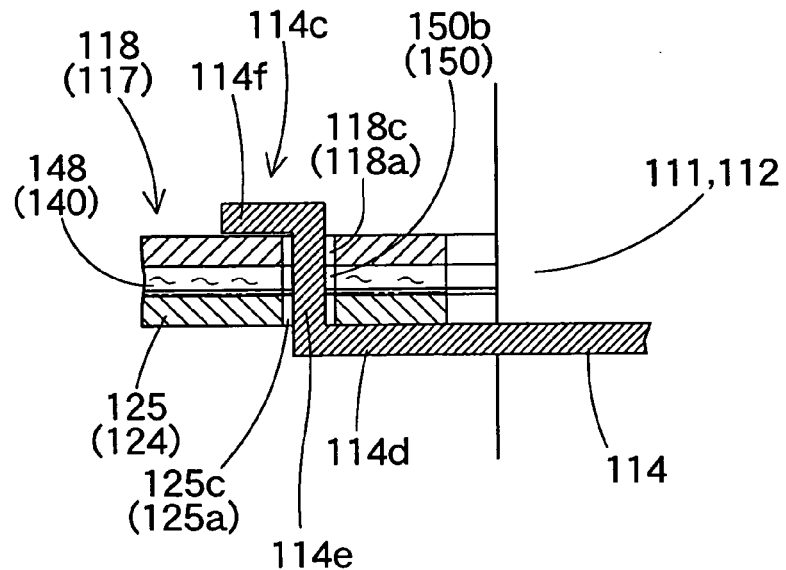
FIG. 37 is a partial section taken along the line XXVII-XXVII of FIG. 35, showing the airbag device of the second embodiment just assembled.
Figure 38:
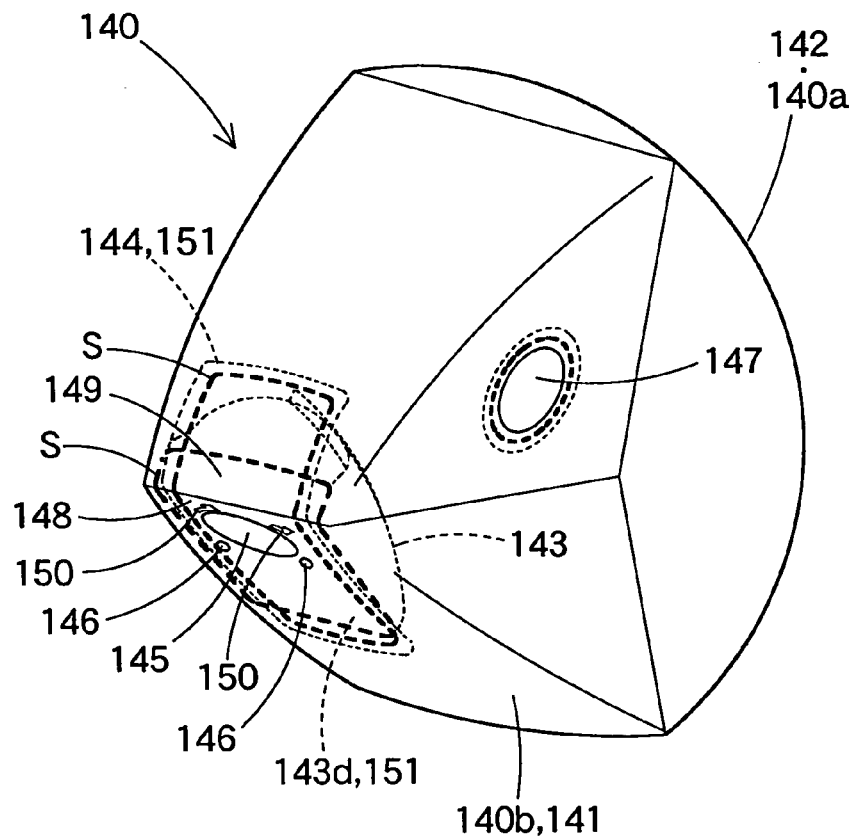
FIG. 38 is a perspective view of the airbag employed in the second embodiment in solitarily inflated state.

As shown in FIGS. 33, 34 and 37, the individual mounting holes 150 are disposed at the positions corresponding to the retaining holes 118a of the retainer 117 and the insert holes 125a of the case bottom wall 125, and are opened in the same shape as those. That is, each of the mounting holes 150 is a combination of a large hole 150a which the neck 114e and the head 114f of the retaining pawl 114c of the inflator 111 can go through, and a small hole 150b communicating with the large hole 150a. The neck 114e of the retaining pawl 114c can go through the small hole 150b, but the head 114f of the retaining pawl 114c cannot go through the small hole 150b in the vertical direction. The airbag 140 is further provided in the left and right side of the side wall portion 140b respectively with a vent hole 147 for emitting extra inflation gas.

Figure 40:
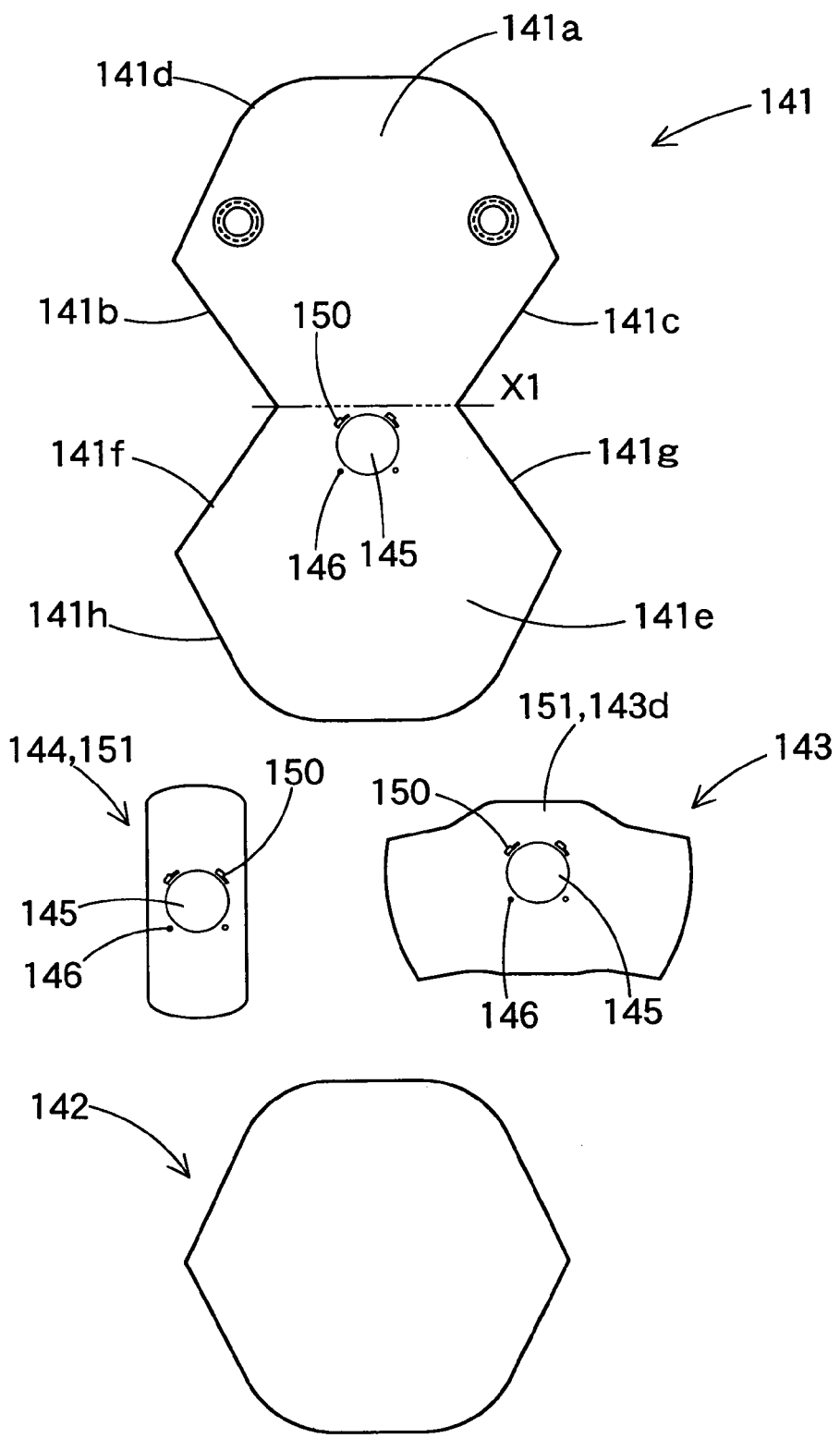
FIG. 40 shows the plane views of the components of the airbag employed in the second embodiment.
Figure 41:
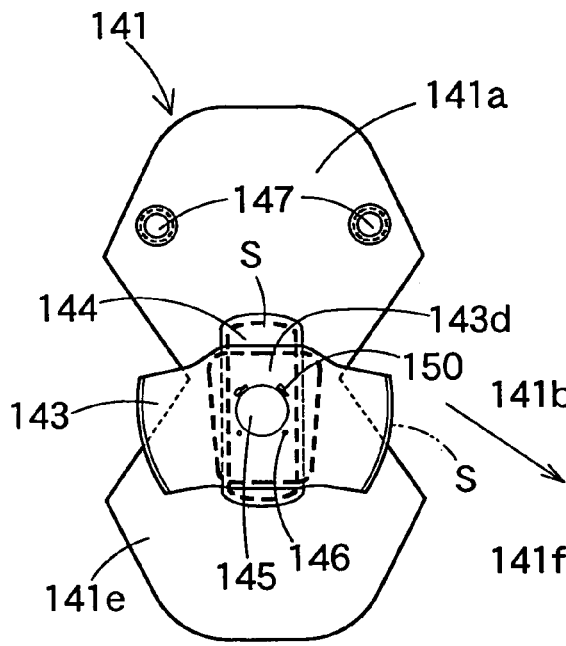
FIG. 41 illustrates the manufacturing process of the airbag employed in the second embodiment.
Figure 41:
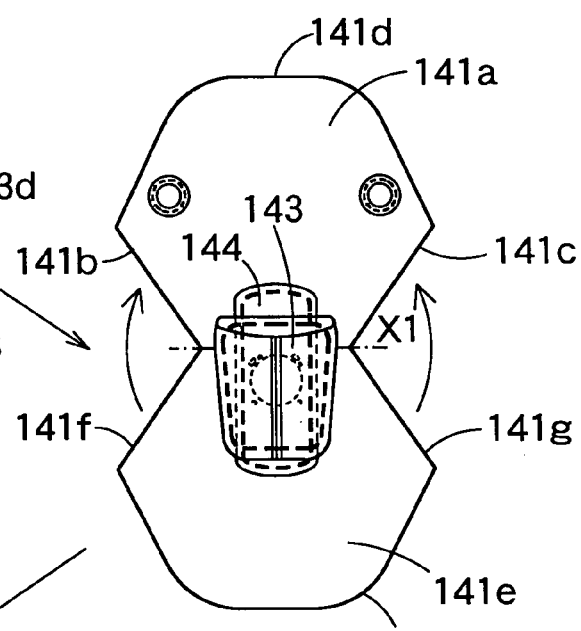
Figure 41:
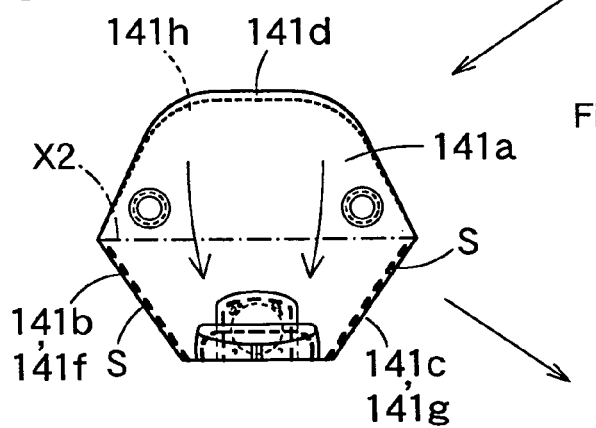
Figure 41:
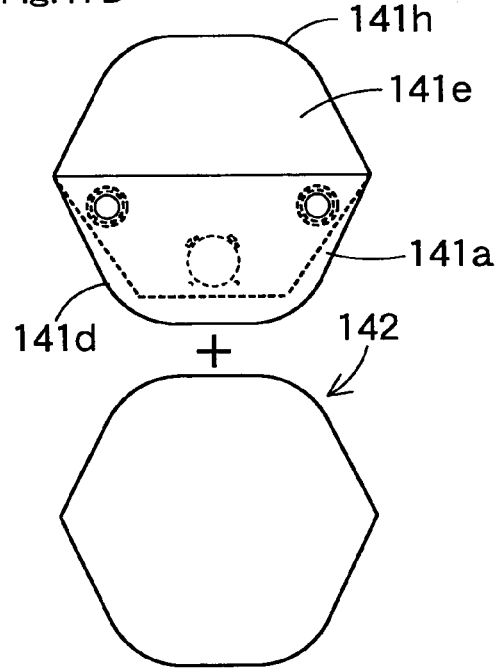
Figure 41:
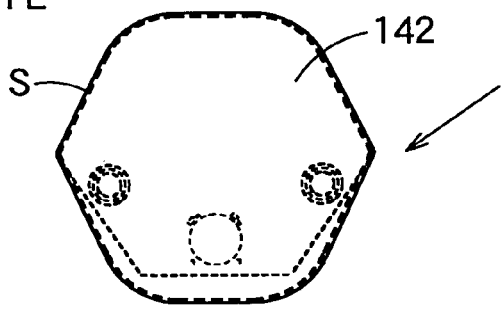

As shown in FIGS. 40 and 41, the airbag 140 is formed of four cloth members: a first base cloth 141, a second base cloth 142, a commutator cloth 143 and a reinforcing cloth 144, as the airbag 40 of the first embodiment. These cloths are formed of a plain woven fabric of synthetic fiber yarn such as polyamide or the like without heat-resisting coating. The capacity of the airbag 140 is 110l, too, as in the first embodiment.

The first base cloth 141 is shaped like a combination of two generally hexagonal portions, i.e., the upper portion 141a and the lower portion 141e, and the second base cloth 142 has a generally round shape approximate to a generally hexagonal shape. As in the first embodiment, these planar base cloths 141 and 142 are also constructed to provide the solid airbag 140 by sewing work. The second base cloth 142 constitutes the generally entire area of the passenger's side wall 140a of the airbag 140, and the first base cloth 141 constitutes the generally entire area of the side wall portion 140b of the airbag 140. Moreover, the upper portion 141a of the first base cloth 141 constitutes the generally entire area of the upper side of the side wall portion 140b, whereas the lower portion 141e of the first base cloth 141 constitutes the generally entire area of the lower side of the side wall portion 140b.

The reinforcing cloth 144 is stitched to the periphery 148 of the gas inlet port 145 at the inner side of the airbag 140 to protect the first base cloth 141. The commutator cloth 143 is arranged inside the airbag 140 to cover the gas inlet port 145, and guides the inflation gas flowing in the airbag 140 toward the vehicle's front and rear directions.

The commutator cloth 143 also covers the periphery 148 of the gas inlet port 145 in the first base cloth 141, and therefore, the part 143d reinforces the base cloth 141. More specifically, the part 143d of the commutator cloth 143 and the reinforcing cloth 144 function as a protection cloth member 151 for covering the inner side of the periphery 148 of the opening (or the gas inlet port) 145 in the first base cloth 141 as a part of the airbag 140. These cloths cover the part 149 of the inner side of the airbag 140 neighboring the opening peripheral edge 148 at least up to the area over the upper end 121a of the cover wall 121 of the retainer 117.

To manufacture the airbag 140, as the airbag 40 in the first embodiment, the reinforcing cloth 144 and the commutator cloth 143 are firstly stitched to the to-be inner side of the first base cloth 141 at the opening peripheral edge 148 of the gas inlet port 145 by the stitching yarn S, as shown in FIGS. 40 and 41A. As shown in FIG. 41B, subsequently, the ends of the commutator cloth 143 are stitched up together by the stitching yarn S, thereby to form the predetermined shape of the commutator cloth 143. Here in the second embodiment, too, the first base cloth 141 has been provided with the vent holes 147, the gas inlet port 145 and the mounting holes 146 and 150 in advance, while the commutator cloth 143 and the reinforcing cloth 144 has been provided with the gas inlet port 145 and the mounting holes 146 and 150 in advance, as in the first embodiment. However, the vent holes 147, the gas inlet port 145 and the mounting holes 146 and 150 may be formed after the reinforcing cloth 144 and the commutator cloth 143 are stitched to the first base cloth 141.

As shown in FIGS. 41B and 41C, thereafter, the first base cloth 141 is folded back on the first base line X1 extending in the transverse direction between the upper portion 141a and the lower portion 141e. Then the straight edges 141b and 141f of the upper and lower portions 141a and 141b, respectively, near the first base line X1 are stitched up together, and the other straight edges 141c and 141g are stitched up together, too.

Subsequently as shown in FIGS. 41C and 41D, the upper portion 141a is folded back on the second base line X2 extending between the portions projected in the transverse directions, so that the unstitched peripheral edges 141d and 141h of the upper and lower portions 141a and 141e are separated and developed flatly. The outer shape in this expanded state is the same as the outer shape of the second base cloth 142.

Then as shown in FIGS. 41D and 41E, the second base cloth 142 is applied hereon, and the individual outer peripheral edges are stitched up together by the stitching yarn S. Thus the airbag 140 is formed into a bag shape so that the stitch margin may not appear on the outer surface.

Thereafter, the airbag 140 is reversed inside out utilizing the gas inlet port 145.

The mounting of the airbag 140 thus manufactured on the vehicle is started by placing the retainer 117 inside of the airbag 140 so that the bolts 120 may be protruded from the mounting holes 146, and then folding the airbag 140. Then the folded airbag 140 is wrapped by a breakable wrapping sheet 139 (refer to FIG. 30) to keep the folded-up state.

Then, the folded airbag 140 is located on the bottom wall 125 of the case 124 from the opening 124a by inserting the individual bolts 120 into the mounting holes 127 from above. Subsequently, the upper portion 112a of the body 112 of the inflator 111 is inserted into the insert hole 126, the airbag opening 145, and the insert hole 119 from the lower side. At this time, as shown in FIGS. 33 and 34A, the heads 114f and the necks 114e of the individual retaining pawls 114c of the inflator 111 are inserted into the large holes 125b, 150a and 118b of the insert holes 125a of the bottom wall 125, the mounting holes 150 of the airbag 140, and the retaining holes 118a of the retainer 117, so that the heads 114f are protruded on the upper surface of the base 118 of the retainer 117. Then the inflator body 112 is turned clockwise, as shown in FIGS. 34A and 34B, to shift the necks 114e to the small holes 125c, 150b and 118c of the insert holes 125a of the bottom wall 125, the mounting holes 150 of the airbag 140, and the retaining holes 118a of the retainer 117, so that the heads 114f come to abut against the peripheral edge of the small hole 118c on the upper surface of the base 118 of the retainer 117, as shown in FIG. 37. At this time, the individual bolts 120 are inserted into the recesses 114a of the inflator 111. If the nuts 116 then are fastened to the bolts 120, the nuts 116 hold the peripheral edge 114b of the recesses 114a to attach the inflator 111 to the bottom wall 125 of the case 124. The base 118 of the retainer 117, in cooperation with the nuts 116 and the retaining pawls 114c of the inflator 111, presses the opening peripheral edge 148 of the airbag 140 onto the bottom wall 125, thereby to be attached to the bottom wall 25 of the case 124.

Thereafter, the side wall 129 of the case 124 is inserted within the joint wall portion 136 of the airbag cover 132 in the dashboard 1 mounted on the vehicle, and the individual retaining pawls 130 of the case 124 are inserted into the retaining holes 137 on the joint wall portion 136. Thus the retaining pawls 130 are retained by the joint wall portion 136. If the bolts 9 are fastened into the nuts 128a of the individual brackets 128 through the mounting seats 8a, the airbag device M2 for front passenger's seat is mounted on the vehicle.

Alternatively, as in the first embodiment, the mounting of the airbag device M2 on the vehicle may also be made by assembling the case 124 with the airbag 140 and the inflator 111 to the airbag cover 132 of the dashboard 1, and securing this airbag device M2 to the body 6 with the bolts 9 when attaching the dashboard 1 to the vehicle.

After mounting the airbag device M2 on the vehicle, when the inflation gas G is discharged from the individual gas discharge ports 113 of the inflator 111, the airbag 140 inflates and breaks the wrapping sheet 139. The airbag 140 further breaks the breakable portion 135 and opens the doors 133F and 133B of the airbag cover 132 as indicated by the double-dotted lines in FIGS. 29 and 30, and then protrudes from the opening 138 provided by the doors 133F and 133B.

The airbag 140 thus completes the inflation, and emits the extra gas from the vent holes 147.

Since the airbag device M2 of the second embodiment employs the inflator 111 of pyro- and long mass flow type, the inflator 111 is compact, and is able to expand and inflate the airbag 140 for front passenger's seat properly.

Figure 42:
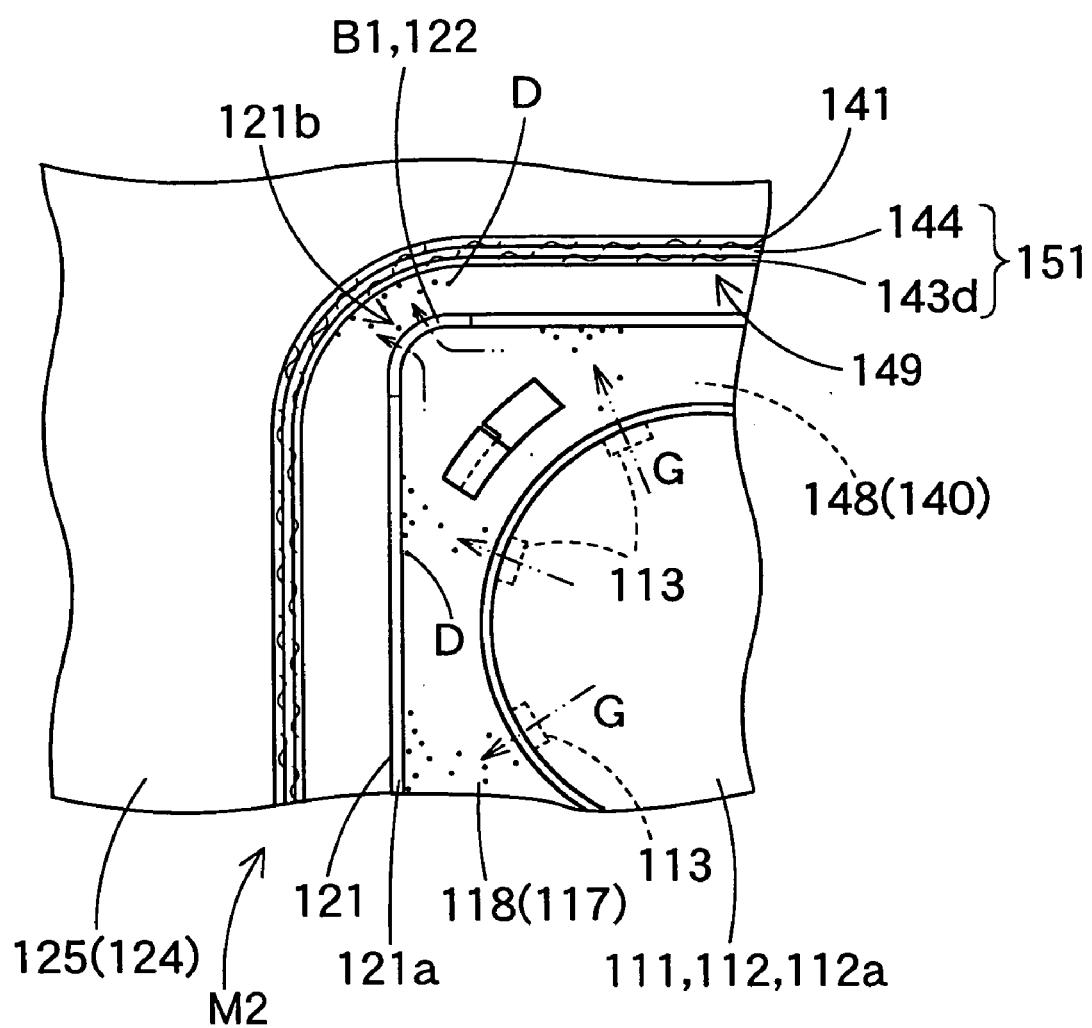
FIG. 42 is an enlarged partial plane view showing the vicinity of the retainer of the second embodiment in use.

In the airbag device M2 of the second embodiment, even if the inflation gas G containing the mist D is discharged from the gas discharge ports 113 of the inflator 111 when the airbag 140 inflates, the mist D adheres to the cover wall 121, as shown in FIG. 42, and does not grow to form large mist agglomerates because of the mist growth prevention means B1.

In the second embodiment, more specifically, the cover wall 121 of the retainer 117 is arranged in a generally square cylindrical shape encircling the end portion 112a of the inflator 111 having gas discharge ports 113. Moreover, at the four corners 121b of the cover wall 121, there are arranged recesses 122 as a through portion recessed from the leading end 121a of the cover wall 121 to form the mist growth prevention means B1.

In the cover wall 121 of a generally square cylindrical shape encircling the inflator 111, the mist D is likely to gather to form mist agglomerates at the four corners 121b. With the construction of the second embodiment, however, even if the mist D gathers in the corners 121b, it is blown off from the recesses 122 before forming agglomerates, and does not form big mist agglomerates.

In the airbag device M2 for front passenger's seat of the second embodiment, therefore, even if the inflation gas G discharged from the inflator 111 contains a lot of mist D, the mist D does not form mist agglomerates.

It is desired that the width Y (refer to FIG. 32) of the through portion 122 in the corners 121b of the cove wall 121 be 5 to 15 mm. Under 5 mm, it is difficult for the mist D to go out of the cover wall 121, and over 15 mm, it is difficult for the mist D to adhere to the cover wall 121. The length Z of the through portion 122 is desirably 10 to 15 mm. Under 10 mm, it is difficult for the mist D to go out of the cover wall 121, and over 15 mm, it is difficult for the mist D to adhere to the cover wall 121.

In the second embodiment, moreover, the cover wall 121 of the retainer 117 is arranged to protect the part 149 of the airbag 140 neighboring the opening peripheral edge 148 held by the base 118 of the retainer 117 from the gas discharge ports 113 of the inflator 111. Therefore, the cover wall 121 prevents the high temperature inflation gas G containing the high temperature mist D from hitting directly the part 149 of the airbag 140 neighboring the opening peripheral edge 148 as much as possible, and contributes to the protection of the part 149 of the airbag 140 neighboring the opening peripheral edge 148 from heat.

Especially in the second embodiment, the airbag 140 is provided at the inner side of its opening peripheral edge 148 with a protection cloth member 151 (144 and 143d) for protecting the base cloth 141 up to the area over the leading end 121a of the cover wall 121 of the retainer 117 in the completely inflated airbag 140. With this construction, when the mist D flows out of the cover wall 121 toward the part 149 of the airbag 140 neighboring the opening peripheral edge 148, it adheres to the protection cloths 144 and 143d in the inner side of the base cloth 141. Therefore, the mist D is prevented from adhering to the base cloth 141 constituting the bag shape, or the outer shape of the airbag 140.

Figure 43:
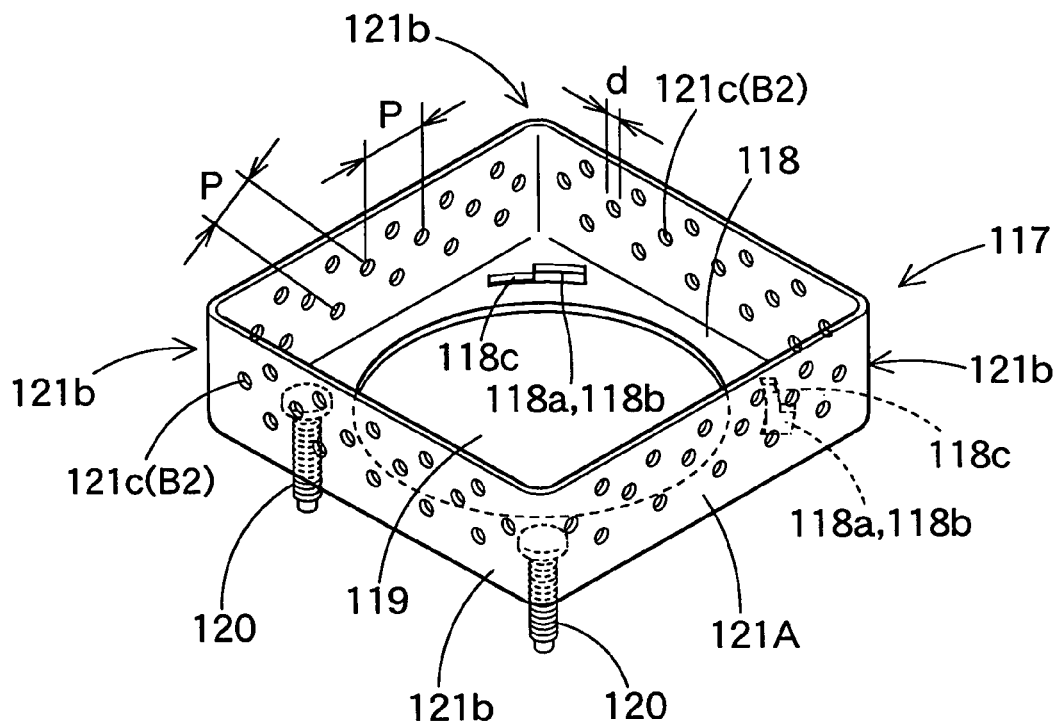
FIG. 43 is a perspective view of a modification of the retainer of the second embodiment.
Figure 44:
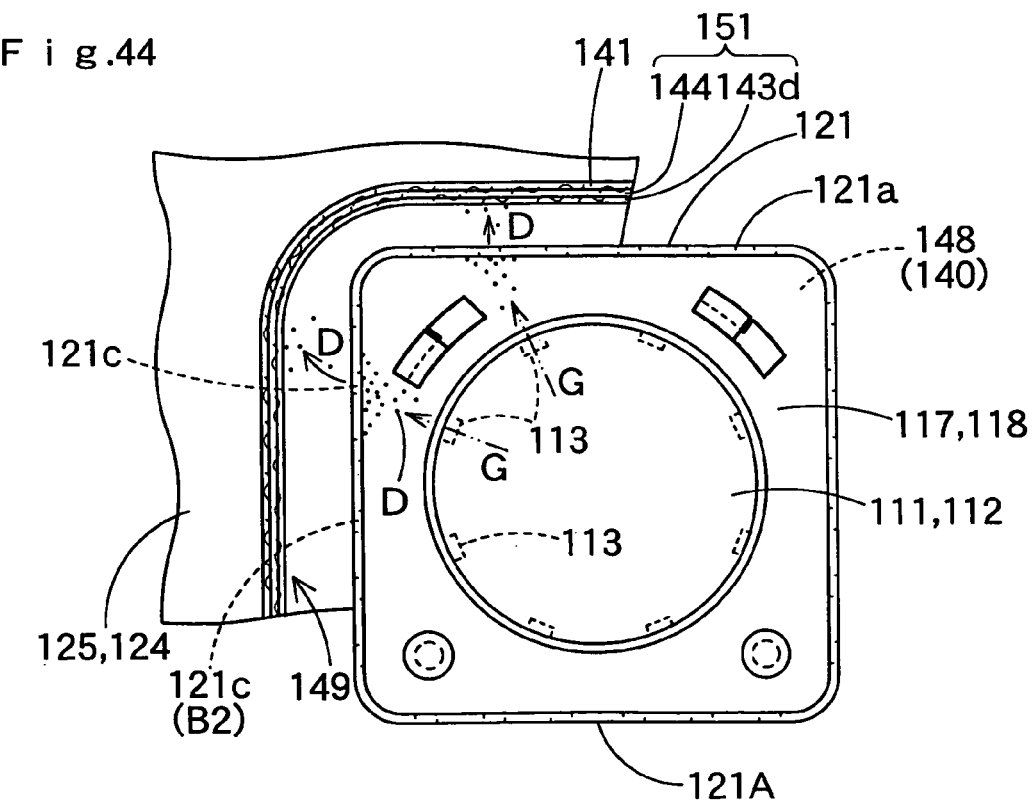
FIG. 44 is an enlarged partial plane view of the retainer in FIG. 43 in use.

The mist growth prevention means may be constructed as shown in FIGS. 43 and 44. The mist growth prevention means B2 shown in FIGS. 43 and 44 is formed by providing numbers of through holes 121c on the cover wall 121A of the retainer 117 instead of providing the recess 122. In the illustrated embodiment, the internal diameter d of each of the individual through holes 121c is 2 mm, and the pitch P between the neighboring through holes 121c is 5 mm. The upper end 121a of the cover wall 121A extends from the base 118 up to the same level as the top surface 112c of the inflator 111, as in the cover wall 121.

With this construction, the mist D from the gas discharge ports 113 goes out of the through holes 121c before further growth, or adheres to the peripheral edge of the through holes 121c in the cover wall 121A. The mist D adhered to the peripheral edge of the through holes 121c is prevented from forming mist agglomerates since the mist D continues to go out of the through holes 121c and little mist D follows to adhere thereto.

Even if it grows to form mist agglomerates, the agglomerates are likely to adhere to the inner circumference of the through holes 121c which are great in number, and the agglomerates are hardly blown off into the airbag 140. Therefore, it is prevented that the big mist agglomerates adhere to the base cloths 141 and 142.

It is desired that the internal diameter d of each of the through holes 121c is 1 to 3 mm, and the pitch P of forming the through holes 121c is 5 to 10 mm. If the internal diameter d is under 1 mm, it is difficult for the mist D to go out of the cover wall 121A, and if the internal diameter d is over 3 mm, it is difficult for the mist D to adhere to the cover wall 121A. If the pitch P is under 5 mm, it is difficult for the mist D to adhere to the cover wall 121A, and if the pitch P is over 10 mm, it is difficult for the mist D to go out of the cover wall 121A.

The cover wall 121A may have recesses 122 at the corners 121b as in the cover wall 121.

Figure 45:
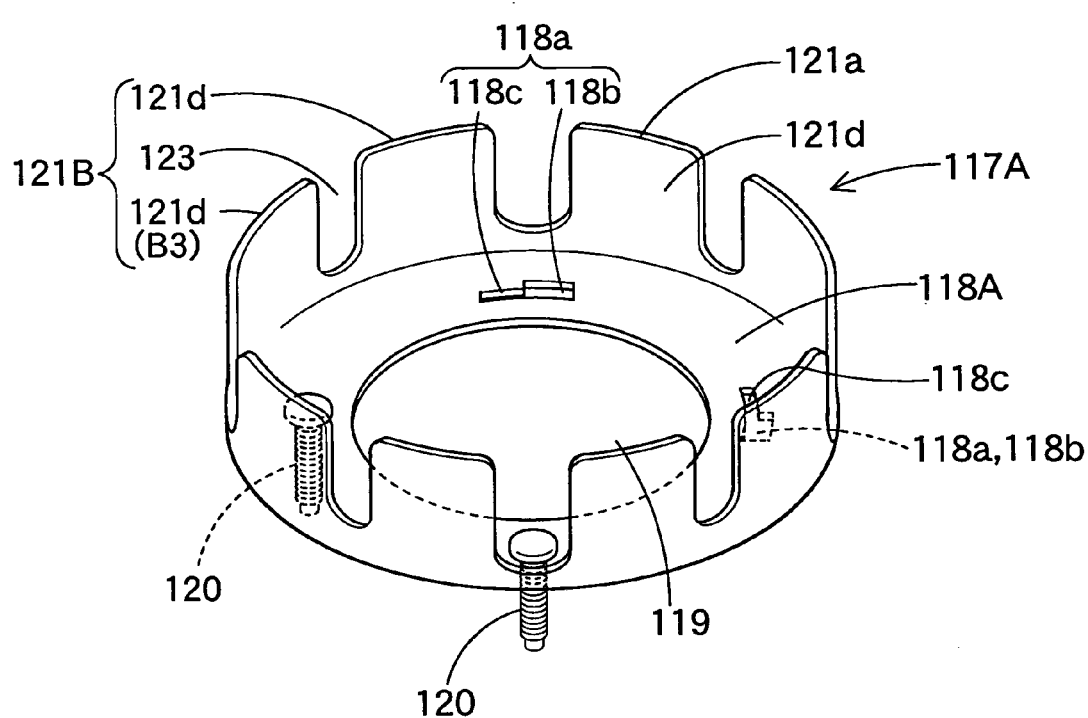
FIG. 45 is a perspective view of yet another modification of the retainer.
Figure 46:
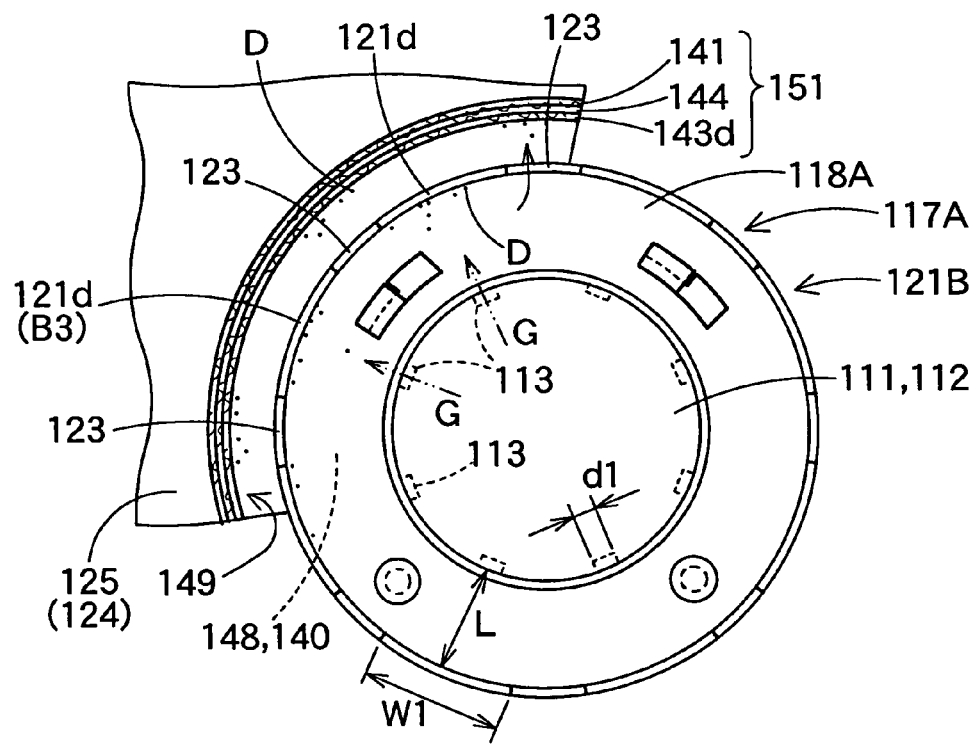
FIG. 46 is an enlarged partial plane view of the retainer in FIG. 45 in use.

Furthermore, the mist growth prevention means may be constructed as shown in FIGS. 45 and 46. The mist growth prevention means B3 is formed by a cover wall 121B of the retainer 117A including tongue pieces 121d so arranged separate from one another as to confront the individual gas discharge ports 113 of the inflator 111. The upper ends 121a of the individual tongue pieces 121d extend from the generally annular base 118 up to the same level as the top surface 112c of the inflator 111, as in the cover wall 121.

With this construction, the mist D from the individual gas discharge ports 113 adheres to the tongue piece 121d covering the respective gas discharge port 113. The mist D from other gas discharge ports 113 than the confronting port 113 hardly adheres to the respective tongue piece 121d. Accordingly, the forming of mist agglomerates is prevented. Moreover, the tongue pieces 121d are provided with spaces 123 in between the neighboring tongue pieces 121d, and great deal of the inflation gas G from the gas discharge ports 113 flows toward the spaces 123. Therefore, the mist D adhered to the individual tongue pieces 121d is likely to be blown off toward the spaces 123 between the tongue pieces 121d before growing to form mist agglomerates.

It is desired that the individual tongue pieces 121d confronting the individual gas discharge ports 113 have its width W1 corresponding to the angular range of the inflation gas G discharged from the gas discharge ports 113 as reaching the tongue piece 121d.

Irrespective of forming the mist growth prevention means by the through holes 121c or the tongue pieces 121d of the cover walls 121A and 121B, as shown in FIGS. 43 to 46, the base cloth 141 of the airbag 140 is provided at the inner side of the part 149 neighboring the opening peripheral edge 148 with the protection cloths 144 and 143d. Therefore, even if the mist D passes through the through holes 121c or the spaces 123 between the tongue pieces 121d out of the cover walls 121A and 121B, and flows toward the part 149 neighboring the opening peripheral edge 148, it adheres to the protection cloths 144 and 143d at the inner side of the base cloth 141. Consequently, the adhesion of the mist D to the base cloth 141 constituting the outer shape of the airbag 140 is prevented.

Here in the airbag 140 of the second embodiment upon the inflation, in the inner side away from the top surface 1a of the dashboard 1, the inflation gas G is guided toward the vehicle's front and rear sides by the commutator cloth 143 to expand the airbag 140 widely in the vehicle's longitudinal direction. Then the airbag 140 completes the inflation while bringing the passenger's side wall 140a close to the vertical face toward the passenger. Since the airbag 140 is able to restrain the passenger with the flat and wide passenger's side wall 140a expanded generally vertically, it does not apply a partial pressure to the passenger. Here, the vicinity of the transverse center 143c of the commutator cloth 143 is so arranged in the airbag 140 as to be disposed above the top surface 1a of the dashboard 1 when the airbag 140 is inflated (refer to FIGS. 29 and 39).

Figure 39:
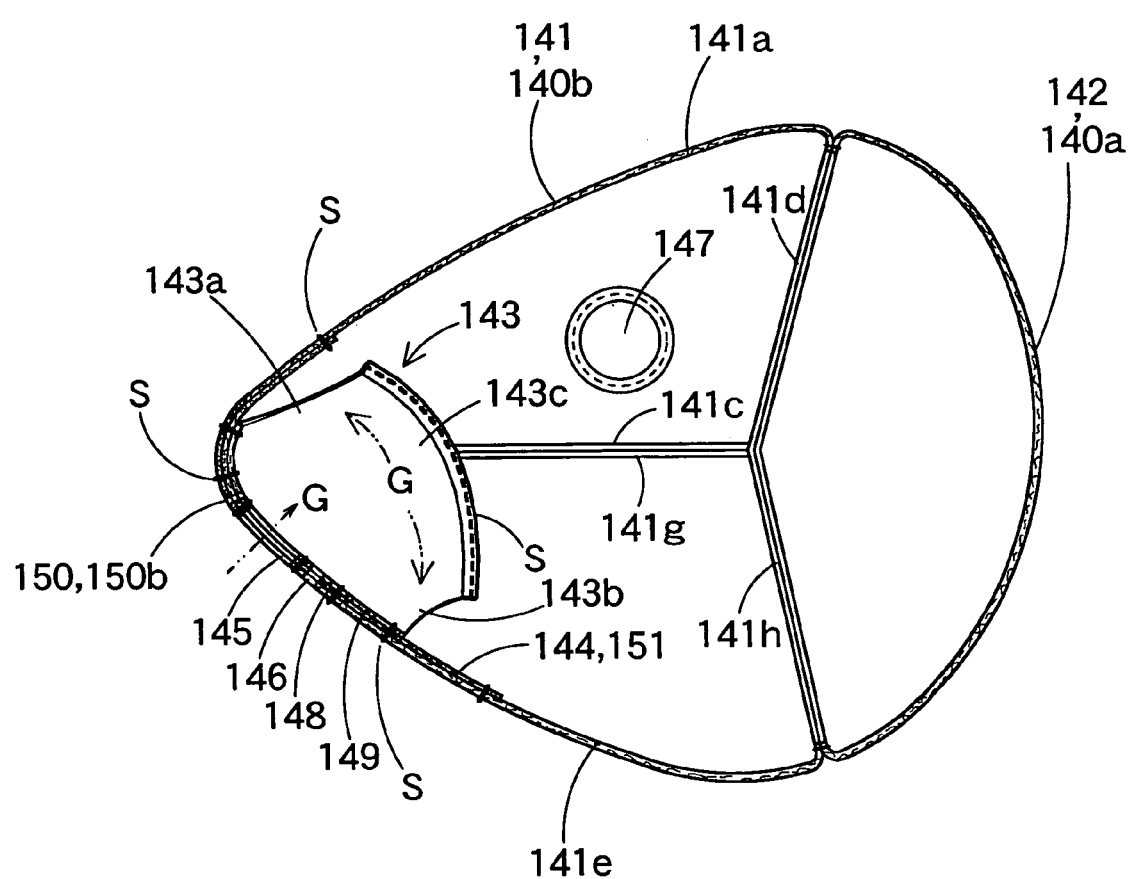
FIG. 39 is a sectional view of the airbag employed in the second embodiment in solitarily inflated state along the vehicle's longitudinal direction.

In the second embodiment, moreover, as shown in FIG. 39, the reinforcing cloth 144 is extended in the front and rear sides so as to confront the opening 143a and 143b of the commutator cloth 143 guiding the gas G toward the front and rear sides when the airbag 140 inflates. Even if the mist before forming mist agglomerates passes over the cover wall 121 and flows into the airbag 140, it is captured by the commutator cloth 143 firstly and hardly contacts the first base cloth 141 and the second base cloth 142 directly. Even if the mist is contained in the inflation gas G directed toward the front and rear directions by the commutator cloth 143, the reinforcing cloth 144 captures the mist.

In the second embodiment, the cover wall 121 of the retainer 117 is arranged in a generally square cylindrical shape encircling the body 112 of the inflator 111. However, the cover wall 121 may be formed in a generally cylindrical shape encircling the inflator body 112, as the cover wall 121B shown in FIG. 45.

The smallest clearance L between the gas discharge port 113 and the cover wall 121 (refer to FIG. 46) is desirably set within the range of 8 to 20 mm. If it is under 8 mm, the cover wall 121 is prone to be deformed, thereby making difficult for the mist D to adhere thereto. Even if the cover wall 121 is not deformed, the pressure loss of the gas G is increased, so that it takes the airbag 140 more time to be inflated completely. If the clearance L is over 20 mm, it is too far for the mist D to adhere to the cover wall 121, so that the meaning of providing the cover wall 121 is lost.

In the airbag device M2 in the second embodiment, the two bolts 120 of the retainer 117 and the two retaining pawls 114*c* of the inflator 111 are employed for the attachment of the airbag 140 and the inflator 111 to the bottom wall 125 of the case 124. In comparison with the case having four bolts 120 at the positions of the retaining holes 118*a* of the retainer 117 to attach the airbag 140 and the inflator 111 to the bottom wall 125 of the case 124, the detachment of the inflator 111 in scrapping can be done easily in the airbag device M2 since fewer bolts 120 are used.

Especially in the second embodiment, the two bolts 120 are arranged in the side closer to the not-shown glove box at the rear side of the case 124. Therefore, the detachment of the nuts 116 can be done easily, thereby further facilitating the detachment work of the inflator 111 in scrapping.

In the second embodiment, the airbag cover 132 is formed integral with the dashboard 1. However, the airbag cover 132 may be formed separately from the dashboard 1.

What is claimed is:

1. An airbag device for a front passenger's seat mounted on the instrument panel in front of the front passenger's seat, comprising:

an airbag having an opening for admitting the inflation gas;

an inflator that has a generally cylindrical shape and an outer circumferential part of an end portion of the inflator is provided with a plurality of gas discharge ports for discharging the inflation gas;

a case for holding and housing the airbag folded and holding the inflator, the case having a bottom wall with an insert hole from which the end portion of the inflator having the gas discharge ports is inserted therein; and an annular retainer for attaching the airbag to the case by holding the opening peripheral edge of the airbag the retainer comprising:

an annular base attached to the periphery of the insert hole of the case bottom wall while pressing the peripheral edge of the airbag opening onto the periphery of the insert hole of the bottom wall; and a cover wall extended from the base so as to block the pad of the airbag neighboring the opening peripheral edge held by the base from the gas discharge ports of the inflator, on which the mist contained in the inflation gas discharged from the gas discharge ports adhering, the cover wall comprising a mist growth prevention means to prevent the mist from forming mist agglomerates, wherein:

the cover wall of the retainer is arranged in a generally square shape encircling the end portion of the inflator having the gas discharge ports;

the cover wall is provided at four corners thereof with through portions penetrating the cover wall;

the through portions constitute the mist growth prevention means;

the retainer includes only one cover wall extending only from an outer edge of the base;

the through portions formed at the four corners of the cover wall are recesses recessing from a top of the cover wall; and leading ends of the cover wall at four sides of the square shape extend straightly as viewed from above.

2. An airbag device for a front passenger's seat according to claim 1, wherein the width of each of the through portions is 5 to 15 mm, and the length of each of the through portions is 10 to 15 mm.

3. An airbag device for a front passenger's seat according to claim 1, wherein:

the airbag is provided at the opening peripheral edge thereof with a protection cloth arranged in the inner side of base cloth constituting the bag shape of the airbag for protecting the base cloth; and the protection cloth is arranged up to the area over the vicinity of a leading end of the cover wall of the retainer in the completely inflated airbag.

4. An airbag device for a front passenger's seat according to claim 1, wherein:

the inflator comprises a flange having a plurality of recesses and retaining pawls;

the retainer comprises a plurality of bolts;

the airbag and the inflator are secured to the bottom wall of the case by inserting the bolts of the retainer through the opening peripheral edge of the airbag, the bottom wall of the case, and the recesses of the inflator and fastening them into nuts, and by inserting the retaining pawls of the inflator through the bottom wall of the case to retain the opening peripheral edge of the airbag.

5. The airbag device for a front passenger's seat according to claim 1, wherein the inflator generates inflation gas by a chemical reaction and in which a mass flow curve area of the inflator from 30 ms after the ignition of the inflator occupies more than 25% of the entire area of the mass flow curve.

* * * * *